United States Patent
Grandcolas et al.

(10) Patent No.: US 10,636,084 B2
(45) Date of Patent: Apr. 28, 2020

(54) METHODS AND SYSTEMS FOR IMPLEMENTING ON-LINE FINANCIAL INSTITUTION SERVICES VIA A SINGLE PLATFORM

(75) Inventors: Michael Grandcolas, Santa Monica, CA (US); John Riblett, Culver City, CA (US); Ted Krawiec, Malibu, CA (US); Albert Cohen, Encino, CA (US); Sam Shahdousti, Los Angeles, CA (US); Naresh Vyas, Redondo Beach, CA (US); Mike Mast, Oak Park, CA (US); Simon Khilkevich, Northridge, CA (US); Gene Stolarov, Granada Hills, CA (US); Irina Koryakovtseva, Marlboro, NJ (US); Grigor Markarian, Oak Park, CA (US); Jeremy Dimond, Bolingbrook, IL (US); Avinash Kharul, Santa Monica, CA (US); Amit Chitnis, Los Angeles, CA (US); Ravin Vernekar, Los Angeles, CA (US); Dilip Parekh, Los Angeles, CA (US); Mark Bitter, Los Angeles, CA (US); Farah Khalili, Beverly Hills, CA (US); Teresa Petach, Los Angeles, CA (US); Chris Kowalski, Culver City, CA (US); Rajashree Karwa, Los Angeles, CA (US)

(73) Assignee: CITICORP CREDIT SERVICES, INC. (USA), Sioux Falls, SD (US)

( * ) Notice: Subject to any disclaimer, the term of this patent is extended or adjusted under 35 U.S.C. 154(b) by 2219 days.

(21) Appl. No.: 11/242,565

(22) Filed: Oct. 3, 2005

(65) Prior Publication Data
US 2006/0195816 A1   Aug. 31, 2006

Related U.S. Application Data

(63) Continuation-in-part of application No. 09/323,210, filed on Jun. 1, 1999, now Pat. No. 7,249,344, which
(Continued)

(51) Int. Cl.
*G06Q 40/02* (2012.01)

(52) U.S. Cl.
CPC ................................. *G06Q 40/02* (2013.01)

(58) Field of Classification Search
USPC .................. 235/379, 380; 705/35, 38, 39, 43
See application file for complete search history.

(56) References Cited

U.S. PATENT DOCUMENTS 5,878,403 A * 3/1999 DeFrancesco et al. .......... 705/38
6,003,019 A * 12/1999 Eaton et al. ..................... 705/42
(Continued)

OTHER PUBLICATIONS

Office Action dated Feb. 6, 2013 for pending counterpart European Patent Application No. 05802843.2, pp. 1-9.
(Continued)

*Primary Examiner* — Kirsten S Apple
*Assistant Examiner* — Martin A Gottschalk
(74) *Attorney, Agent, or Firm* — Johnson, Marcou, Isaacs, & Nix, LLC; John M. Harrington, Esq.

(57) ABSTRACT

A method and system for implementing on-line financial institution services via a single physical and logical platform deploys global online banking applications in an environment in which the applications are built from a single source base and adapted to various business rules and languages associated with different regions, countries and businesses. Separate web apps are created for each individual business according to contextual attributes, and application servers running the context dependent web apps provide the interface between customers and banking functionality. The
(Continued)

platform relies in part on reuse of appropriate components to achieve integration, as well as sharing of core services. As a result of the independent nature of business specific components, each business may require different versions of application software and may update or implement new components without affecting existing business components.

44 Claims, 43 Drawing Sheets

Related U.S. Application Data is a continuation of application No. 08/908,413, filed on Aug. 7, 1997, now Pat. No. 5,933,816, application No. 11/242,565, which is a continuation-in-part of application No. 09/553,449, filed on Apr. 19, 2000, now abandoned, and a continuation-in-part of application No. 09/671,424, filed on Sep. 27, 2000, now Pat. No. 8,112,330, which is a continuation-in-part of application No. 09/323,210, filed on Jun. 1, 1999, now Pat. No. 7,249,344, which is a continuation of application No. 08/908,413, filed on Aug. 7, 1997, now Pat. No. 5,933,816, application No. 11/242,565, which is a continuation-in-part of application No. 09/551,930, filed on Apr. 19, 2000, now abandoned, and a continuation-in-part of application No. 09/579,568, filed on May 26, 2000, now abandoned, and a continuation-in-part of application No. 09/587,826, filed on Jun. 6, 2000, now abandoned, and a continuation-in-part of application No. 09/653,633, filed on Sep. 1, 2000, now Pat. No. 7,051,096, and a continuation-in-part of application No. 10/234,901, filed on Sep. 4, 2002, now Pat. No. 7,165,020, which is a continuation-in-part of application No. 09/320,952, filed on May 27, 1999, now Pat. No. 6,466,900, application No. 11/242,565, which is a continuation-in-part of application No. 09/668,112, filed on Sep. 22, 2000, now Pat. No. 7,137,006, application No. 11/242,565, which is a continuation-in-part of application No. 09/671,424, filed on Sep. 27, 2000, now Pat. No. 8,112,330, which is a continuation-in-part of application No. 09/323,210, filed on Jun. 1, 1999, now Pat. No. 7,249,344, which is a continuation of application No. 08/908,413, filed on Aug. 7, 1997, now Pat. No. 5,933,816, application No. 11/242,565, which is a continuation-in-part of application No. 09/736,760, filed on Dec. 13, 2000, now abandoned, and a continuation-in-part of application No. 09/832,863, filed on Apr. 12, 2001, now Pat. No. 9,418,381.

(60) Provisional application No. 60/615,568, filed on Oct. 1, 2004, provisional application No. 60/029,209, filed on Oct. 31, 1996, provisional application No. 60/130,144, filed on Apr. 20, 1999, provisional application No. 60/136,540, filed on May 28, 1999, provisional application No. 60/155,540, filed on Sep. 22, 1999, provisional application No. 60/138,348, filed on Jun. 9, 1999, provisional application No. 60/152,183, filed on Sep. 2, 1999, provisional application No. 60/087,377, filed on May 29, 1998, provisional application No. 60/155,853, filed on Sep. 24, 1999, provisional application No. 60/170,658, filed on Dec. 14, 1999, provisional application No. 60/258,495, filed on Dec. 29, 2000.

(56) References Cited

U.S. PATENT DOCUMENTS

| | | | |
|---|---|---|---|
| 6,064,990 A * | 5/2000 | Goldsmith | 705/75 |
| 6,347,307 B1 * | 2/2002 | Sandhu et al. | 705/36 R |
| 6,427,132 B1 * | 7/2002 | Bowman-Amuah | 703/22 |
| 6,473,794 B1 * | 10/2002 | Guheen et al. | 709/223 |
| 6,748,420 B1 * | 6/2004 | Quatrano et al. | 709/205 |
| 7,565,643 B1 * | 7/2009 | Sweet et al. | 717/121 |
| 2002/0136214 A1 * | 9/2002 | Do et al. | 370/392 |
| 2003/0046689 A1 * | 3/2003 | Gaos | 725/34 |
| 2003/0061132 A1 * | 3/2003 | Yu et al. | 705/30 |
| 2004/0133460 A1 | 7/2004 | Berlin et al. | |

OTHER PUBLICATIONS

Hesmer, S. "Portlet Development Guide. Working with the Portlet API 1.1," Internet Citation, Apr. 2, 2002, XP002267927, retrieved from the Internet: URL: http://w.bis.business.utah.edu/resources/wps_project.htm [retrieved on Jan. 23, 2004], pp. 1-83.

Extended European Search Report and Witten Opinon dated Jun. 12, 2012, issued in a co-pending European patent application No. 05802843.2, filed Mar. 29, 2007.

"The Java 2 Enterprise Edition Developer's Guide, Version 1.2.1," Sun Microsystems, Internet Citation, May 1, 2000, pp. 1-201, retrieved from the Internet URL:http://java.sun.com/j2ee/sdk_1.2.1/devguide1_2_1.pdf [retrieved on Nov. 3, 2006].

\* cited by examiner

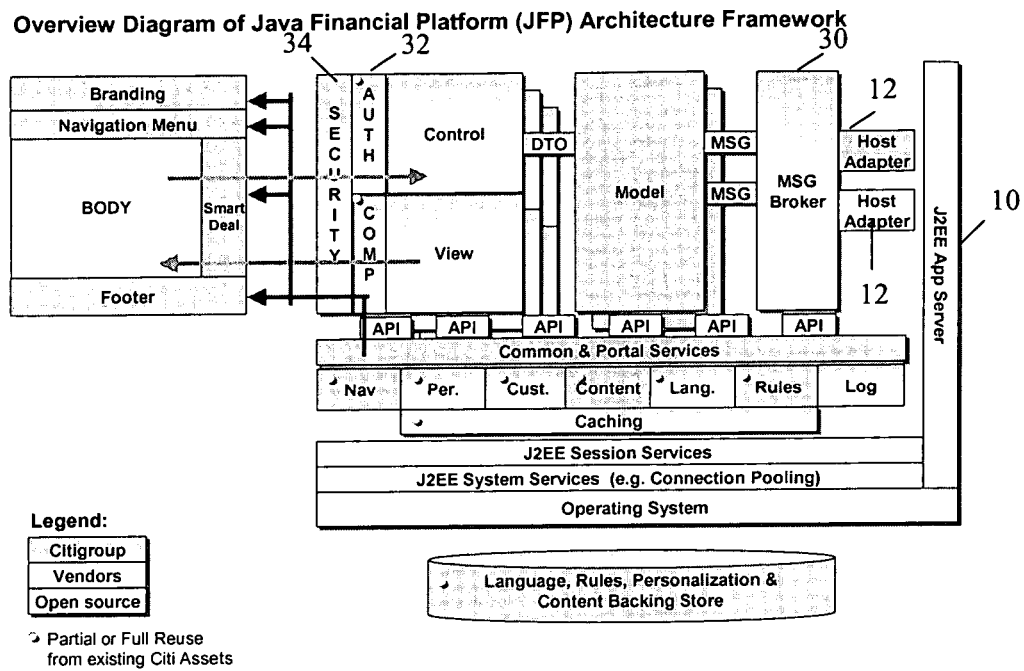
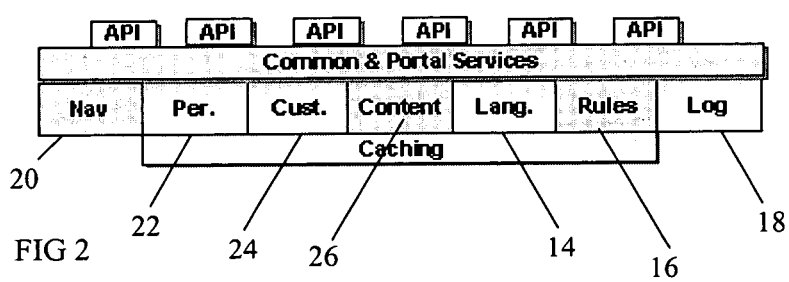
FIG 1
FIG 2

Overview of JFP Banking Application Response Flow

Overview of JFP Banking Application Response Flow

| SA 1: Database Server | SA 2: Application Server | SA 3: Web Server |
|---|---|---|
| + JFP Core DB Package | + JFP Core Apps Package | + JFP Core Web Package |
| + JII | + JII | + JII |
| + JPS | + JPS | + JPS |
| + JBA | + JBA | + JBA |
| + Reg. App. DB Package | + JCP | |
| + JII | + Reg. App. Apps Package | |
| + SQ | + JII | |
| | + SQ | |

FIG 12

| CD 1: Database Server | CD 2: Application Server | CD 3: Web Server |
|---|---|---|
| + DB Package | + Apps Package | + Web Package |
| + JII | + JII | + JII |
| + JPS | + JPS | + JPS |
| + JBA | + JBA | + JBA |
| + SQ | + JCP | |
| | + SQ | |

FIG 13

| SA 1: Database Server | SA 2: Application Server | SA 3: Web Server |
|---|---|---|
| + DB Package | + Apps Package | + Web Package |
| + JII | + JII | + JII |
| + JPS | + JPS | + JPS |
| + JBA | + JBA | + JBA |
| + SQ | + JCP | |
| | + SQ | |

FIG 14

| CD 4: Database Server | CD 5: Application Server |
|---|---|
| + Reg. App. II DB Package | + Reg. App. II Apps Package |
| + RA1 | + RA1 |
| + RA2 | + RA2 |

102 —

*(releasable entities on this CD contain SQL scripts)*    *(releasable entities on this CD contain files to be installed on the Apps Server)*

FIG 15

| SA 1: Database Server | SA 2: Application Server | SA 3: Web Server |
|---|---|---|
| + JFP Core DB Package | + JFP Core Apps Package | + JFP Core Web Package |
| + JII | + JII | + JII |
| + JPS | + JPS | + JPS |
| + JBA | + JBA | + JBA |
| + Reg. App. DB Package | + JCP | |
| + JII | + Reg. App. Apps Package | |
| + SQ | + JII | |
| + Reg. App. II DB Package | + SQ | |
| + RA1 | + Reg. App. II Apps Package | |
| + RA2 | + RA1 | |
| | + RA2 | |

FIG 16

*(releasable entities on this CD contain files to be installed on the Apps Server)*

| SA 1: Database Server | SA 2: Application Server | SA 3: Web Server |
|---|---|---|
| + JFP Core DB Package | + JFP Core Apps Package | + JFP Core Web Package |
| + JII | + JII | + JII |
| + JPS | + JPS | + JPS |
| + JBA | + JBA | + JBA |
| + Reg. App. DB Package | + JCP | |
| + JII | + Reg. App. Apps Package | |
| + SQ | + JII | |
| + Reg. App. II DB Package | + SQ | |
| + RA1 | + Reg. App. II Apps Package | |
| + RA2 | + RA1 | |
| | + RA2 | |
| | + JFP Apps Incr. Package | |
| | + JII | |
| | + JPS | |

FIG 18

METHODS AND SYSTEMS FOR IMPLEMENTING ON-LINE FINANCIAL INSTITUTION SERVICES VIA A SINGLE PLATFORM

PRIORITY APPLICATIONS

This application claims the benefit of U.S. Provisional Application No. 60/615,568 filed Oct. 1, 2004, entitled "Methods and Systems for Implementing On-Line Financial Institution Services Via a Single Platform", which is incorporated herein by this reference.

This application is a continuation-in-part of U.S. patent application Ser. No. 09/323,210 filed Jun. 1, 1999, entitled "System and Method for Delivering Financial Services", which is a continuation of U.S. patent application Ser. No. 08/908,413 filed Aug. 7, 1997 (claiming priority to U.S. Provisional Application No. 60/029,209 filed Oct. 31, 1996), entitled "System and Method for Delivering Financial Services", now U.S. Pat. No. 5,933,816 issued Aug. 3, 1999, each of which is incorporated herein by this reference.

This application is a continuation-in-part of U.S. patent application Ser. No. 09/553,449 filed Apr. 19, 2000, entitled "Global Method and System for Providing Enhanced Transactional Functionality Through a Customer Terminal", which is a continuation-in-part of U.S. patent application Ser. No. 09/671,424 filed Sep. 27, 2000, entitled "System and Method for Delivering Financial Services", which is a continuation-in-part of U.S. patent application Ser. No. 09/323,210 filed Jun. 1, 1999, entitled "System and Method for Delivering Financial Services", which is a continuation of U.S. patent application Ser. No. 08/908,413 filed Aug. 7, 1997 (claiming priority to U.S. Provisional Application No. 60/029,209 filed Oct. 31, 1996), entitled "System and Method for Delivering Financial Services", now U.S. Pat. No. 5,933,816 issued Aug. 3, 1999, each of which is incorporated herein by this reference.

This application is a continuation-in-part of U.S. patent application Ser. No. 09/551,930 filed Apr. 19, 2000, (claiming priority to U.S. Provisional Application No. 60/130,144 filed Apr. 20, 1999) entitled "Platform-Independent Exceptions-Based Methods and Systems for Remotely Managing Nodes Within a Communications Network", each of which is incorporated herein by this reference.

This application is a continuation-in-part of U.S. patent application Ser. No. 09/579,568 filed May 26, 2000, (claiming priority to U.S. Provisional Application No. 60/136,540 filed May 28, 1999 and U.S Provisional Application No. 60,155,540 filed Sep. 24, 1999) entitled "Method and System for Providing Accessibility to Financial Services for Visually Impaired Persons", each of which is incorporated herein by this reference.

This application is a continuation-in-part of U.S. patent application Ser. No. 09/587,826 filed Jun. 6, 2000, (claiming priority to U.S. Provisional Application No. 60/138,348 filed Jun. 9, 1999) entitled "Methods and Systems for Automated Information Retrieval", each of which is incorporated herein by this reference.

This application is a continuation-in-part of U.S. patent application Ser. No. 09/653,633 filed Sep. 1, 2000 (claiming priority to U.S. Provisional Application No. 60/152,183 filed Sep. 2, 1999) entitled "System And Method For Providing Global Self-Service Financial Transaction Terminals With Worldwide Web Content, Centralized Management, and Local and Remote Administration", each of which is incorporated herein by this reference.

This application is a continuation-in-part of U.S. patent application Ser. No. 10/234,901 filed Sep. 4, 2002, entitled "Multi-Language Phrase Editor and Method Thereof", which is a continuation-in-part of U.S. patent application Ser. No. 09/320,952 filed May 27, 1999, (claiming priority to U.S. Provisional Application 60/087,377 filed May 29, 1998), entitled "Multi-Language Phrase Editor and Method Thereof", now U.S. Pat. No. 6,466,900 issued Oct. 15, 2002, each of which is incorporated herein by this reference.

This application is a continuation-in-part of U.S. patent application Ser. No. 09/668,112 filed Sep. 22, 2000 (claiming priority to U.S. Provisional Application No. 60/155,853 Sep. 24, 1999) entitled "Method and System for Single Sign-On User Access to Multiple Web Servers", each of which is incorporated herein by this reference.

This application is a continuation-in-part of U.S. patent application Ser. No. 09/671,424 filed Sep. 27, 2000, entitled "System and Method for Delivering Financial Services", which is a continuation-in-part of U.S. patent application Ser. No. 09/323,210 filed Jun. 1, 1999, entitled "System and Method for Delivering Financial Services", which is a continuation of U.S. patent application Ser. No. 08/908,413 filed Aug. 7, 1997 (claiming priority to U.S. Provisional Application No. 60/029,209 filed Oct. 31, 1996), entitled "System and Method for Delivering Financial Services", now U.S. Pat. No. 5,933,816 issued Aug. 3, 1999, each of which is incorporated herein by this reference.

This application is a continuation-in-part of U.S. patent application Ser. No. 09/736,760 filed Dec. 13, 2000, (claiming priority to U.S. Provisional Application No. 60/170,658 filed Dec. 14, 1999) entitled "Method and System for Managing Financial Transaction Information", each of which is incorporated herein by this reference.

This application is a continuation-in-part of U.S. patent application Ser. No. 09/832,863 filed Apr. 12, 2001, (claiming priority to U.S. Provisional Application No. 60/258,495 filed Dec. 29, 2000) entitled "Method and System for Conducting Commerce Over a Wireless Communication Network", each of which is incorporated herein by this reference.

FIELD OF THE INVENTION

The present invention relates generally to the field of on-line financial institution services, and more particularly to methods and systems for implementing on-line financial institution services, such as on-line banking, alerts, portal building, and authentication services, via a single physical and logical platform.

BACKGROUND OF THE INVENTION

Over time, a global financial institution, such as a global bank, may develop a significant number of separate systems for use in its on-line consumer banking product which raises technology-based issues, as well as business-based issues, for the financial institution. Such separate systems typically grow up over time on different platforms developed to meet particular problems and may have been deployed, for example, on their own technology or may be based on inherited technology. For example, the financial institution may have an online banking system to support banking transactions for its customers deployed in various businesses worldwide on a proprietary application server and running, for example, on NT.

The financial institution may also have a separate system built to provide an alerting capability to send email or mobile phone alerts to customers for various banking events likewise deployed in various countries that also runs, for example, on NT, but on MICROSOFT Application Server. In addition, the financial institution may have a portal project that allows the building of a customized home page when a customer signs on, along with a platform that supports non-financial content that a business can manage, deployed in various businesses, for example, on JAVA 2 ENTERPRISE EDITION ("J2EE") Server. Further, the financial institution may have an inherited technology portal product based on commercially available products, such as BROADVISION Application Server, as well as an authentication system, for example, that is proprietary, deployed elsewhere.

A business issue raised by all of theses separate systems is that they are not integrated in the sense of being on a single physical platform. For example, they run on different operating systems and different application servers. In most cases, they require their own set-up servers, and they are tied together on a single sign-on configuration. Thus, there is a current need for methods and systems for implementing on-line financial services, such as on-line banking, alerts, portal building, and authentication services, via a single physical and logical platform.

SUMMARY OF THE INVENTION

It is a feature and advantage of the present invention to provide methods and systems for implementing on-line financial institution services, such as on-line banking, alerts, portal building, and authentication services, via a single physical and logical platform.

It is another feature and advantage of the present invention to provide methods and systems for implementing on-line financial institution services via a single physical and logical platform that enable the building of global online banking applications from a single source base that adapt to business rule and language variability across regions, countries and businesses.

It is an additional feature and advantage of the present invention to provide methods and systems for implementing on-line financial institution services via a single physical and logical platform that enable the deployment of global online banking apps in a J2EE container for multiple businesses, while at the same time maintaining the ability for each business to have its own software versions and levels without affecting other businesses within the same container.

It is a further feature and advantage of the present invention to provide methods and systems for implementing on-line financial institution services via a single physical and logical platform that allows a bank region, via a business hierarchy, to both inherit business rules, phrases and other content from a standard base, and also to have individual country/business variation thru a business hierarchy database structure for content such as phrases, rules etc.

It is a still further feature and advantage of the present invention to provide methods and systems for implementing on-line financial institution services via a single physical and logical platform that allows for a graceful, online cutover from one version of software to another, on a per country basis without the need to shut down an application server.

It is still another feature and advantage of the present invention to provide methods and systems for implementing on-line financial institution services via a single physical and logical platform that caches various content, such as rules, phrases, HTML etc., in memory in order to eliminate database access and decrease response time.

It is yet another feature and advantage of the present invention to provide methods and systems for implementing on-line financial institution services via a single physical and logical platform that enables the financial institution to allow a business through cache controllers and an admin counsel, for example, to change a business rule or update business phrases and then cause the running system to purchase and update current content in a running system.

It is an additional feature and advantage of the present invention to provide methods and systems for implementing on-line financial institution services via a single physical and logical platform that provides a thread safe integration of Struts and Tiles with a concurrent thread package in a way that allows multiple portlets to be spawned from a single home page request and be processed in such a way that each portlet can run in a thread safe way.

It is a further feature and advantage of the present invention to provide methods and systems for implementing on-line financial institution services via a single physical and logical platform that provides security protection for all requests via the use of a site entrance filter that filters all requests and provides automatic authorization role provisioning, authorization checks, and cross-site scripting checks.

It is another feature and advantage of the present invention to provide methods and systems for implementing on-line financial institution services via a single physical and logical platform that provides overload protection for a system whose performance has exceeded pre-defined levels ("SLA").

It is still another feature and advantage of the present invention to provide methods and systems for implementing on-line financial institution services via a single physical and logical platform that provides sequence protection of any application without the need for overt procedural code in the application.

It is an additional feature and advantage of the present invention to provide methods and systems for implementing on-line financial institution services via a single physical and logical platform that provides for a user at a client browser to be warned against and/or prohibited from abandoning an in-process transaction.

It is a further feature and advantage of the present invention to provide methods and systems for implementing on-line financial institution services via a single physical and logical platform that enables expression of business rule variability thru the use of standard business rules methods.

It is a still further feature and advantage of the present invention to provide methods and systems for implementing on-line financial institution services via a single physical and logical platform that provides automatic message object generation and transforms, using XML schema definitions, JAVA Architecture for XML Binding ("JAXB"), and message transformation rules from a global abstract interface to a specific regional interface.

It is yet another feature and advantage of the present invention to provide methods and systems for implementing on-line financial institution services via a single physical and logical platform that provides a connectivity to external banking hosts via the use of standard J2EE Connector Architecture ("JCA").

It is an additional feature and advantage of the present invention to provide methods and systems for implementing on-line financial institution services via a single physical and logical platform that integrates a proprietary authentication system, referred to herein as the Combined Credential Store ("CCS") into a J2EE container.

It is a further feature and advantage of the present invention to provide methods and systems for implementing on-line financial institution services via a single physical and logical platform that provides a clean separation from control and model in a model-view-controller ("MVC") architecture via the use of stateless model helpers.

To achieve the stated and other features, advantages and objects, embodiments of the present invention provide methods and systems for implementing on-line financial institution services, such as on-line banking, alerts, portal building, and authentication services, via a single physical and logical platform, embodiments of which bring a variety of capabilities formerly provided by separate systems, as well as numerous additional capabilities, onto the single physical and logical platform, referred to herein as the JAVA Financial Platform ("JFP"). JFP for embodiments of the invention includes, for example, on-line banking transactions, alerting capabilities, portal building, and authentication, which run on a standard J2EE Application Server and make the issue of operating system and hardware independent of the development decision. Having JFP based on J2EE provides a great deal of flexibility in terms of the operating systems or hardware on which it runs.

The benefits of JFP for embodiments of the invention serve to unify the logical physical architecture of the financial institution's systems. Placing all of these functions on the same application servers allows them to all share the same session context without the need for a single sign-on, provides an opportunity for cost savings via server consolidation, and provides a large degree of flexibility in terms of hardware. JFP for embodiments of the invention is a JAVA view control framework that provides the financial institution's customer, for example, with banking applications, alerts, and portal applications, as well as the shared set of facilities that are used by all the applications in terms of language, rules, logging, authentication, authorization, and security, referred to as shared portal services related to navigation, personalization, customization, compositing, and content serving.

JFP for embodiments of the invention provides a system and method for architecting, designing, packaging and deploying global online banking applications in a J2EE environment. JFP enables the building of global online banking applications from a single source base that adapt to business rule and language variability across regions, countries and businesses. It also enables the deployment of global online banking apps in a J2EE container for multiple businesses, while at the same time maintaining the ability for each business to have its own software versions and levels without affecting other businesses within the same container. This is accomplished by creating separate web apps for each individual business. Thus, separate web app context can be created for each individual business, all of which are allowed to run in the same J2EE container, while at the same time, keeping each business separate, so that particular businesses who want different versions or levels of software can be accommodated.

Embodiments of the invention provide methods and systems for implementing on-line financial institution services via a single physical and logical platform, in which multiple applications consisting, for example, of on-line banking, alert, portal building, and authentication applications run on the same application server for multiple businesses, while allowing each of the businesses to select different software versions independent of one another. Creating separate web apps for each of the businesses allows separate web app context to be created for each of the businesses running in the same servlet container while keeping each business separate and allowing multiple businesses to share the same session context.

In an embodiment of the invention, a shared set of facilities, such as languages, business rules, navigation, personalization, content, customization, compositing, logging, authentication, authorization, and security services, is provided for use by all of the applications. Further, content is provided for each business, such as language, business rules, and personalization via a business hierarchy database structure, and businesses are allowed to inherit business rules, language and other content from a standard base while allowing individual country and business variation.

An embodiment of the invention involves, for example, caching content in memory to eliminate database access and decrease response time, as well as caching rules, phrases, and HTML content in memory and dynamically updating caches in a running system using specific cache controller classes. Thus, all of the financial institution's business rules and language phrases, and at least a portion of its content, are cached in memory, and each business is allowed, through cache controllers and an admin counsel, options to change a business rule or update business phrases and to cause a running system to purchase current content and update content in the running system.

Embodiments of the invention allow orderly, online cutover from one version of an application to another on a per country basis without requiring shut-down of the application server. This is accomplished, for example, via use of forwarding and drain servlet filters that enable forwarding of new session requests to a new version of software, while at the same time supporting existing sessions on an old version of the software. The forwarding and drain servlet filters look at all the new requests and determine for a particular business where the new session requests should be forwarded based on a configuration file. Thus, a business is allowed to install a new version of software while existing sessions are allowed to run against the old version of software, and new session requests are directed to the new version without shut-down of the application server.

An embodiment of the invention provides integration, for example, of a model-view-control framework and a companion open source framework that provides server-side page composition and layout with a concurrent parallel thread package in a manner such that multiple portlets are allowed to be spawned from a single home page request and to be processed so that each portlet runs in a thread safe way. In this aspect, each portlet is provided with its own cloned copy of request and response objects, thereby allowing each portlet to run in a thread safe way even with non-thread safe implementations of request/response objects.

Further embodiments of the invention provide security protection for all home page requests via use of a site entrance filter for filtering all requests and by providing automatic authorization role provisioning, authorization checks, and cross-site scripting checks. In this aspect, the site entrance filter is a central filter that checks all requests for new sessions and insures that all new session requests are provided with a new session object and a default profile object with the role set to a lowest entitled user. The site entrance filter insures that all requests undergo an authorization check based on the user role and other information. Thus, all requests call out to an authorization check to confirm a user's level of authorization. Additional embodiments of the invention, integrate the authentication application into a servlet container.

Other embodiments of the invention provide overload protection for any application whose performance has exceeded pre-defined levels using, for example, a site entrance filter to refuse new session requests if a baseline performance of a system has exceeded pre-defined levels. Thus, portlets are automatically disabled from a home page if a portlet exceeds pre-defined levels. This aspect provides an orderly shut-off or disabling of portlets if individual functions exceed the pre-defined levels, and the portlets are taken out of rotation if a pre-determined time to gather data from external sources is exceeded, while allowing a system to continue running for a user.

Embodiments of the invention also provide sequence protection of any application without requiring overt procedural code in the application. In such embodiments, extending action mappings are extended to allow declaring that an action mapping is an entry point whereby an attempt to access request to an action mapping that is not marked as an entry point for which there is no existing subappcontext is automatically refused. An aspect of such embodiments involves declaring that every action mapping is sequence protected. In another aspect of such embodiments, a token embodied in a hidden field and set via a custom tag must be present in order to access the action mapping.

Other embodiments of the invention involve, for example, informing a user who accesses an application at a client browser and attempts to navigate away from an in-process transaction that the transaction is incomplete. The user can be given a warning that the transaction is incomplete or the user can be prohibited from navigating away from the incomplete transaction. The warning aspect involves, for example, declaring by an application that the user should be warned if the user attempts to navigate away from a currently incomplete transaction via the use of custom tags, and the prohibiting aspect involves declaring by an application that the user should be prohibited from navigating away from a currently incomplete transaction at pre-determined commit points in a screen sequence via the use of custom tags.

Embodiments of the invention also allow expression of variability of business rules via use of standard business rules methods. Such business rules methods ask standard questions of business objects, and the answers are embodied offline in the form of XML data whose content is read-in, transformed and embedded or cached in business objects. Further, the business rule objects are organized in terms of business, product and transaction hierarchy, whereby business rules can be addressed at a granularity of individual transactions within a product and business structure Further embodiments provide a separation from control and model in a MVC framework via the use of stateless model helpers. The stateless model helpers provide discrete functionality that is independent of a sequence of an application and independent of other model helpers. Other embodiments provide automatic generation of message objects and transforms using XML schema definitions, JAXB, and message transformation rules from a global abstract interface to a specific regional interface. Still other embodiments provide a connectivity to external banking hosts via use of standard JCA connector framework.

Additional objects, advantages and novel features of the invention will be set forth in part in the description which follows, and in part will become more apparent to those skilled in the art upon examination of the following, or may be learned from practice of the invention.

BRIEF DESCRIPTION OF THE DRAWINGS

FIG. 1 is a schematic diagram that illustrates an overview example of the JFP architecture for embodiments of the invention;

FIG. 2 is a schematic diagram that shows an example of the common and portal services of the JFP architecture for embodiments of the invention;

FIG. 12 is a table that illustrates an example of the structure of staging areas ("SAs") case for the first-time JFP installation for embodiments of the invention;

FIG. 13 is a table that illustrates an example of the structure of the media repackaged as a single package per CD for the first-time JFP installation for embodiments of the invention;

FIG. 14 is a table that illustrates an example of the structure of the SAs for the first-time JFP installation with the ship media repackaged as a single package per CD for embodiments of the invention;

FIG. 15 is a table that illustrates an example of the structure of the ship media for a subsequent installation of new regional applications for embodiments of the invention;

FIG. 16 is a table that illustrates an example of the structure of the SAs for the subsequent installation of new regional applications for embodiments of the invention;

FIG. 18 is a table that illustrates an example of the structure of the SAs for the subsequent incremental installation with one package (i.e., field pPatch) for embodiments of the invention;

DETAILED DESCRIPTION

Figure 3:
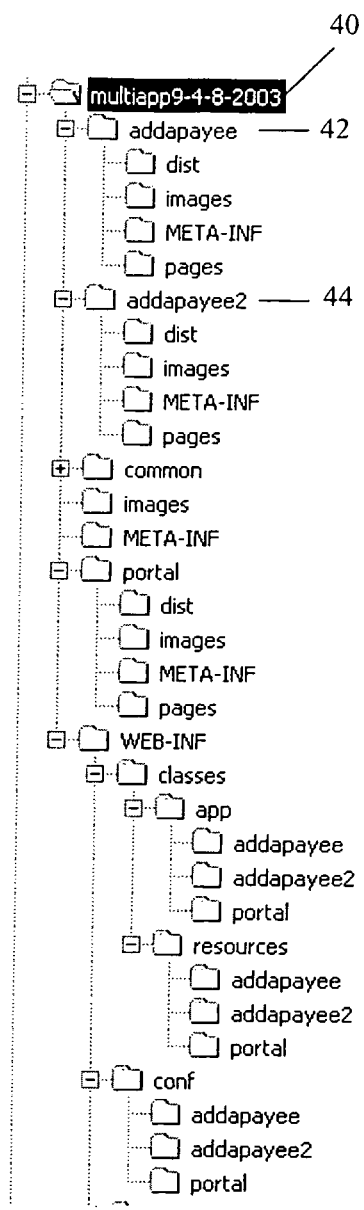
FIG. 3 is a directory structure that shows an example of the deployment of each sub-app or module inside a single web-app context of JFP for embodiments of the invention.

As required, detailed features and embodiments of the invention are disclosed herein. However, it is to be understood that the disclosed features and embodiments are merely exemplary of the invention that may be embodied in various and alternative forms. The figures are not necessarily to scale, and some features may be exaggerated or minimized to show details of particular components. Therefore, specific structural and functional details disclosed herein, and any particular combination of these details, are not to be interpreted as limiting, but merely as a basis for claims and as a representative basis for teaching one skilled in the art to variously employ the invention.

Overview

Referring now in detail to embodiments of the invention, examples of which are illustrated in the accompanying drawings, the Java Financial Platform ("JFP") for embodiments of the invention provides systems and methods for architecting, designing, packaging and deploying global online banking applications in a J2EE environment. In addition, JFP for embodiments of the invention enables the building of global online banking applications from a single source base that adapt to business rule and language variability across regions, countries and businesses.

JFP for embodiments of the invention also enables the deployment of global online banking apps in a J2EE container for multiple businesses, while at the same time maintaining the ability for each business to have its own software versions and levels without affecting other businesses within the same container. This is accomplished by creating separate webapps for each individual business. Thus, separate web app context can be created for each individual business, all of which are allowed to run in the same J2EE container, while at the same time, keeping each business separate, so that a particular business that wants different versions or levels of software can be accommodated.

JFP for embodiments of the invention provides, within a J2EE Application Server, an integrated customer experience for global online consumer banking that includes a financial institution's existing functionality, such as its global online consumer banking functionality, its email and alerts functionality, its consumer bank portal toolkit, its J2EE-based authentication and credential storage system, and its trust-chain single sign-on ("SSO") mechanism that creates and checks signed and encrypted SSO tokens.

In embodiments of the invention, JFP provides interactive consumer bank applications that run in J2EE Application Servers. These J2EE Application Servers exist behind the firewall and talk to the Internet via web servers in the DMZ. These JFP application servers, in turn, communicate with various consumer bank transaction processing systems (sometimes referred to herein as "TPS", "SFS", "BAFES" etc.) via message-based communications. JFP application servers are responsible for the interaction with customers using web browsers or other web-based protocols or devices. JFP application servers are also responsible for authenticating customers, providing menus of functionality and information and for carrying out the interactive dialogs with the customer for any selected banking functionality or information requests. JFP application servers provide a single place where consumer bank customers can access banking functionality, alerts functionality, and portal functionality (e.g. consolidated home page, portlets etc.)

Primary design features of JFP include, for example, a framework for developing and running complex internationalized consumer banking applications in a J2EE environment; support for multiple businesses, languages, business rules and release versions on a single centralized server or multiple de-centralized servers with full continuity of business; a select-a-model view controller framework capable of supporting multi-business, internationalized consumer banking applications; and enhanced MVC framework with domain specific "parts" or "services" needed to fulfill the business mission. In addition, such design features include, for example, domain specific parts or services that are independent of each other so they can be used in various combinations and reused as independent parts in other projects; support for logical or physical integration/federation with existing third party banking services/portals; reuse of certain existing data, tools, mechanisms, processes and specifications from existing global consumer banking applications; and reuse of existing business rule gathering processes, rule data, phase data, message class generators and presentation templates.

A main advantage of JFP for embodiments of the invention is the provision of a single integrated J2EE system that provides internationalized, multi-business support for online banking functionality, alerts functionality and portal functionality. The JFP applications is able to run on multiple operating systems and multiple hardware platforms, which allows businesses to scale vertically and horizontally. The JFP applications are built to run on J2EE compliant servlet containers, and vendor specific features are avoided.

In an embodiment of the invention, deployment can be, for example, on WebLogic Express from BEA Systems. JFP applications, such as online banking, alerts functionality, and portal services are integrated and enabled to run within the same JVM and servlet container and to share the same core services, such as session, authentication, logging etc. The JFP architecture allows use of off-the-shelf monitoring tools to monitor and inspect the health of the system. The servers running JFP are able to support multiple businesses. Each business running JFP applications is able to independently control the software release level that it wants to use, so that the servers running JFP applications are able to scale vertically and/or horizontally.

The JFP application design and packaging for embodiments of the invention allow online deployment changes and minimize server downtime to administer changes. JFP components are built, packaged and released independent of each other. JFP development leverages industry and open source frameworks and focuses on building value-added domain specific parts and applications. JFP also preserves the existing investment in phrase database and rule data. JFP applications adhere to the facilities and constraints of standard J2EE servlet containers. Developing applications in JFP is less expensive than current NTDS based application development, and JFP can be implemented in such a way as to minimize the impact on backend systems, such as BAFES, SFS and TPS. JFP applications meet all known existing business rule requirements. For example, JFP banking applications meet all online banking rule requirements.

JFP applications for embodiments of the invention are globally enabled (e.g. language, rules), designed consistent with standard J2EE MVC design patterns, utilize the Struts open source framework that supports the MVC design pattern, and run frameless or in frames. JFP applications support portlet homepage views, full page views" and "web services views" as appropriate to the requirements of individual apps. JFP applications support presentation customization through various means, including CSS stylesheets, Tiles layout templates etc., and are globally enabled (e.g. language, rules). JFP applications provide stateful integrity but are also navigationally flexible (e.g. back button support etc.), support task level integration with initialization parameters to support portal menu integration and such things as "actionable alerts", and minimize the use of browser cookies.

FIG. 1 is a schematic diagram that illustrates an overview example of the JFP architecture for an embodiment of the invention. The overview example of the JFP architecture shown in FIG. 1 illustrates a number of key concepts. For example, the JFP architecture is concerned with the structure of J2EE-based application server software that provides consumer banking services. The JFP application servers 10 communicate with various consumer bank transaction systems via message-based host adapters 12. All persistent customer financial information is obtained from the transaction systems, and the JFP application servers do not persistently hold customer financial information. The JFP implementation consists of vendor, open source and financial institution supplied software.

JFP interactive applications are built around a model view control (MVC) framework. The MVC framework selected is the open source Struts framework. In addition to Struts as the MVC framework, a companion open source framework called Tiles that provides server-side page composition and layout functionality. The architecture supports MVC dialog pairs all supported by a single Model.

FIG. 2 is a schematic diagram that shows an example of the common and portal services of JFP for embodiments of the inventions. The JFP architecture supports multiple models. Host messaging is supported via abstract message classes. Host targeting is abstracted behind a thin message router. Host communication in terms of specific messaging protocols (e.g. CGMS) is supported by JCA compliant message adapters. JFP has a set of "common" services that provide language support 14, business rule support 16, logging support 18. JFP also has a set of "portal" services that provide navigation support 20, personalization 22, customization support, 24 and contact support 26.

All "common" and "portal" services are abstracted behind APIs 28, which allow plug-able implementations and different implementations overtime and in different deployments. For example a personalization engine for the deployment in one region can be the native JFP personalization engine, an external personalization engine for another region, and BroadVision for still another region.

Embodiments of the invention include the J2EE servlet container environment, the JFP application and services, and request and response flows in the JFP application. The minimum runtime environment required for the JFP platform is a J2EE compliant servlet container or engine, such as BEA's Weblogic Express or IBM's Websphere servlet engines. These J2EE compliant servlet engines, in turn, reside within a standard Java JVM, available from multiple sources. JVMs available for the major operating system platforms include, for example, Unix, Linux, Solaris, NT, Windows 2000 and IBM.

Within a J2EE compliant servlet engine there are separate contexts called web-application contexts. A major implication of the web-app contexts is that each web-app context has its own set of classloaders, which means that it provides a "firewall" for class scope. For example, classes with identical names but at different versions of implementation can exist in different web-app contexts, and each web-app context instantiates its own set of classes. Another major implication of the web-app contexts is that all code (i.e. servlets, JSPs, Java classes etc.) within a web-app context can share a session context.

In the JFP deployment approach for embodiments of the invention, support is provided for multiple businesses at potentially different versions of software for each business on the same server or set of servers. All software for a particular business is able to share session context. Thus, for the most part, all JFP software for each business for each major release level is deployed into its own web-app context. This provides a natural way to maintain different versions of software for different businesses. It also provides a way for a single business to provide "switchover" and "fallback" between major release levels by establishing a separate web-app context for each major release level.

Further, incremental minor changes to software are made within an established web-app context for a business. Some incremental changes can be made to a web-app context "while it is running", for example, updating JSP files, certain configuration files, rule data, phrases etc. Other incremental changes require starting-stopping a web-app context or the entire servlet engine. To provide the highest level of isolation, each business cans in its own JVM instance, if the processing power of the server hardware can support it. Alternatively multiple businesses can share the same JVM, but as mentioned above, in separate web-app contexts.

In embodiments of the invention, JFP consists of a set of services and applications integrated within a common MVC framework. The JFP services provide a set of share facilities for commonly used services in the architecture. Referring against to FIG. 2, these services can be categorized (arbitrarily) into two main groups consisting respectively of common or shared services (e.g. language 14, rules 16, logging 18) and portal services (e.g. navigation 20, personalization 22, customization 24 and content 26).

While arbitrary, the categorization into "common" and "portal" services relates partially to the origin and purpose of some of these services. For example common services such as language 14 and business rules services 16, emanate primarily from the needs of the JFP banking applications and alert applications and share some aspects of architecture design with similar services in existing financial institution home banking and alert applications. Conversely many of the portal services emanate primarily from existing financial institution portal services and from portal service requirements in existing financial institution online banking services.

The JFP Services are provided to support the JFP applications, and the JFP applications are primarily the interactive applications for banking, alerts etc. provided by the JFP servers. JFP services for embodiments of the invention include, for example, language services 14, business rule services 16, messaging services 30, navigation services 20, personalization services 22, content serving services 26, customization services 24, logging services 18, authentication and authorization services 32, and security services 34.

A JFP banking module for embodiments of the invention can be defined as the set of config files, phrases, servlets, JSP pages etc. that realizes a specific logical banking function. JFP banking modules tend to be logically and physically grouped by the kind of functionality they provide. For example, JFP banking modules include a transfer module, a bill pay module, an account information module etc. It is to be understood that the meaning of the JFP term "application" is not to be confused with the meaning of the J2EE servlet container term "application", which means a unique web application context. Accordingly, the servlet container context is referred to herein as a "web-app context" or a "web-application context" and not simply as an "application".

A distinct banking function, with all its parts packaged together, is referred to herein as a JFP banking module or a JFP banking sub-app. Both words "module" and "sub-app" imply that a particular banking function is self-contained and is one of many separate banking functions. Somewhat less precisely when referring to all JFP banking functions or to JFP applications in general, the words "JFP banking applications" or "JFP applications" may be used herein. A JFP banking module or JFP banking sub-app consists, for example, of its own Struts-config.xml, its own tiles-defs.xml, the module specific set of JSP pages or servlets that supports its view, the module specific set of Java action classes that support its control, the module specific set of Java classes, if any, that support its model, the module specific set of message classes, if any, that support its model, and the language resource bundles specific to this module.

Figure 4:
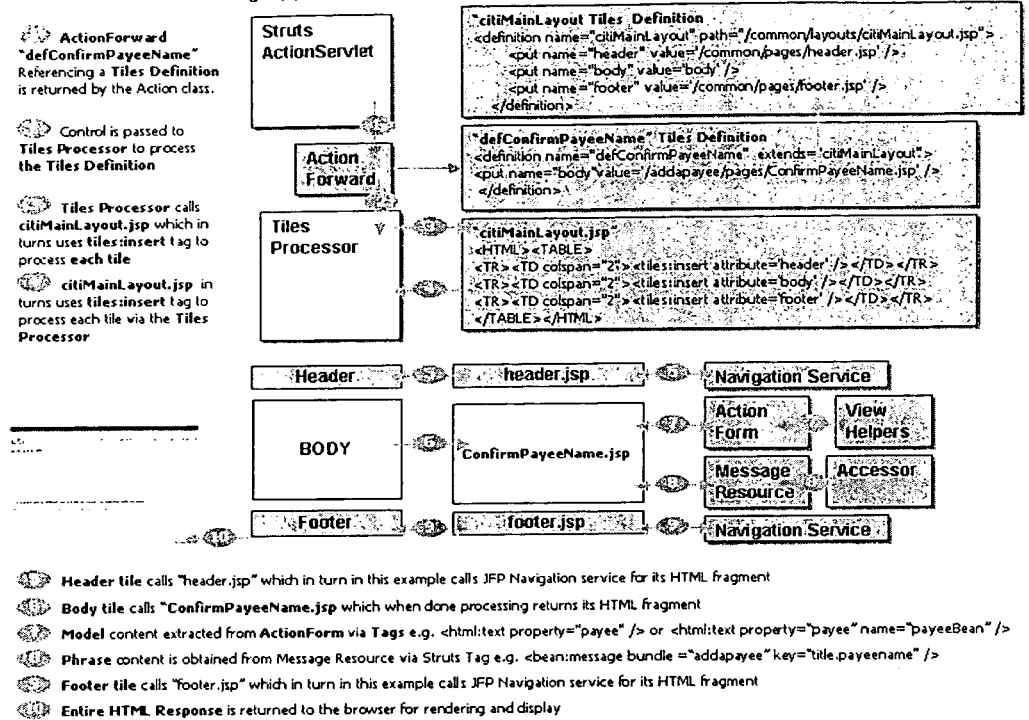
FIG. 4 is a schematic flow diagram that illustrates an overview example of the JFP banking application request flow for embodiments of the invention.
Figure 5:
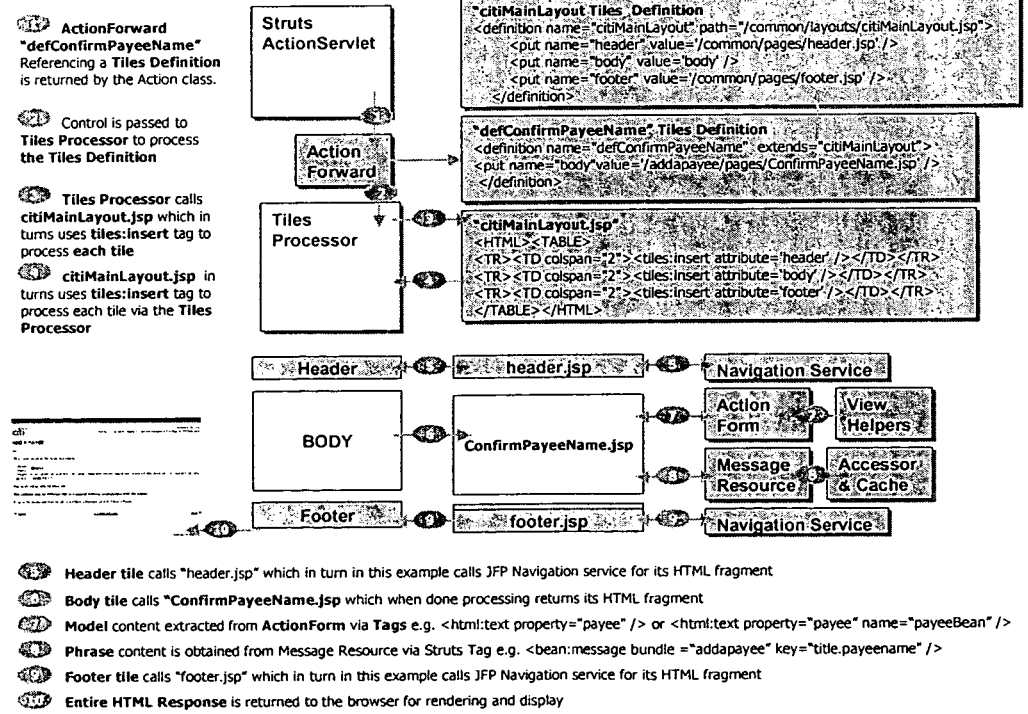
FIG. 5 is a schematic flow diagram that illustrates an overview example of the JFP banking application response flow for embodiments of the invention.

FIG. 3 is a directory structure that shows an example of the deployment of each sub-app or module inside a single web-app context of the JFP for embodiments of the invention. Referring to FIG. 3, the web-app context is named "multiapp9-4-8-2003" 40. Note that each sub-app (e.g., "addapayee" 42, "addapayee2" 44) has its own directory for its JSP pages, for its classes, for its resources and for its config file information. It is to be further understood that the deployment example illustrated in FIG. 3 is only an example of directory structure for deployment and that embodiments of the invention are in no way limited to this particular example of directory structure. FIG. 4 is a schematic flow diagram that illustrates an overview example of the JFP banking application request flow for embodiments of the invention. FIG. 5 is a schematic flow diagram that illustrates an overview example of the JFP banking application response flow for embodiments of the invention.

Deployment

Turning now to JFP product packaging and installation aspects of embodiments of the invention, the JFP product consists of many software components that may be developed by different development groups both in the United States and internationally. For any JFP product deployment, these varied components must integrated and properly configured on target systems.

Figure 6:
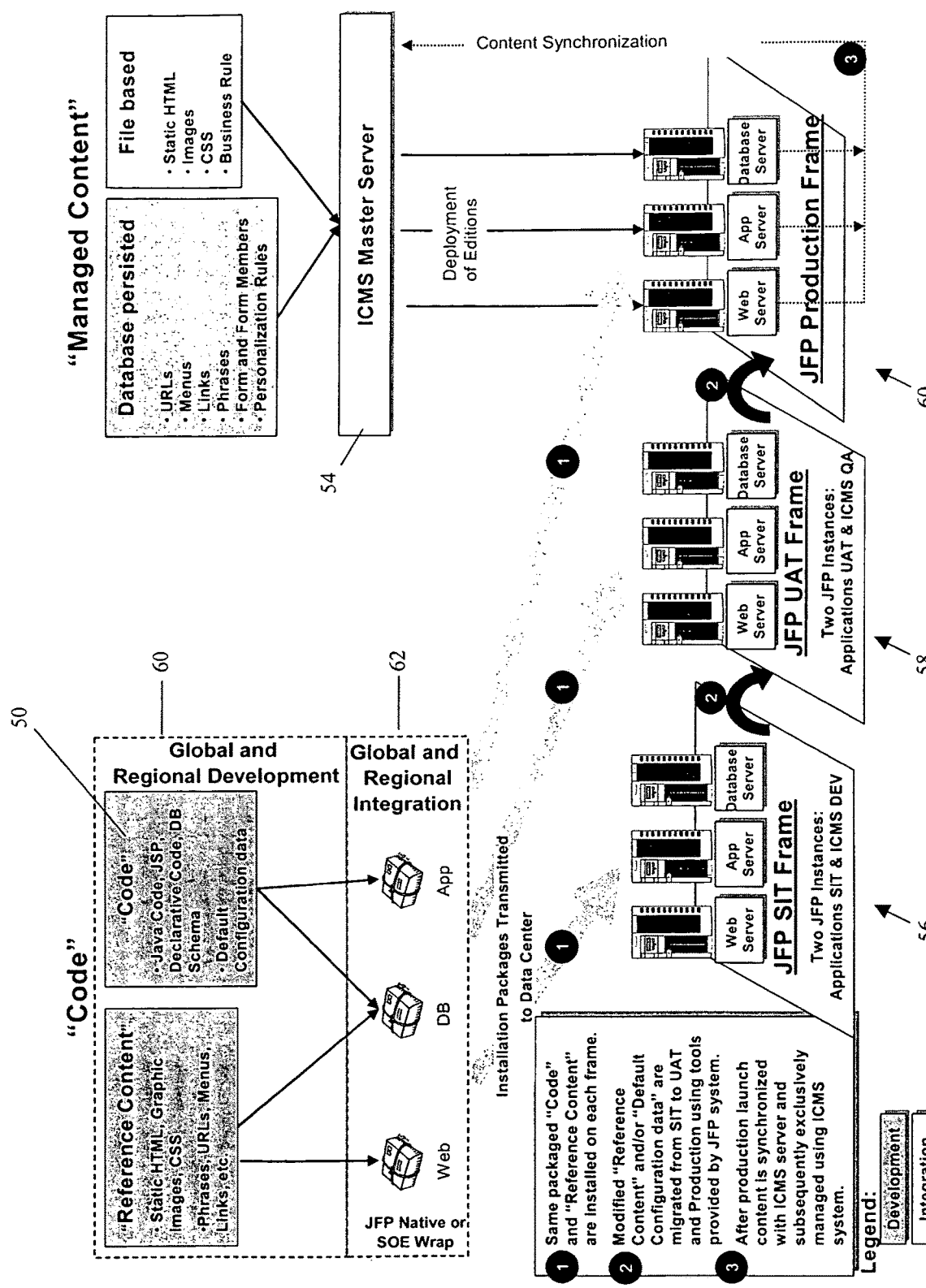
FIG. 6 is a flow diagram that illustrates an example of the process of code and content deployment onto target systems in the JFP of embodiments of the invention.

FIG. 6 is a flow diagram that illustrates an example of the process of "code" and content deployment onto the target systems in the JFP of embodiments of the invention. Software components (i.e., "code" 50) in JFP for embodiments of the invention comprise procedural code (e.g. Java code), declarative code (e.g. struts-config.xml), JSPs, database schema creation scripts, and default configuration data. Additionally, for first-time deployments, "reference content" 52 such as static HTML, graphic images, and CSS are also included in the software shipments. All subsequent changes to the content are managed by the business, typically via a content management system (e.g. ICMS) 54.

Software components are managed by development organizations via a software release and packaging process. Developed "code" is checked into a release management system (e.g. ClearCase). A typical JFP deployment process utilizes, for example, a system integration test ("SIT") system 56 that exists for integrating and testing "code". This is the system onto which changes are installed and tested. The typical JFP deployment process also utilizes, for example, a user acceptance testing ("UAT") system 58 that exists for validating "code". Configuration changes that have been verified in SIT 56 are installed and tested in UAT 58, and additional changes can be applied directly to UAT. Once "code" is validated in UAT 58, it is then installed onto production systems 60. Any default configuration data that has been modified during SIT 56 or UAT 58 will be migrated to the production environment 60.

Historically, large software deployments by a global financial institution may run into deployment problems in the length of time needed for installation and in human error on the part of the installer. An approach to "code" deployment to avoid such problems focuses on automating much of the installation process and minimizing the amount of data entry required from the installer.

Important aspects of "code" deployment in JFP for embodiments of the invention include, for example, key JFP software installation objectives, the target deployment environment, the generic installation process, and use case scenarios that illustrate this process. An approach to "code" deployment focuses on automating much of the installation process and minimizing the amount of data entry required from the installer. This is accomplished, for example, by defining a set of standards and processes to be adhered to in the "code" deployment process.

Figure 7:
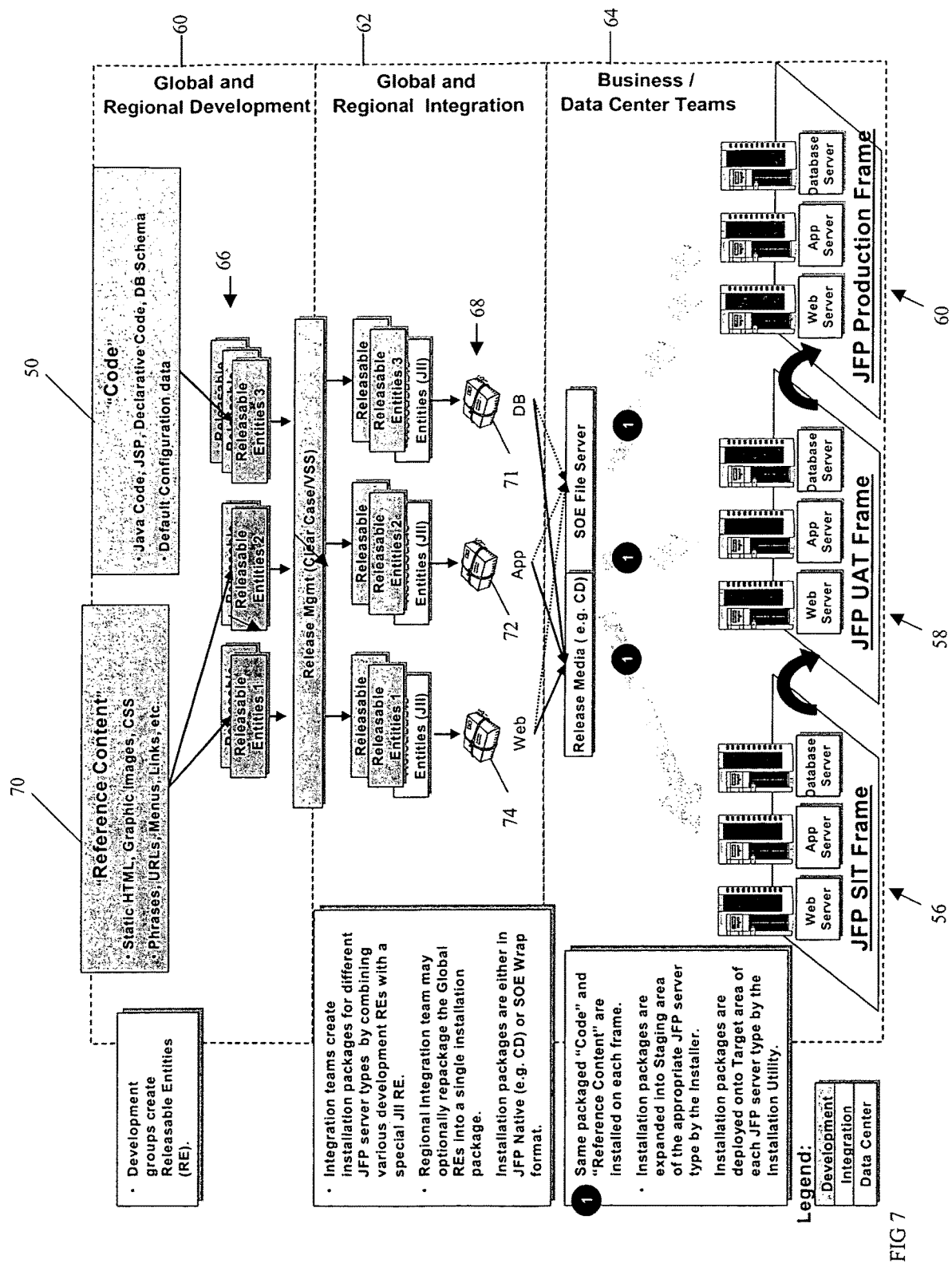
FIG. 7 is a flow diagram that illustrates an example of the process of installing JFP code for an embodiment of the invention.

FIG. 7 is a flow diagram that illustrates an example of the process of installing JFP "code" for an embodiment of the invention. The "code" deployment process involves, for example, development groups 60, integration groups 62, and datacenter personnel 64. Responsibilities of development groups 60 include releasing individual JFP software components. For example, for each JFP software component (e.g. JCP, JPS, JBA, etc.), a development group 60 creates a releasable entity 66 that contains all files that need to be installed (e.g. *.jar, *.sql, *.jsp, etc.), installation script for automated installation of these files to their final deployment location, a list of minimum bootstrap configuration parameters to be collected from the installer, which are generally environment-specific settings, such as server names, IP addresses, the business id, etc., and an optional list of configuration elements to be included in the applicable common configuration files (e.g. custom tag libraries to be included into web.xml for this entity).

Global and regional integration groups 62 are responsible for integrating, packaging, and preparing the individual release media for shipment to a business's datacenter. Such groups' responsibilities include, for example, bundling one or more releasable entities that need to be installed together into an installation package 68 that can be tested, shipped, and installed as a single unit. One or more installation packages 68 can be deployed to the same target location. For example, there may be one package containing all global JFP components and another package containing regional applications. Each installation package contains an additional releasable entity called JII installation utility. The overall purpose of this utility is to orchestrate the installation of the other entities within the package in the proper sequence and according to the scripted instructions each entity provides. Separate installation packages are created for each type of target server. For example, a database package 70, an application server package 72, and/or a web server package 74 may be created. Regional integration group(s) 62 may optionally repackage global and regional releasable entities into a single package for each type of target server in the data center.

Datacenter personnel 64 responsibilities include installing JFP shipments. A datacenter receives installation packages 68 provided by various integration groups 62 for subsequent installation. The installer designates a staging area on each target server. This is a repository location for all the first time and subsequent installation packages required for that server. The installer manually invokes the JII installation utility for each installation package, according to the sequence defined in the package shipment instructions. The JII installation utility collects the bootstrap configuration information, either from configuration files, command-line parameters, or by prompting the installer. The collected bootstrap configuration parameters are placed in appropriate configuration files (property files or database insert scripts) via token substitution. An installation package can be reused to install the same JFP shipment (software releases) many times. For example, the same application server package can be installed several times in a multi-business environment.

Referring to FIG. 7, the individual releasable entities are provided by the global 60 or regional 62 development groups to their respective integration group 64. Releasable entities may typically contain "code" or "reference content" 70 or both. "Reference content" 70 is default data used for first-time deployments, and further changes to the content are managed by the business. Release management (configuration management) is an integral part of the process. These releasable entities are subsequently packaged by the integration group 62 into an installation package 68, and shipped to the data center(s). Packages 68 can be of different formats (JFP native package, SOE Wrap—Unix Package). The type of a package determines how it gets to the target server (e.g. in the case of a SOE wrap, an SOE file server will be used).

As mentioned, the installation process on a given target node is a two-step process. First, the releasable entities ("code" 50 and "reference content" 70) in the packages 68 are installed onto a staging area. Then, the releasable entities are installed (deployed) into the final location on the target server. Bootstrap parameters are collected prior to deployment onto final location. Deployment is done in phases, i.e., installation into SIT 56, UAT 58, and then production frames 60. The same installation packages are used for each frame. Configuration data changes to the shipped default values are migrated from SIT 56 to UAT 58, and from UAT to production environments 60. Modified "reference content" 70 is migrated from SIT 56 to UAT 58 and production 60 using tools provided by the JFP system. After production launch content is synchronized with the ICMS server 54 and subsequently exclusively managed using the ICMS system.

Aspects of the installation process for embodiments of the invention include, for example, automation, OS independence, full and incremental installation, installation order, versioning support, SOE compliance, minimal configuration, common/shared files, regional applications support, installation log and installation validation. The installation process is extensively automated to minimize the time necessary to install and configure the product as well as to reduce the number of potential human errors usually associated with manual steps. The installation is OS system independent, allowing for the installation process to work in any operating system environment (e.g. Solaris, Windows, Linux). The installation process is able to support full installations of the product as well as incremental (including patches) installations. The installation process provides the flexibility to define the installation order for individual software releases that must be installed together, because software releases may have installation interdependencies.

A JFP system administrator is able to determine which shipment has been installed on the target node, including the version of each software release installed for a given business. The version info is explicit to include the package name, software version id (e.g., JPS 1.2.3), and software release id (e.g., JPS994m2). The installation process is done in a manner that renders itself well for SOE-compliant installation if required. This implies that a Unix Package is created to represent an "installation package". SOE utilities such as SPUD Multi-Server Package Update utility ("SPUD") are used to transmit these packages from the SOE central file server to target servers in the data center 64.

The installation process minimizes the interactive configuration data entry required from the installer. The parameters obtained from the installer are automatically populated in the component-specific configuration files. These parameters are retained for future use in reinstallations. Note that default values for the remaining parameters can be shipped with each releasable entity (these are in property files or DB configuration scripts). A mechanism can be provided (e.g. configuration tool) to customize the configuration parameters on the target system prior to going live.

The installation process is able to handle the shared common files (e.g. web.xml) in a dynamic automated fashion, i.e., the installation process is able to collect and place configuration information required by single or several components into the respective common files. The installation process supports the installation of regional applications and is generic enough so that regional applications can be installed as part of the same process. The installation process maintains a log which includes, among other things, the installation completion status.

In a pre-installation aspect, the installation process confirms that the target environment is ready for the actual installation to proceed (e.g., verify that the required vendor software is present on the target node), and in a post-installation aspect, the installation process facilitates the execution of the optional validation checks provided by the releasable entities 66 included in the package 68. The checks can be a set of installation validation tests that can be run after completion of the installation in order to determine if the product was installed successfully. They can also be a set of tests to check the configuration values. A mechanism to review the configuration values remotely can be provided.

Figure 8:
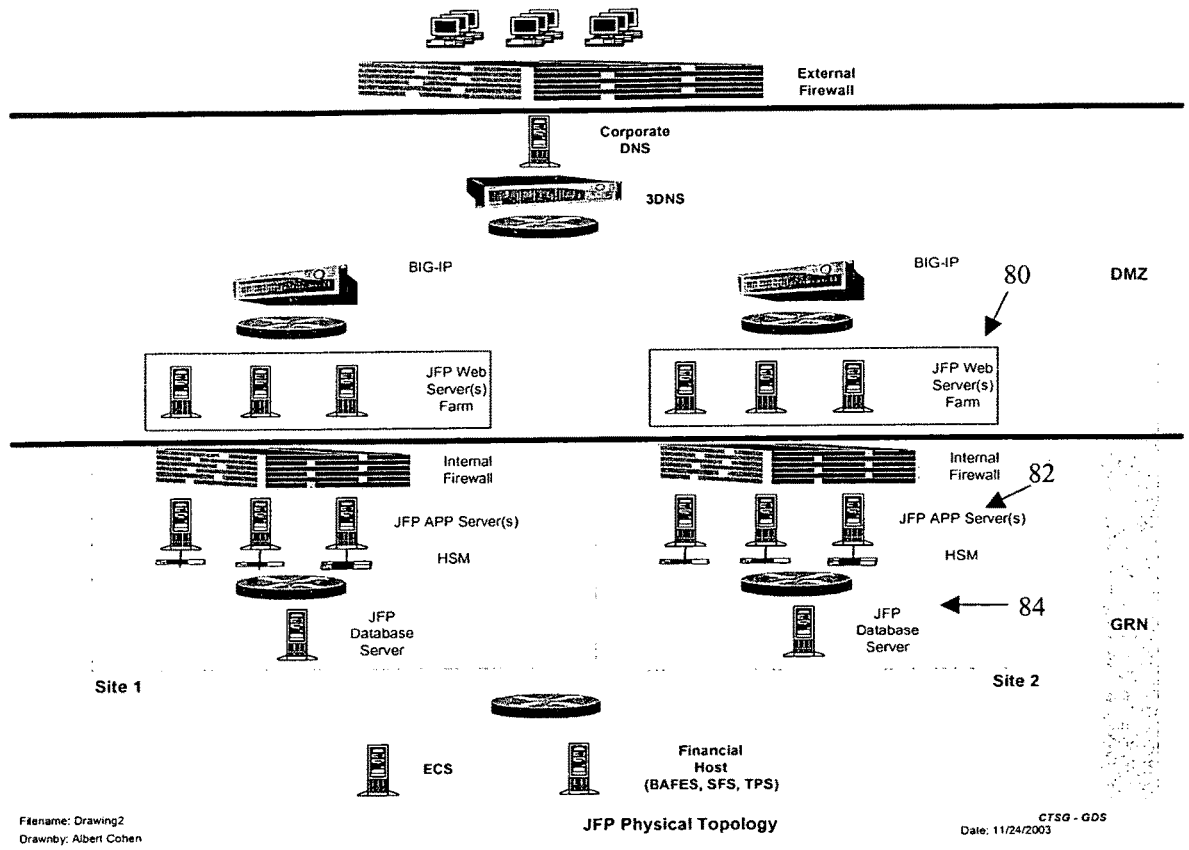
FIG. 8 is a schematic diagram that shows examples of key components of the physical architecture of JFP for embodiments of the invention.

FIG. 8 is a schematic diagram that shows examples of key components of the physical architecture of the JFP for embodiments of the invention. The target environment for JFP comprises, for example, web servers 80, application servers 82, and database servers 84. JFP can run, for example, on Sun servers with Solaris operating systems. JFP for embodiments of the invention utilizes an installation process that can also be applied to install releasable entities 66 onto the different types of servers (database 84, application 82, and web servers 80). The workflow of the installation process involves, for example, aspects of packaging, installation onto staging area, installation onto target area, configuration, and installation validation. The software to be installed is shipped in installation packages which are first installed onto the staging area. From the staging area, these packages are installed into the target deployment area, which involves single package installation, multiple package installation, first-time installation, subsequent installations, handling of common/shared files. It may be necessary to perform customizations after installation of the software prior to going live, and steps must be performed to validate the installation integrity of the installed components prior to going live.

Figure 9:
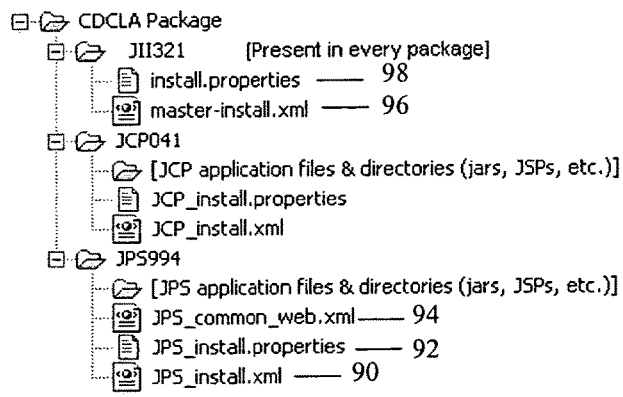
FIG. 9 shows a directory structure that illustrates an example of a package from a global development group for embodiments of the invention.

FIG. 9 shows a directory structure that illustrates an example of a package from a Global Development Group for embodiments of the-invention. In the packaging aspect, the development group 60 for each component creates a releasable entity 66 by adding required files needed for the proposed installation framework, which allows for an arbitrary combination of packaged releasable entities 68 to be installed as a single unit, as long as each included releasable entity abides by a pre-defined set of rules. One such rule is that the releasable entity must have an XXX_install.xml file 90 (ANT script) under its root directory, where XXX may be anything, but would be preferred to be the component's release abbreviation (e.g. JPS). Another such rule is that the releasable entity can additionally provide an XXX_install.properties file 92. This file contains the initial configuration parameters needed for the component's "bootstrap" information. These parameters are used to replace the properties needed by the component during runtime. An additional rule is that the releasable entity can additionally include an XXX_version.in file. This file contains the version information of the component being installed (e.g. "JCP041_h03). If this file is provided, then this version information is used for history and logging purposes. A further rule is that, if applicable, the releasable entity can provide a file (e.g. XXX_common_web.xml) 94 that contains the data that it needs to be included in the common files. A still further such rule is that the releasable entity exists in its own directory, which is under the common package root directory on the same level as the installation utility.

The various JFP releasable entities 66 are integrated into either single or multiple installation packages 68 for subsequent shipment and installation in the business data centers 64. Each package 68 contains releasable entities 66 that are to be installed onto the target machine. The installation framework supports many different packaging formats. For example, for Unix platforms, the packages can be collections of Solaris Unix packages, or just collections of content files (e.g. jar files, JSPs, SQL scripts, etc.). For Windows platforms, the packages can be Windows cab files or zip files. For Sun Solaris target machines, packaging the JFP releasable entities as a Solaris UNIX package allows the JFP software to be SOE-compliant if required. In general, Solaris packages include very robust options for running scripts, including during the pre-installation phase (preinstall), post-installation phase (post-install), pre-removal phase (pre-remove), and post-removal phase (post-remove).

There are separate packages for the database 84, application 82, and web servers 80. Using the JPS component of an application server package as an example, the JPS directory contains among other things the files that are to be installed (copied) into the target area. The database server package may contain, among other things, the SQL scripts to create the database schema. In addition to the releasable entities that are to be installed, the installation utility (JII) provided by the global development group 62 as part of the core product is shipped within each installation package 68. This utility executes and orchestrates the actual installation of multiple releasable entities. The same application server package can be installed for multiple businesses. In the case of an apps server, there is one business per webapp. In this case, multi-business installation is supported by installing the same packaged software components into the respective webapps along with business-specific configuration.

Figure 10:
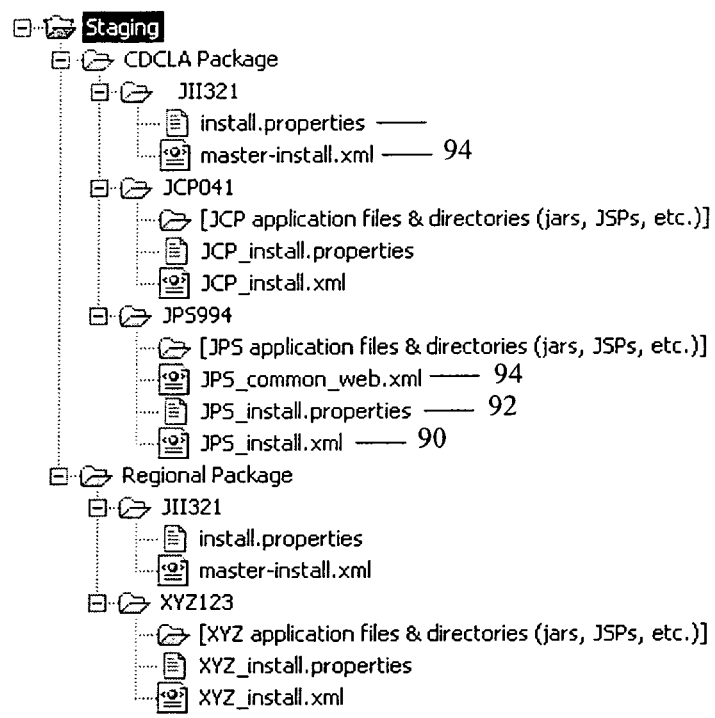
FIG. 10 shows an example of a staging area directory structure for two packages on an application server for embodiments of the invention.

FIG. 10 shows an example of the staging area directory structure for two given packages on an application server for embodiments of the invention. Regarding the installation onto staging area aspect, once certified, the installation package(s) 68 are shipped to the regional data centers 64 for subsequent installation (e.g. UAT 58, production 60). As part of the first step in the installation process, the shipped package is installed into a staging area on the target machine. As a result of this step, all the releasable entities included in the package resides under one common directory. Using a staging area has certain advantages. For example, the installation packages 68 expanded to the staging area can be re-used for subsequent installations. Further, if Solaris UNIX packages are used, expanding the package 68 into a staging area is necessary to be able to install the same package into different target areas for multiple businesses.

Referring to FIG. 10, JII is the installation utility that contains the master installation script along with some supporting files. This script is an ANT-driven script that is developed once and included with each package to be installed. ANT is a Java-based build tool that is included in the package to achieve self-sufficiency.

The installation onto target area aspect involves, for example, single and multiple package installation, first-time and subsequent installations, and subsequent full and incremental installations. Regarding single package installation, from the staging area, the releasable entities 66 of a given package 68 are individually installed as part of an automated process. In the application server 82, this process installs and minimally configures (e.g. business ID, IPs) the product for the specified business into the business's target directory structure. The same process of installing a given package can be repeated for multiple business installations by specifying the business's target installation directory and business-specific parameters.

In general, the database server contents must be installed before the application server 82. The application server software may either require configuration data from the database or it may be necessary to deposit system information into the database during their installation. To install the releasable entities 66 in the package 68, the master installation script provided in the package 68 (master-install.xml 96) is manually invoked. It makes sure that all the minimally required configuration parameters ("bootstrap") are collected, and then runs the individual installation scripts provided in each releasable entity 66 in a fully automated fashion.

If there are installation order dependencies between components, the order of the individual installation scripts' execution can be defined by a component list as an input to the master-install.xml 96. This component list is typically created by the package integration group 62. This list contains the installation sequence of the components to be installed. For example, if one of the portal services components (JSO) and a banking applications component (JBA) are both included in a package 68 to be installed and JBA needs to be installed before JSO, then the list indicates this dependency; and the master-install.xml 96 runs the JSO component's installation script before it runs the JPS component's installation script.

After installing the components in the component list, the master-install.xml 96 script will install all other components in the package in any order. When run, the master-install.xml 96 script performs pre-defined functions in order. First, for each XXX_install.properties file, it concatenates the provided properties to a temporary master-install.properties file. It is each group's responsibility to provide the minimal bootstrap configuration parameters in the XXX_install.properties file for their respective releasable entity. After the completion of this step all bootstrap information required for the package installation has been identified and is ready to be collected from the installer in the following step. Next, the master-install.xml 96 script prompts the installer to manually customize/edit the newly created master-install.properties file, either through a text editor or a graphical user interface. This information is saved for possible reuse by subsequent installations.

Thereafter, for each releasable entity (taking into consideration any order dependencies), the master-install.xml 96 script runs the corresponding XXX_install.xml (ANT script) which backs up the original files (to allow for a future rollback if necessary), installs (copies) the new files into the target (deployment) area in the case of an application and/or web server; execute the SQL scripts in the case of a database server, substitutes the configuration parameter tokens with the values in the master-install.properties file, creates and/or edits the common files if necessary with information provided in each releasable entity, and saves the version history for subsequent inquiries.

In the case where multiple packages are to be installed for a given business, the process for a single package installation is repeated for each package. The installation sequence of the packages may be important, and in this case the shipment instructions will indicate this order to be manually followed.

The first-time installation is always a full installation, i.e., all the packages to be installed onto a target node are installed. The packages 68 are different depending on the target node (e.g. for the application server 82 the software to be installed includes middleware, banking applications, etc.; for the database server 84 the software to be installed include SQL scripts to be run to create DB schema).

The full installation can be either a single package or a combination of multiple packages, as long as they make up the complete set. The contents of each package will be installed into proper locations as already described above. At this point, the software is installed with the collected bootstrap configuration and the default configuration values that came with the package(s). After installation, there is often a need to customize the configuration values for the installed software. These customizations can be done either manually or via a separate tool. After the configuration process has been completed, the installation is ready to be tested and activated. This whole process can be repeated for multiple businesses.

A subsequent installation can be either full or incremental. In the case of the application 82 and web servers 80, new functionality releases are always full installations (new webapps); patches are incremental installations. For a database server 84, new functionality releases are incremental installations (updates to existing database instances) as long as they are backwards compatible.

The concept of a subsequent full installation is similar to that of a first-time installation, in that the package(s) 68 to be installed make up the complete set. In order to minimize disruption to current live installations, the new subsequent full installation is done on a different location (e.g. on the application server 82 a new webapp is created, on the database server 84 a new database instance is created). Because of this, the original installation is still completely operational during the installation of the new one.

During the part of the installation process where the installer enters values for necessary bootstrap information, the bootstrap values used during previous installation show up as default values for the necessary parameters. The installer enters values for the new required parameters, and can edit the pre-filled ones if necessary. Once the new installation has been configured and tested to function properly, it is used instead.

For an example of an application server 82, assume that during a first-time installation, two packages (CDC software, and regional applications) were installed. Assume also that at a later time, a few more regional applications are developed and packaged, and need to be installed as well. Now, there are a total of three packages to be installed onto the target area, with two of them already installed onto the staging area from the first-time installation. The new package (the third one) is installed onto the same staging area. From there, the complete set is installed to a new webapp separate from the original one.

In this example, the minimal bootstrap configuration values that were saved from the first-time installation are re-used. When the installer is prompted to enter values for the required bootstrap parameters, the ones from the first three packages are defaulted to the saved values, allowing the installer to modify them if necessary. Once the new webapp is installed and configured, proper steps are taken to configure the system to use the new webapp.

Subsequent incremental installations (e.g. patches) may consist of just a few parts of the system, and can be files of any type (e.g. a few jar files on an application server 82, some insertions into tables on the database server 84). An incremental installation is not a full set, and is intended to be installed on top of the existing (live) installation. That is, the files in the incremental installations are copied directly into the target directory (replacing existing older files).

Since changes are made to the live application, special attention needs to be given to the incremental installation process. The same master-install.xml 90 script is invoked to install the upgrades (as previously described), but depending on the nature of the content, the sequence of extra steps necessary before and during the upgrade process must to be specified. For example, the upgrade may require a "green zone" for the duration of the installation; or perhaps the upgrade can be done on the live system and take effect immediately without extra action. The exact operational procedure is provided with the shipment. The individual component's install script may keep a backup of the files that are replaced in order to facilitate installation rollback if required.

In the full versus incremental installation aspect, there are a number of considerations for the database 84, application 82, and web servers 80. Regarding the database server 84, most of the time the changes that need to be made to the database schema and its content are backwards compatible, allowing for the SQL scripts to be executed on the live database as an incremental installation. However, this is not always the case. In the cases where the SQL scripts cause changes that are not backwards compatible, the scripts are run on a new database instance as a subsequent full installation. During the installation and configuration of the new full installation, the original business database is still completely operational. Once the new installation has been configured and tested to function properly, the new database is used instead of the old one. This involves data migration from the old database to the new one.

With regard to the application server 82, new functionality changes to an application server are always full installations. One of the benefits of this is easier rollback. Field patches to resolve field problems are installed as incremental installations. Considerations for the web server 80 are the same as those for the application server 82.

With respect to handling of common/shared files, there are only a few files shared by different JFP software components which include, for example, web.xml, weblogic.xml, and startweblogic.sh. Each packaged releasable entity that requires changes to be made to a shared file provides the information that it needs to be inserted into that file. The installation framework provides a mechanism to merge this information into a single common file.

The installation utility is packaged with a template for each of these common files. If the common file to be edited does not already exist on the target deployment area, then the one included with the utility is used as a template. If the file does exist, then either the existing is used for editing or the one included with the utility is used to replace it completely, depending on what the utility is configured to do.

For example, the installation of portal services (JPS) and middleware (JCP) on an application server 82 requires changes to the web.xml file. Tag libraries, servlet, and filter information from JPS, servlet information from JCP is included in the web.xml file. If a web.xml file does not already exist in the target area, then the installation utility copies the template web.xml over and adds the information that needs to be in it. If the web.xml file does already exist, then the installation utility either adds the information to that file or copies the template over anyway, depending on what it is configured to do.

Regarding the configuration process, after the installation process with the minimal ("bootstrap") configuration is complete, additional configuration steps may be required for further customization. As mentioned earlier, these customizations are done either via manual updates or a separate configuration tool. Since installation/configuration first takes place on the SIT 56 and UAT 58 systems prior to going into production 60, it is highly desirable to be able to export configuration data from these systems into the production environment in order to minimize the number of manual steps during installation. To facilitate this export, the configuration data maintained by the configuration tool on a given frame is exported into an installation package containing the data. This package can then be installed on another system via the same installation utility that is used for software installation.

With regard to the installation validation aspect, manual steps can be executed after the software has been installed and configured. An implementation approach to automated validation is to have each releasable entity optionally provide a sequence of automated test steps (e.g. JUnit tests) to validate the installation and configuration integrity. A separate utility can be developed to run these validation checks.

In regard to the rollback aspect, rollback typically entails rollback of both "code" and corresponding content (phrases, URLs, etc.). Due to the complex nature of this process, rollback can be handled through manual steps. Rollback of a full installation is aided by the fact that the full installation is always installed in a separate physical location. For example, in the case of a full installation on an application server 82, there are two different versions of a webapp and, similarly, in the case of a database server 84 there are two different instances. Therefore, in these cases a full installation is readily available to fall back to.

The following use case scenarios provide examples that illustrate the installation process described above for first-time JFP installation, subsequent installation of new regional applications, and subsequent incremental installation with one package (field patch) for embodiments of the invention. It is to be understood that the use cases presented are presented as examples only and not by way of limitation of the scope of the invention.

Figure 11:
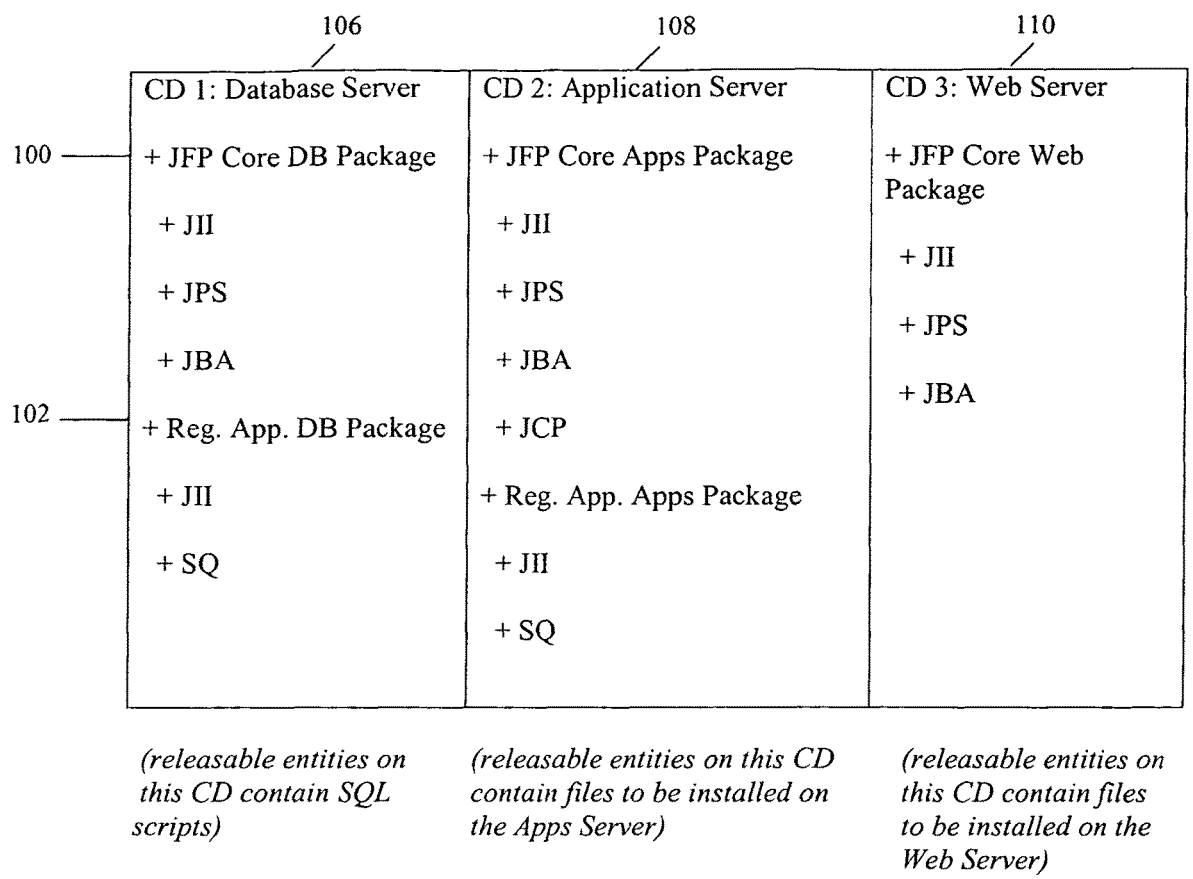
FIG. 11 is a table that illustrates an example of the structure of a ship media a first-time JFP installation for embodiments of the invention.

FIG. 11 is a table that illustrates an example of the structure of the ship media for the use case for a first-time JFP installation for embodiments of the invention. In the use case for a first-time JFP installation for embodiments of the invention, JFP is installed for a single business for the first time onto database 84, application 82, and web servers 80. Since this is a first-time installation, it is a full installation for each server. Assume for this example that JFP core (portal services, banking apps, middleware) 100 and regional application (stock quotes "SQ") 102 are to be installed, that CDs are used for the ship media, and that both the JFP core and regional application packages are included together on the same ship media.

In this example, the ship media is shipped as three CDs, one for each type of server (Database 106, Application 108, and Web 110), with up to three packages on each. It is noted that embodiments of the invention do not preclude combining packages targeted for different servers onto the same CD, in which case, it is the installer's responsibility to extract the proper packages onto the respective target nodes.

In this use case, for each target node, the ship media is expanded into a staging area. FIG. 12 is a table that illustrates an example of the structure of the staging areas (SAs) for the use case for the first-time JFP installation for embodiments of the invention. Packages are installed according to the order prescribed in the shipment instructions by manually invoking the installation utility in each package. In the use case for a first-time JFP installation, it is possible for the packages to be repackaged as a single package per CD. FIG. 13 is a table that illustrates an example of the structure of the ship media repackaged as a single package per CD for the use case for the first-time JFP installation for embodiments of the invention. All of the installation sequence information is reflected in the component list for the package. As a result, with a single package, the complete set of components is installed in the same order as the case with multiple packages. FIG. 14 is a table that illustrates an example of the structure of the SAs for the use case for the first-time JFP installation with the ship media repackaged as a single package per CD for embodiments of the invention.

In the use case for the first-time JFP installation, the installations are done in the following order: 1) database server 84, 2) application server 82, and 3) web server 80. For the database server installation, a new database instance is created as part of the installation. When the master-install.xml 96 is run, the SQL scripts for each releasable entity are executed. These scripts create schema and populate the tables with releasable entity-specific content (e.g. configuration data, phrases, personalization rules). For the application server installation, the files for each releasable entity in each package are copied into the target web application, and for the web server installation, the files for each releasable entity in each package are copied into the proper directories.

In the use case for a subsequent installation of new regional applications, assume that two new regional applications have been developed and are to be installed. In this example, there are two extra CDs. FIG. 15 is a table that illustrates an example of the structure of the ship media for the use case for a subsequent installation of new regional applications for embodiments of the invention. The regional applications II package 102 is expanded into the same staging area into which the first three packages were expanded during the use case for the first-time installation.

FIG. 16 is a table that illustrates an example of the structure of the SAs for the use case for the subsequent installation of new regional applications for embodiments of the invention. In this use case, packages are installed according to the order prescribed in the shipment instructions by manually invoking the installation utility in each package. As part of this process, the installation utility gathers the list of minimal configuration data that is needed for the bootstrap installation. It then prompts the installer to provide these required fields before the installation continues. Since some of the packages that are to be installed have already been installed before, the saved bootstrap data from the previous installation is pre-filled for the installer.

For installation onto the target areas, the subsequent installation of new regional applications is handled in a way similar to first-time JFP installation, but with a few differences. The database server installation is an incremental installation. The scripts for the new package (Reg. App. II DB Package 102) are run on the existing database instance by the installation utility. Since the scripts are backwards compatible, the original business database is still operational during the upgrade process.

For the application server 82, the new packages are installed into a separate webapp than the previous installation. Since the installation is in a new target directory, the original business webapp can remain completely operational during this process. Once the new installation has been configured and tested to function properly, the existing live website is changed to point to the new webapp. This process may involve either "session drainage" or require a "green zone" in order to switch over completely. The web server is not affected in this scenario.

Figure 17:
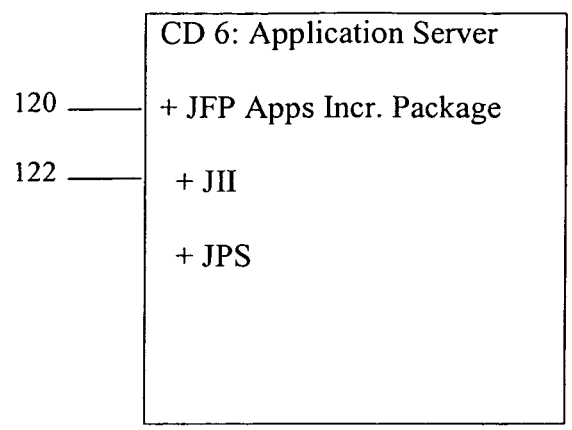
FIG. 17 is a table that illustrates an example of the structure of the ship media for a subsequent incremental installation with one package (i.e, field patch) for embodiments of the invention.

FIG. 17 is a table that illustrates an example of the structure of the ship media for the use case for a subsequent incremental installation with one package (field patch) for embodiments of the invention. In the use case for a subsequent incremental installation with one package (field patch) the previous use case for subsequent installation of new regional applications is assumed to have occurred. In this example, the incremental installation is a patch for portal services to be installed onto the application server 82. The ship media is one CD with a single package, i.e., JFP core (portal services) 102. In this use case, for each target node, the ship media is expanded into the staging area, which contains the installation utility (JII) 122 and a superset of all the releasable entities to be installed.

FIG. 18 is a table that illustrates an example of the structure of the SAs for the use case for the subsequent incremental installation with one package (field patch) for embodiments of the invention. For the incremental package on the apps server 82, the installation utility is manually invoked, which copies over the single jar file. The database server 84is not affected in this particular scenario. For the application server 82, the files in the incremental installation package(s) are copied directly into the webapp (replacing existing older files). Special steps may be necessary since the new files are replacing the ones in a live application. Depending on the nature of the contents of the incremental installation, the sequence of steps necessary during the upgrade (e.g. "green zone" for the duration of the upgrade, redeploying the website after the upgrade, or upgrading the live system without subsequent redeployment) are specified. The web server 80 is not affected in this particular scenario.

A global financial institution deals with areas around the world that it treats as bank regions, such as Asia, Europe, North America, Latin America, and Japan, within which there are typically multiple countries. Thus, Asia includes Singapore, Hong Kong, China, Malaysia, etc., and Europe includes the UK, France, Germany, Spain, Greece, etc., which is usually a management point. According to JFP for embodiments of the invention, a bank region such as Asia is allowed, via a business hierarchy, to both inherit business rules, phrases and other content from a standard base and also have individual country/business variation. This is accomplished thru a business hierarchy database structure for content such as phrases, rules etc.

Business Hierarchy

In embodiments of the invention a business hierarchy support is applied to content, such as phrases and business rules in the JFP. A business hierarchy is way of configuring a business such that the content needed by one business can be inherited from another business. The basic requirement is to avoid duplication of data between the businesses, thereby minimizing the content and reduce the cost of managing the data. The content is stored in a database keyed by hierarchy and is loaded in the cache by following the hierarchy defined in a tree format.

Figure 19:
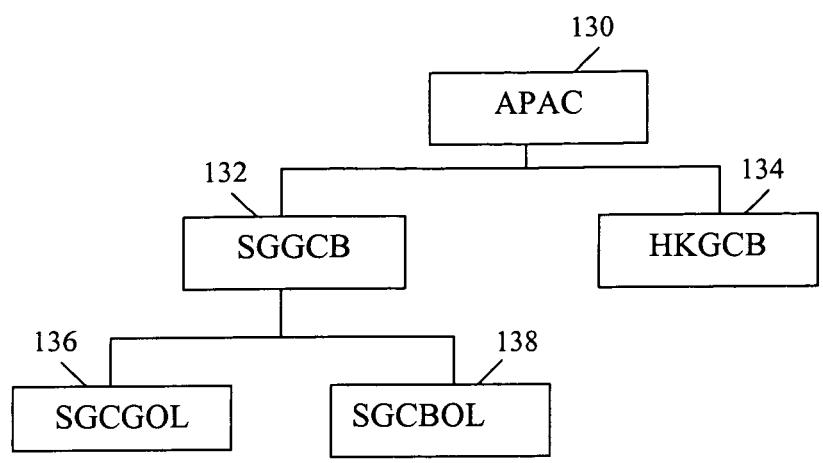
FIG. 19 is a schematic diagram that illustrates an example of a regional business hierarchy, such as Asia, in the JFP for embodiments of the invention.

FIG. 19 is a schematic diagram that illustrates an example of a business hierarchy for Asia in the JFP for embodiments of the invention. At the top of the hierarchy is the content for Asia Pacific region (APAC) 130—content that is common across all businesses and sub-businesses in the region. The middle of the hierarchy contains content for a country or a business such as Singapore (SGGCB) 132 and Hong Kong (HKGCB) 134, and at the lowest level is the content for a sub-business that serves a specific group of customers such as Gold (SGCGOL) 136, Blue (SGCBOL)138, etc. The rationale for such hierarchy is that at the lowest level, the majority of content needed for Gold and Blue is the same as the one at the country level such as Singapore or Hong Kong. Hence instead of duplicating the content wherever applicable, the content at country level is used when running Gold or blue applications.

The business hierarchy in the JFP for embodiments of the invention provides a number of advantages with regard to content management (i.e., storage and maintenance of content). For example, if a new business can use the content for another business that has been previously rolled out, then the new business rollout is faster. In addition, since it is no longer necessary to store duplicate records for the businesses at the different levels in the business hierarchy, the database is used more efficiently. When a content that is the same across different levels in the hierarchy is modified, the changes need to be done only at one level, thus saving the cost of content management as well as reducing the chances for error.

The business hierarchy is implemented by defining relationship between the businesses. A business may choose to have all the content at one level, thus effectively having no hierarchy, or spread the content over as many levels as needed. The trade-off is between ease of content management vs. desired change isolation.

JFP provides, for example, the phrase content needed for banking applications, portal and alert services using one database schema and a common infrastructure to fetch the content at runtime. However, the business rule implementation in these applications is not the same, primarily because the purpose, usage and structure of the business rules are different in these applications. Business rule content for portal services is implemented the same way as the phrase content; hence the implementation of business hierarchy for rules and phrases is identical in portal services. Alert services "rules" are configuration parameters that are business specific, and alert services does not use business rules at runtime.

JFP for embodiments of the invention involves implementation of business hierarchy for phrases for all JFP applications, business rules for banking applications, and portlet and page layout configuration. Regarding business hierarchy for phrases, in order to support business hierarchy in a consistent manner in all JFP applications, one database schema containing phrases for banking application, portal services and alert services is created. Some fields in the table are needed only by portal services and are ignored by other applications. A field "Hierarchy Name" is used to support business hierarchy. The "Hierarchy Name" is set to the nodes of the hierarchy tree, an example of which is described in FIG. 19, such as "SGCGOL" 136, "SGCBOL" 138, "SGGCB" 132, etc. The reason this field is called "Hierarchy Name" and not "Business Code" is to clarify that the hierarchy exists inside a business. "Gold" and "Blue" represent customer types or banking relationships and not separate businesses such as Singapore, Hong Kong, etc.

Since accessing a phrase involves searching through the hierarchy, it is preferred that the phrases are preloaded in a cache at webapp startup time in order to avoid runtime performance issues. Each MessageResource that represents a sub-app can be configured to one of the caching options such as preload, lazyload, firstaccess, etc. At runtime, JFPMessageResources uses the hierarchy name contained in the profile object and looks for an entry in the cache using the hierarchy name, locale and key. For example, a phrase "Hello World" for "Gold" customers in Singapore is fetched using "SGCGOL.en_US.HelloWorld".

Substantial flexibility is provided in how business hierarchy of JFP for embodiments of the invention can be used by the businesses. For example, if Singapore has a three level hierarchy with some content at each level, the hierarchy for Singapore is specified as: SGCGOL 136, SGGCB 132, APAC 130. If Hong Kong wants to use content from Singapore and does not have its own content, then the hierarchy for Hong Kong is specified as: HKCGOL, SGCGOL 132, HKGCB 134, SGGCB 132, APAC 130. If Malaysia and Guam have some content that is identical which has been moved to "APAC" level, then the hierarchy for Malaysia is specified as: MYGCB, APAC 130 and for Guam it will be specified as: GUGCB, APAC 130. If Australia does not want to use any content from a regional level, the hierarchy for Australia is specified as: AUCGOL, AUGCB.

JFP for embodiments of the invention requires that the application server must be deployed with one webapp per business or country. Since applications in a webapp run in its own context, this structure isolates businesses from each other and allows the business staff to make changes independent of each other. Hence in JFP, for example, there is one webapp for Singapore and another webapp for Hong Kong. When considering business hierarchy in this context, the sub-businesses "Gold" and "Blue" are part of the webapp. In other words, there is no separate webapp for "Gold" or "Blue". Each webapp has its own set of caches. When the caches are loaded for Singapore webapp with the business hierarchy specified as "SGCGOL 136, SGGCB 132" for "Gold" and "SGCBOL 138, SGGCB 132" for "Blue"; all phrases needed by "Gold", "Blue", and Singapore are loaded.

Sharing of content across any hierarchy level means that changes made to the shared content at a higher level will affect the lower level. If the hierarchy is contained within a webapp, meaning it is limited to customer type such as SGCGOL 136, SGCBOL 138 and SGGCB 132, then any updates at these levels affects only the Singapore webapp, and there is no impact on other businesses such as Hong Kong, Malaysia, etc. On the other hand, if two or more businesses require some content at the regional level such as APAC 130, then any change of APAC content affects these businesses.

In addition to a "getMessage" method that uses locale as a parameter to get the business ID, several methods are provided in JFP that get the hierarchy name from the profile object. These methods are used for various types of content needed by the portal services such as simple phrases, personalized phrases, keywords and links. The portal services provide tag libraries to support new jsp tags defined to support various types of content. These tags are used by JFP applications (banking apps, alert apps, portal apps, and any other set of apps for the JFP platform). To support business hierarchy for portlet and page layout configuration, portal services implements the required portlet configuration and page layout configuration data source readers that support business hierarchy.

Existing banking application business rules contain, for example, two parts—rule signature and rule data. The rule signatures for all global banking applications are the same for all businesses, whereas the rule data differs by business. In JFP for embodiments of the invention, each rule is represented in XML and contains rule signature as well as data specific to a business such as Singapore, Hong Kong, etc. Hence each business has a set of XML files with data specific to their business.

The set XML rule files for a business are stored, for example, inside a webapp directory structure for that business. At startup time the rules are cached in a set of banking unit objects. When the rule data is updated for one or more rules, the XML files are updated and the rule files are reloaded in the cache without bouncing the webapp. If an update involves changing the rule signature, then it requires bouncing the webapp because change of rule signature will involve application code changes as well.

The business hierarchy structure for phrases is not applicable to the business rules for global banking applications in the same way. In global banking applications, for example, there are no rule signatures that are specific to a business or a customer type. However, it is possible that there may be some regional applications that do use regional rules that are specific to "Gold" or "Blue" customers. In that case, there may be some sharing of rule data between SGCGOL 136 and SGGCB 132. It is also possible that rule data may be shared between two or more businesses such as Malaysia and Guam. In that case, the rule caches for these businesses are loaded with some rules from Malaysia and some from Guam based on specified business hierarchy.

The existing design requires that the rule files containing rule data for a business must be stored inside the directory structure of a webapp for that business. The rule infrastructure component loads the rule files in cache using a relative path within its own webapp context. In order to support business hierarchy, it is necessary to store rules at a server level. At the "root" there is a "rules" directory, which contains a sub-directory for the region such as "apac" or "global" and separate sub-directories for each business in the region such as "sggcb", "hkgcb", etc.

Some rules that apply to all businesses can be stored in the "apac" or "global" directory. Rules such as "jbaICMessageSupport" and "jbaCharacterSetCode" which contain data for multiple businesses are good candidates for this directory. Also rules such as "jbaCurrenyParamsByCountry" and "jbaCurrenyParamsByCurrency" which do not have business code can be located in this directory. Other rules with data specific for a business are stored in the directories such as "sggcb", "hkgcb", etc. The rule infrastructure component is modified to load cache from these directories based on a business hierarchy configuration. Changes required to support business hierarchy for rules include, for example, code changes to the rule infrastructure component of JFP middleware and installation changes for rule files in banking applications.

In addition to the portal content (such as menus, links, URLs, images, phrases, personalization rules, etc.) that uses business hierarchy, portal services extends the business hierarchy to portlet and page layout configurations. Portlet configuration refers to portlet attributes such as portlet name, title, description, portlet url, portlet edit url, etc. With business hierarchy, these attributes need to be configured only once for a given portlet(s) for a parent business, and the children businesses inherit them when the business hierarchy between parent and children is configured appropriately. For example, SGGCB 132 business can configure and set up a commonly used portlet such as account information at SGGCB business level. If SGCGOL 138 is configured to be a child of SGGCB 132 in the business hierarchy, the account information portlet information is automatically available to SGCGOL 138 the necessity of setting up account information portlet again for SGCGOL business.

Page layout configuration refers to the default home page layout for VISITOR, FRIEND, and CUSTOMER roles (one for each). As in the case of portlets above, business hierarchy allows setting the page layout configuration for a parent business and children businesses to automatically inherit the same setup so that it is not necessary to set up the page layout again for the children businesses.

Forwarding and Caching

In another aspect, JFP for embodiments of the invention allows for a graceful, online cutover from one version of software to another, on a per country basis without the need to shut down an application server. JFP does this via the use of "Forwarding" and "Drain" servlet filters that support the ability to forward "new" session requests to a new version of the software, while at the same time supporting existing sessions on the old version of the software. Thus, a business is able to install a new version of software and allow existing sessions to run against the old software, but to direct new session requests to the new version without taking the system down. This is accomplished via the use of the "Forwarding" and "Drain" servlet filters that look at all the new requests and determine for that particular business, based on a configuration file, where these new session requests should be forwarded.

In another aspect, the JFP for embodiments of the invention caches various content in memory, such as rules, phrases, HTML etc., in order to eliminate database access and decrease response time. It also provides for dynamic update of caches in a running system using JFP specific cache controller classes. Thus, all of the financial institution's business rules and language phrases, and a substantial portion of its content are cached in memory, and the financial institution has the ability to allow the business through these cache controllers and an admin counsel to change, for example, the business rule or update business phrases and then cause the running system to purchase current content and update it, all in a running system.

Embodiments of JFP employ a caching approach that includes, for example, server-side caching of various types of content, as well as client-side caching of certain objects, such as images and scripts. Caching, which is one of the oldest and most fundamental metaphors in modern computing, denotes a small fast memory holding recently accessed data, designed to speed up subsequent access to the same data. At web-app scope, JFP for embodiments of the invention provides server-side memory caching of frequently-accessed, database-resident information, such as phrases, business rule data and managed-content of various types, in order to reduce CPU processing, database connections usage and response time. At web-app scope, JFP provides for updating of information and reloading of various server-side memory caches without the need to take down the web-app context.

At session scope, JFP provides server-side memory caching of customer relationship and account information in order to speed up the processing of responses and reduce the number of message accesses to backend hosts. At the client browser/device JFP allows certain frequently used objects (e.g. images, stylesheets, js scripts etc.) to be efficiently and automatically cached at the client, in order to reduce the payload size sent to a client and reduce transmission time of a response.

In order to support both efficiency and domain specific APIs, JFP for embodiments of the invention has several individual caches. Each cache provides "in-situ" caching of data and each cache provides its' users with an API that is domain specific to the of type of information being accessed. In some cases, the API is a industry standard API, such as the Strut's MessageResources API. Even though there are individual caches, most of the JFP caches implement a standard JFP cache management interface which in turn uses a standard JFPCacheController mechanism for loading, maintenance and reloading of caches.

The general approach in JFP for embodiments of the invention is to cache data inside the objects in which the data is used and to access that data indirectly via domain specific APIs. A reason for this approach is that there are pre-existing objects that are leveraged in JFP, such as the Struts Message Resource classes and the portal services content classes, that already provided "in situ" caching of data. Another reason is that some data that is cached must be first pre-processed before it can be used, such as business rule data.

A further reason for the general approach is that some cached data is not accessed directly but behind domain appropriate APIs. Examples of this again include business rule data, which is not accessed directly but behind business unit APIs, and phrases held in Message Resource classes, which are accessed behind standard pre-defined APIs. A still further reason is that using individual caches, embedded within domain specific objects and APIs, instead of inside one large content cache allows for more specific APIs and faster lookup and access to the content. An additional reason is that instead of having a single giant cache, JFP standardizes on a single way to load and reload caches by having individual caches all implement the JFPCacheManagement interface which in turn uses the standard JFPCacheController mechanism. Finally, the caching strategy in JFP recognizes the need to cache both at the server and the client and at different scopes.

A number of types of server-side caches exist in JFP for embodiments of the invention. For example, at web-app scope, JFPMessageResources classes cache phrases. The approach leverages both the native Struts MessageResource API and caching approach and implements the JPFCacheManagement interface, which in turns uses the JFPCacheController mechanism. All portal and banking phrases are preloaded at startup. For another example, at web-app scope, business rules are accessed, processed and business rule data is cached in the banking unit objects for fast access. Business rule data is cached at startup and the Business rule accessor implements the JPFCacheManagement interface, which in turns uses the JFPCacheController mechanism.

As a further example of server-side caches in JFP for embodiments of the invention, at web-app scope, JFP portal services caches content-managed content such as URLs, images, links, menus etc. The JFPCollectionCache is the base class used by portal service for caching. This class implements JFPCacheManagement interface for reloading caches using the standard JFPCacheController mechanism. All the caches except the file content cache (IPT Lite) are preloaded at startup time. The file content cache is lazy loaded (on demand). The content cached by JFP portal services includes, for example, URL cache, image cache, link cache, menu cache, personalization rule cache, portlet definition cache, portlet layout cache, URL home cache, advertisement cache, form cache, business hierarchy definition cache, and file content cache—used for caching the HTML Content Service (IPT Lite).

As a still further example of server-side caches in JFP for embodiments of the invention, at web-app scope, the SiteEntranceFilter caches the cross-site scripting policy in memory. Moving the policy from embedding in Java code to an XML policy file allows cross-site scripting policy to be defined in an XML policy file and not built into the SiteEntranceFilter itself. As an additional example of server-side caches in JFP, at web-app scope, the authentication and authorization services cache the JFPPolicy and CCS LoginModule policy. These services migrate to using the standard JFPCacheManagement interface. The JFPPolicy cache allows authorization policy to be updated in a running system. As another example of server-side caches in JFP, at web-app scope, the sub-app context policy is cached. The sub-appp context policy defines which applications are allowed to co-exist at the same time within a session. These services migrate to using the standard JFPCacheManagement interface.

As still another example of server-side caches in JFP for embodiments of the invention, at session scope, the customer's base profile is cached (saved) in the session object using the standard J2EE Servlet API. The base profile includes items like business, language and role. In addition to the base profile, a customer's portal profile and banking relationship profile are also cached in the session object. The portal profile includes items such as layout preferences, portlet preferences etc. The banking profile includes the set of banking relationship objects that contain the customers relationships and account list. The banking relationship objects cache account information received from the back-end host. These objects also support re-fetching information from the host if their local cache is invalidated because of customer actions during a session.

JFP for embodiments of the invention also supports client-side caching of the various types of information, such as Images, using standard HTTP techniques and CSS-Stylesheets, using standard HTTP techniques, including creating a standard set of Stylesheets that all pages used. The Stylesheets are loaded once instead of being included in the payload of all pages. JFP also supports client-side caching, for example, of js script files wherein frequently used Java Scripts, for things such as menus, security checks etc., are encapsulated in js script files. They are loaded once instead of being included in the payload of all pages. Examples include JFPNav.js—all Navigation related JavaScripts, cool-menu.js—cooljs DHTML menuing product (vendor product), cooltree.js—cooljs DHTML menuing product (vendor product), portalAdminMenu.js—used only for Admin site, and mapping.js—a special DHTML style button used only in the JFP maintenance site.

Client-side caching is related to the larger issue of payload size reduction strategies employed in JFP for embodiments of the invention including, for example, Use of non-verbose compact names for URL Actions, Use of non-verbose compact names for variables, Use of non-verbose compact names for CSS classes, Stripping of all comments and use of JSP comments instead of HTML comments (also a security issue), Development time white-space compression of JSP files, and Runtime use of gzip compression for all dynamic response pages (Approach is under study).

Figure 20:
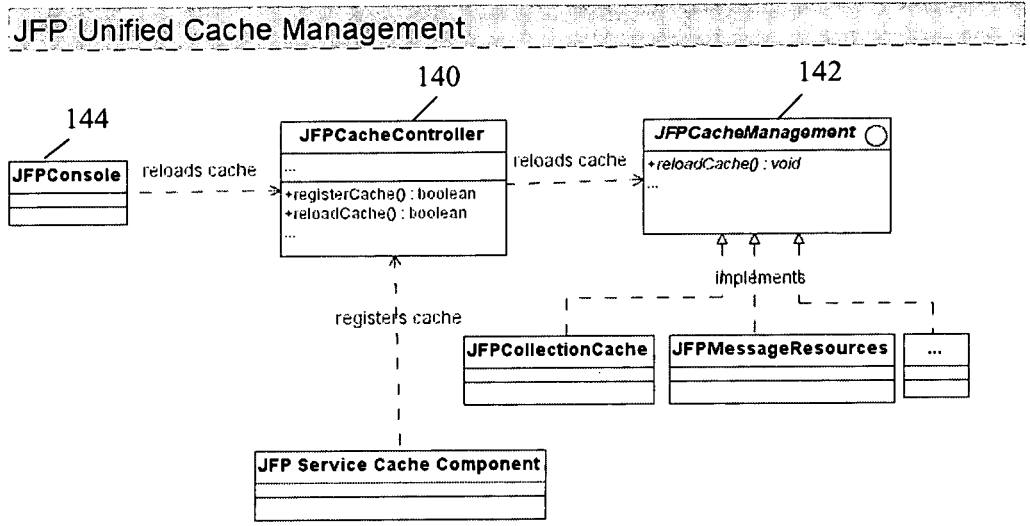
FIG. 20 is a schematic diagram that depicts an example of components and the flow of information between the components involved in providing cache Management to all JFP caches for embodiments of the invention.

JFP for embodiments of the invention provides a unified mechanism for loading and updating various JFP caches. All caches can uniformly be scheduled for reloading using JFP Console application which is integrated with the JFP maintenance site. FIG. 20 is a schematic diagram that depicts an example of components and the flow of information between the components involved in providing cache management to all JFP caches for embodiments of the invention.

Referring to FIG. 20, the JFP Cache Controller 140 is a singleton object responsible for clearing or reloading JFP caches. Cache Controller 140 keeps a list of registered components which implement JFPCacheManagement interface 142. Each component is identified by a display name and list of items that the cache controls. Cache components are initially registered with the Cache Controller 140 at the startup of JFP web-app. Cache Controller 140 is responsible for notifying registered component or components of cache management events (such as flush cache) when prompted to do so by command interface or when scheduled time occurs. Cache Controller 140 also holds on to scheduling information for timed and repeating events. Referring further to FIG. 20, all JFP Cache components must implement JFPCache-Management interface 142 in order to receive notification of cache modification events from the JFPCacheController 140. JFP Cache components receive reload events for selective cache items that are managed by the particular cache component.

Figure 21:
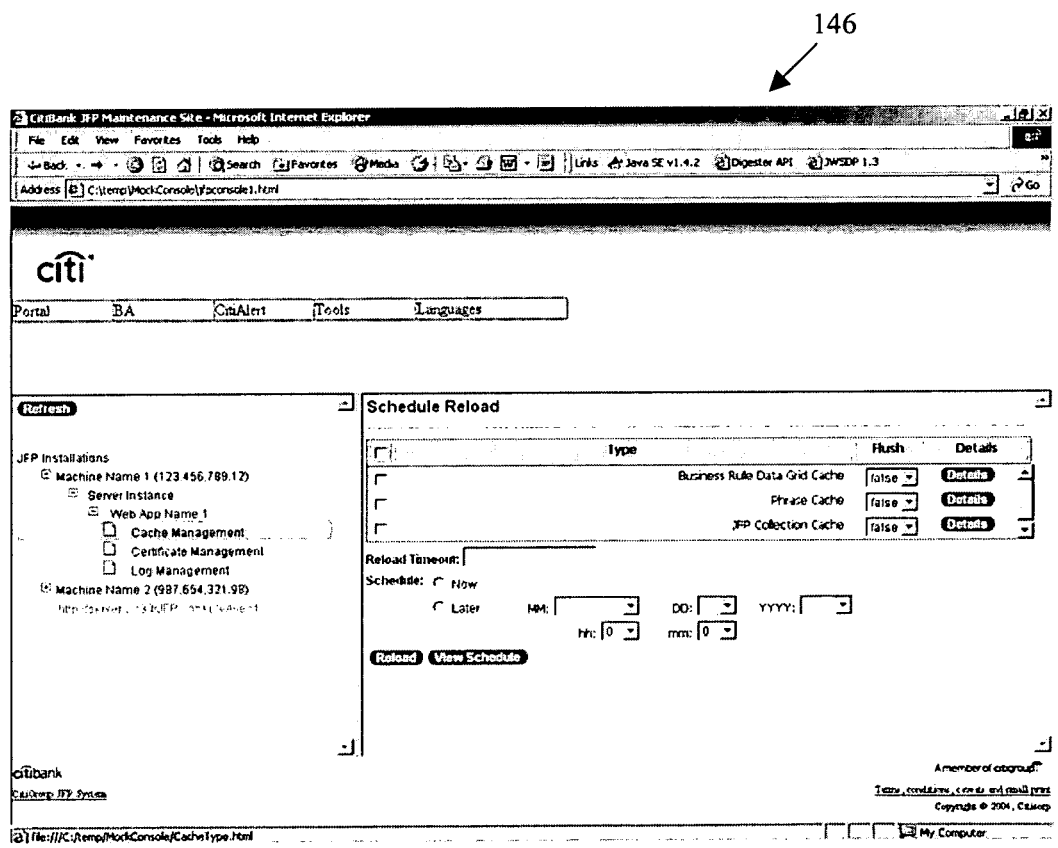
FIG. 21 shows a sample JFP console GUI screen for embodiments of the invention.

JFPConsole 144 is the GUI component of maintenance web-site which allows for immediate or scheduled reloading of caches. FIG. 21 shows a sample JFPConsole GUI screen 1 46for embodiments of the invention. Any reload action will reload all the caches of that the selected type in that particular web-app. An operator can be more selective about which caches are reloaded by clicking the "Details" button, which displays all the caches registered of that particular type. For a single reload task, an operator can specify one or more caches to reload, reload parameters such as one or more namespaces per cache, flush and timeout, along with when the reload should occur. Reload can be scheduled for a later time or occur right away. A reload task that is scheduled for a later time can be canceled however if the reload is scheduled as "Now", it cannot be canceled.

Parallel Processing

JFP for embodiments of the invention provides a thread safe integration of Struts and Tiles with the concurrent thread package (a kind of standard JAVA package for making it easier to manage multiple threads) in a way that allows multiple "portlets" to be spawned from a single "home page" request and be processed in such a way that each portlet can run in a thread safe way. The JFP does this by providing each "portlet", its own "cloned" copy of the request and response objects, so that even with non-thread safe implementations of request/response objects, each portlet can run in a thread safe way.

In embodiments of the invention, JFP portlets are Struts modules which will generally return page fragments to a controller object in charge of parallel processing portlets and aggregating the response of the portlets on a page. In the JFP portlet framework, JFP portlets are Struts modules (sub-apps) returning HTML or xml fragments. JFP portlets always go through Struts controller, follow Struts framework as closely as possible and modify Struts flow as little as possible (for example forward or include), and are parallel processed independent of the underlying portal such as Epicentric, WebLogic, and JFP portal services page-composition (i.e., JFP portal service parallel processes non Struts portlets such as .jsp.

Figure 22:
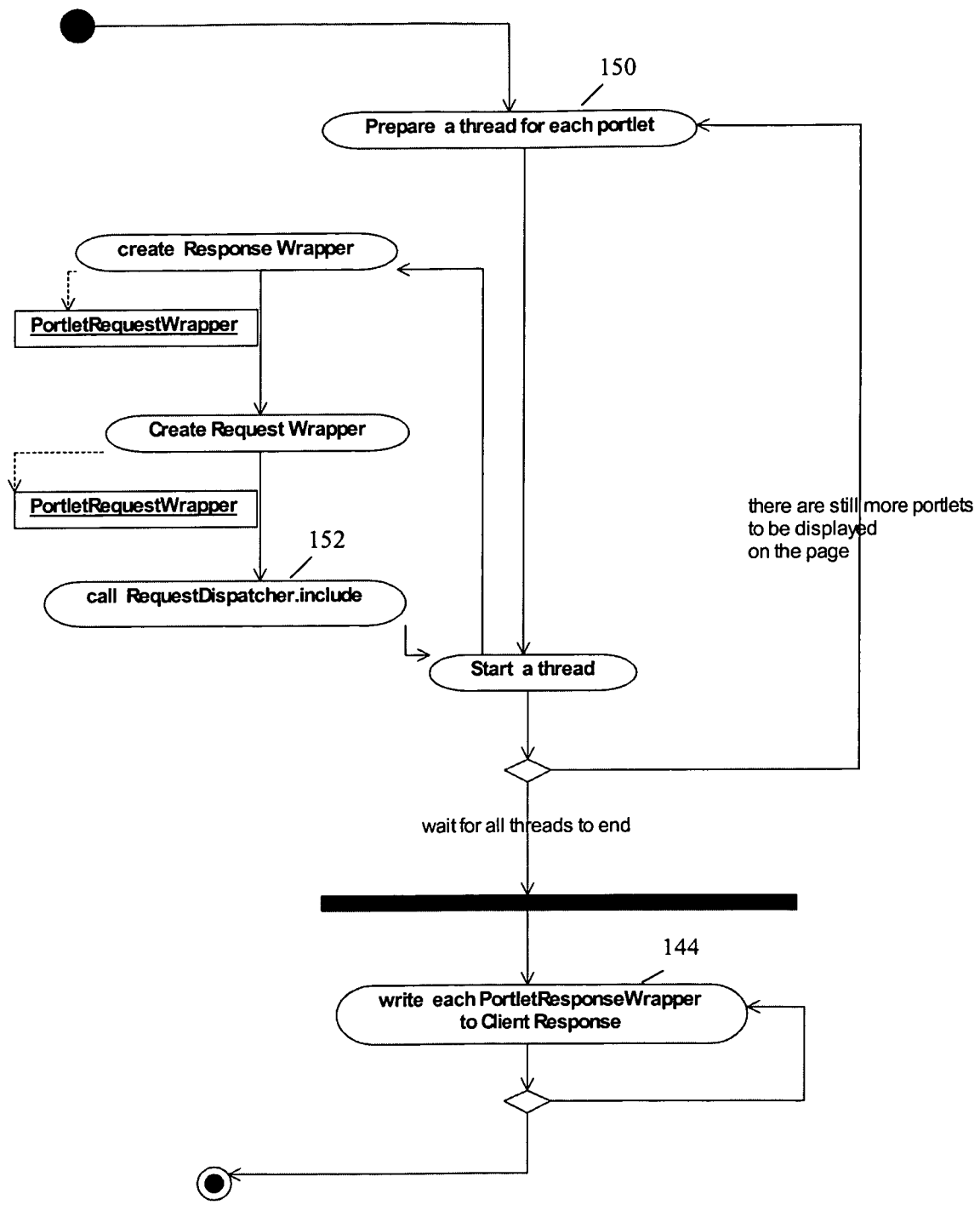
FIG. 22 is a schematic flow diagram that illustrates an example of the activities involved in aggregating portlets using a parallel processing manager ("PPM")in the JFP portlet framework for embodiments of the invention.

FIG. 22 is a schematic flow diagram that illustrates an example of the activities involved in aggregating portlets using a parallel processing manager in the JFP portlet framework for embodiments of the invention. Referring to FIG. 22, the controller responsible for parallel processing the portlet creates a thread (task) for each invocation of portlet 150. Inside each thread, the framework performs server-side include using RequestDispatcher object 152 sending request to JFP portlet. This include is performed on individual thread, and the response of each HTTP request is cached by the PortletResponse wrapper 154. When all the threads are finished with their tasks, the controller then assembles the responses in the correct order by streaming the caches to the HTTP response object of main portal request.

The following is a typical Tiles definition (tiles-defs.xml) for embodiments of the invention. The "portal.home" definition extends a Tiles default layout and calls a controller class before laying out the view (portlets.jsp).

```
<tiles-definitions>
<definition name="portal.tiles-definitions.defaultLayout"
    path="/WEB-INF/portal/jsp/layouts/defaultLayout.jsp">
```

```
    <put name="portalHeader" value="portal.tiles-definitions.defaultHeader" />
    <put name="portalNavBar" value="portal.tiles-definitions.defaultNavBar" />
    <put name="portalFooter" value="portal.tiles-definitions.defaultFooter" />
    <put name="portalBody" value="portal.tiles-definitions.defaultBody" />
</definition>
<definition name="portal.home" extends="portal.tiles-definitions.defaultLayout"
    controllerClass="com.citigroup.cdcla.jfp.portal.parallelprocessing.PPMController">
    <put name="portalBody" value="portal.portlets" />
</definition>
<definition name="portal.portlets" path="/WEB-INF/portal/jsp/portlets.jsp">
</definition>
</tiles-definitions>
```

Figure 23:
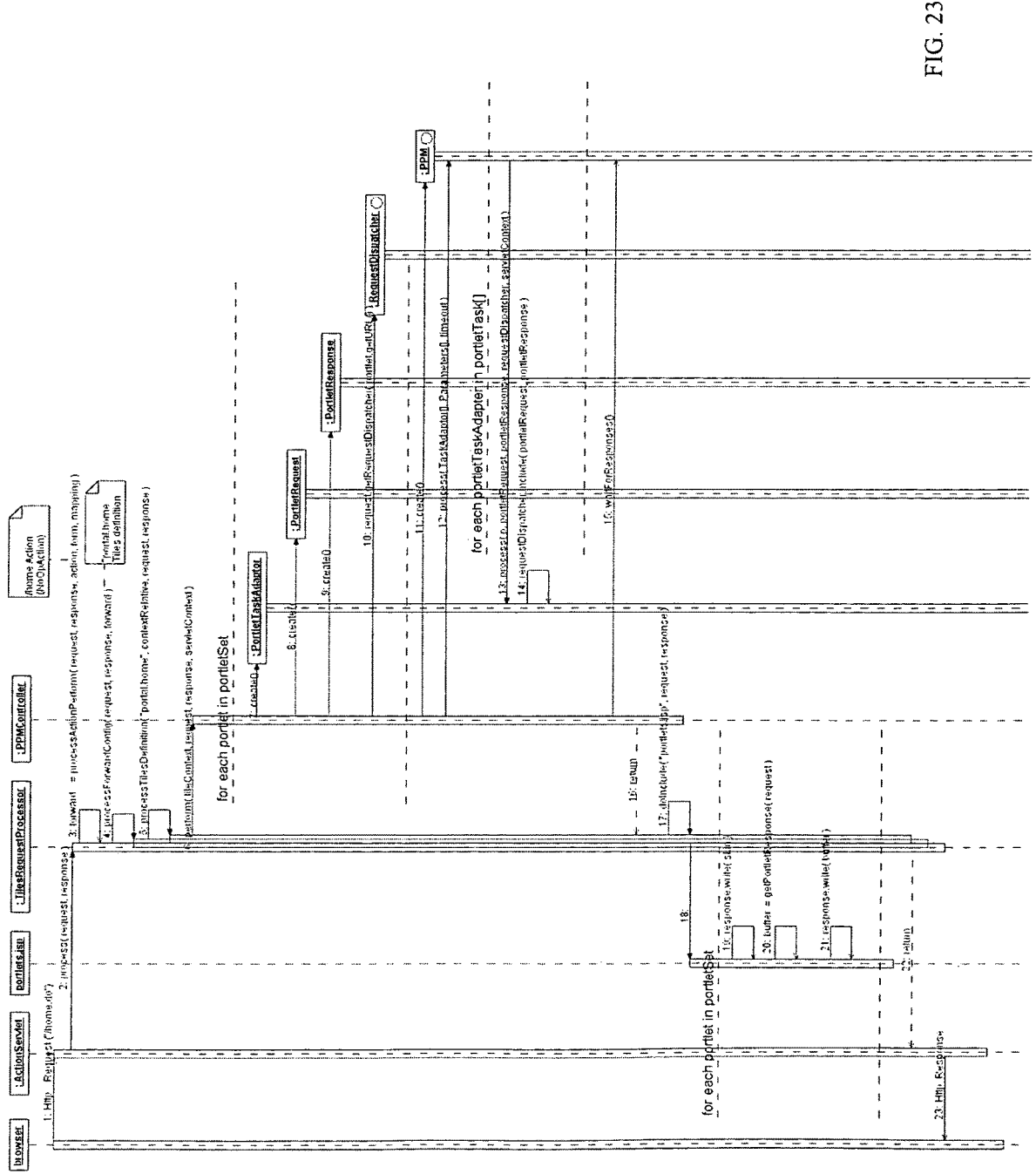
FIG. 23 is a sequence diagram showing an example of the interaction using the PPM controller in Struts and Tiles environment for embodiments of the invention.

FIG. 23 is a sequence diagram showing an example of the interaction using PPM controller in Struts and Tiles environment for embodiments of the invention. However, it is noted that the sequence diagram depicted in FIG. 23 does not show all the objects involved in Struts framework.

Figure 24:
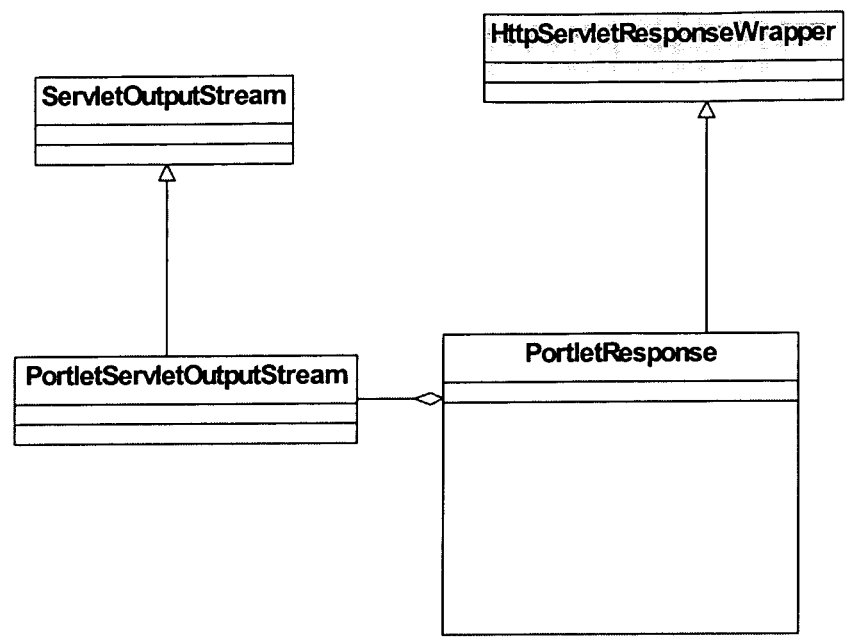
FIG. 24 is a schematic diagram that illustrates an example of the PortletResponse Wrapper for embodiments of the invention.
Figure 25:
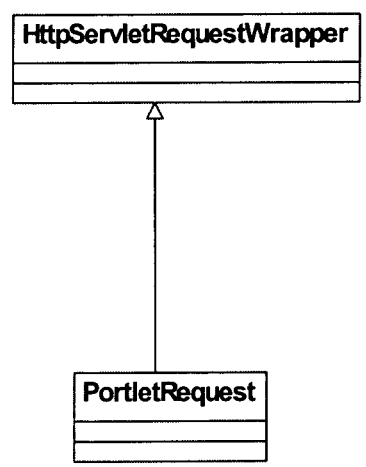
FIG. 25 is a schematic diagram that illustrates an example of the PortletRequest Wrapper for embodiments of the invention.

FIG. 24 is a schematic diagram that illustrates an example of the PortletResponse Wrapper 154 for embodiments of the invention. A main function of the PortletResponse Wrapper 154 is to provide a separate response buffer for each request to a JFP portlet (Struts module). The response buffers are aggregated after all parallel processing is done. FIG. 25 is a schematic diagram that illustrates an example of the PortletRequest Wrapper for embodiments of the invention. Embodiments of the invention provide an implementation of this wrapper in order to buffer attributes that are set through setAttribute and catch other functions that need to return these attributes. Specifically, these are the following attributes usually set through the RequestDispatcher.include process, such as:

```
    public final static String _REQUEST_URI=
    "javax.servlet.include.request_uri";
    public final static String _CONTEXT_PATH=
    "javax.servlet.include.context_path";
    public final static String _SERVLET_PATH=
    "javax.servlet.include.servlet_path";
    public final static String _PATH_INFO=
    "javax.servlet.include.path_info";
    public final static String _QUERY_STRING=
    "javax.servlet.include.query_string";
```

Other attributes are usually attributes that are set by Struts or JFP.

There are also getters on the interface of Wrapper for returning some of the above values. These values are retrieved from the cache and not the main Request object. Examples of those APIs include:

```
    public String getPathInfo( );
    public String getContextPath( );
    public String getParameter(String name);
    public Map getParameterMap( );
    public Enumeration getParameterNames( );
    public String[ ] getParameterValues(String name);
    public String getQueryString( );
    public String getServletPath( );
```

The above APIs are the main mechanism for returning things such as query string, path info, and other vital request information. This information are usually passed to the request in the RequestDispatcher.include( ) using the ServletRequest.setAttribute( ).

Security

In a further aspect, JFP for embodiments of the invention provides security protection for all requests via the use of a site entrance filter that filters all requests and provides automatic authorization role provisioning, authorization checks, and cross-site scripting checks. The JFP site entrance filter is a central filter that looks at all requests for new sessions and insures that all new session requests are provided with a new session object, and a default profile object with the "role" set to a lowest entitled user. Site entrance insures that all requests undergo an authorization check based on the user role and other information. In other words, the JFP site entrance filters insure that all requests call out to an authorization check to make sure that whatever the user is trying to do is acceptable given the user's particular role.

A still further aspect of JFP for embodiments of the invention integrates a proprietary authentication system, referred to herein as the Combined Credential Store ("CCS") into a J2EE container.

In an authentication and authorization aspect of JFP for embodiments of the invention, authentication is the process of verifying that a user is who he or she claims to be by means of verifying known credentials such as user-name and password, digital certificate, biometric information, etc. Authorization is the process of giving someone permission to do or see something. Logically, authorization is usually preceded by authentication. Entitlement or entitlement level refers to the level of privileges granted to an authenticated user, often accomplished by assigning a user to a role (with associated privileges) or a group (with associated privileges). An authorization service often provides entitlements to an authenticated user.

Typical roles within JFP for embodiments of the invention include, for example, visitor, friend and customer. A visitor is a user that is not registered with the site and is not a (known) customer of the financial institution. In some environments, a visitor is known as a guest. A friend is a user that is registered with the site but is not a (known) customer of the financial institution. In some environments, a friend is known as a "registered user". A customer is a known customer of the financial institution (has a banking or other transactional relationship). Typical groups within the JFP environment are "Blue" customer, "Gold" customer, bill payer, and customer service representative.

In addition, site entrance in JFP is the processing needed to provide authorization pre-processing of a new session request from a user until such time as the user is identified and the server is ready to process the initial "home" screen and to provide authorization processing/filtering of all subsequent requests from a user in a session. Security services are those set of centralized services in JFP to protect against common hacking attacks such as cross-site scripting, buffer overflows, invalid parameters, command injection etc.

Major JFP authentication features for embodiments of the invention include, for example, provision by JFP of support for user authentication performed by financial institution front ends transaction processing systems (sometimes referred to as "TPS", "SFS", "BAFES", etc.), support for the use of CCS for user authentication and credentials aggregation, an authentication interface that allows support for an external authentication engine such as Netegrity SiteMinder, allowance of support for a native OS authentication engine (which can include LDAP/active directory implementations), support of one authentication engine that does not preclude support for any other authentication engine, allowance of authentication by use of different types of credentials, an authentication process that records usage at various stages, and the ability to audit both successful and failed authentication attempts.

In another JFP authentication feature JFP provides that if it is necessary to decrypt a PIN/Password using one key and then re-encrypt the PIN/Password using another key (e.g. a TPS key), this process takes place within a hardware security module ("HSM"). In other JFP authentication features, e.g., when CCS is the authentication engine, JFP supports credential aggregation, supports enforced periodic password change (configurable per business), prohibits a user from submitting a wrong password more than N consecutive times (configurable per business), and supports shared secrets that allow the user to reset their password if they forget it (configurable per business).

In another JFP authentication feature, JFP provides that all passwords and shared secrets must be encrypted in permanent storage and transit. They are never placed in the clear on a session object. All passwords and shared secrets must be encrypted in transit at all times. All passwords and shared secretes must be encrypted on a disk or in a relational database. In additional JFP authentication features, JFP provides that only 3DES and PKI algorithms may be used except for cases where backwards compatibility is an issue; that within a particular server, several solutions to the authentication interface may be used; that if a user does anything which may be construed as suspicious, then to the extent possible this activity must be logged in a separate security log; and that each time a user logs in the last login time must be persisted so that this information is accessible and may be presented to the user; i.e. 'Hello Joe Smith: We are glad to see you. Your last logon was on 4/4/04 at 3:30 PM EST.'

In the JFP authorization service for embodiments of the invention, JFP provides a mechanism for specifying access-policies, supports access-policy creation based on parameters such as action requested, user-role, user-group, origin-device, time-of-day etc., enforces a mechanism requiring each JFP "sub-app" to specify an access-policy; provides a mechanism for online centralized changes to access-policies, including emergency changes to "turn-off" access to particular functions; restricts access based on time or device entry etc.; and provides an API for checking access-policy compliance. This API can be used both by the JFP authorization service for "coarse-grain" authorization checking and by an individual application for doing "fine-grain" authorization checking. In the JFP authorization service, JFP also provides coarse-grain authorization checking and enforcement of each request, based on access-policies and authorization enforcement of each request that will reject any request that is not authorized and respond to the user with an error page (configurable).

The Java authentication and authorization service ("JAAS") is used to provide authentication services for JFP for embodiments of the invention. The JAAS authentication framework is based on pluggable authentication modules ("PAM") and thus supports an architecture that allows the development of authentication mechanisms that meet security requirements. Clients that authenticate against the JAAS authentication interfaces may use any authentication mechanism that also implements the JAAS authentication interfaces.

Figure 26:
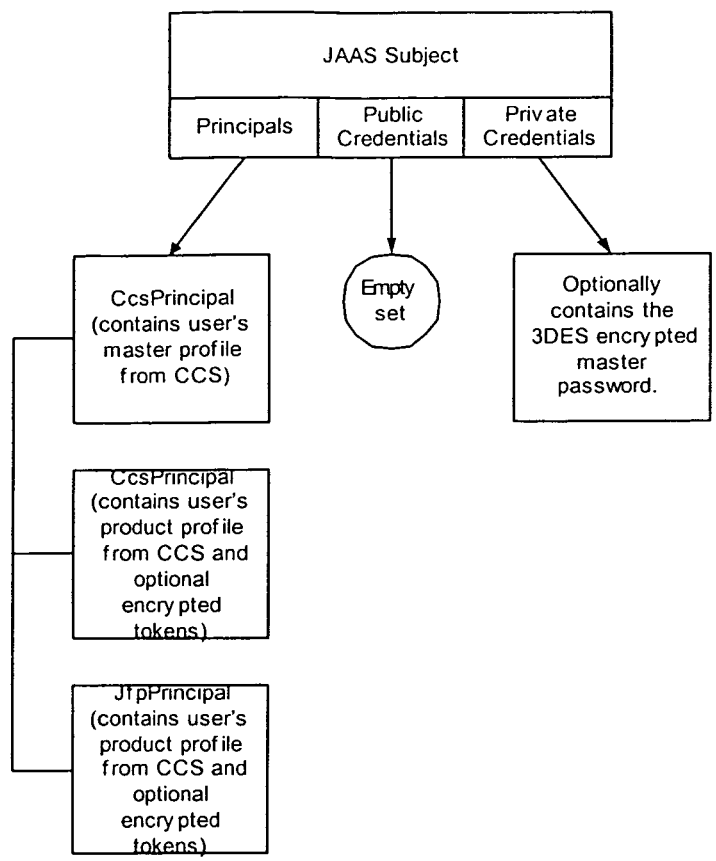
FIG. 26 is a schematic representation that illustrates an example of the JAVA Authentication and Authorization Service ("JAAS") subject for embodiments of the invention.

FIG. 26 is a schematic representation that illustrates an example of the JAAS subject for embodiments of the invention. An authentication mechanism utilized in JFP for embodiments of the invention is a proprietary mechanism referred to herein as the Combined Credential Store (CCS). Pluggable authentication modules are created that delegate to CCS, thus presenting JAAS interfaces to JFP and insulating JFP from both CCS interfaces and CCS objects. JAAS creates a subject object to represent users. Associated with each subject object are zero or more principal objects. For JFP, a principal object serves as the representation of the subject either as the master credential ID and as a holder of a single sign-on token for any federated services linked to the master identify.

For each authenticated user, the subject object may encapsulate a principal object that corresponds to the master ID. This principal will contain the master ID of the user and the primary role (e.g. VISITOR, FRIEND, CUSTOMER, CSR, etc.). The master ID may be masked. Optionally, the subject object may also encapsulate another principal object that corresponds to a banking customer, if the user is a banking customer. In this case, the principal contains the customer's card identification number ("CIN"). The CIN may be masked. Also optionally, the subject object may encapsulate additional principal objects that correspond to additional federated services and that contain at the least a user-ID meaningful to the federated server.

In the event the user is not authenticated, the subject will contain a principal without a user-ID, and set to the default role with the least permissions (i.e. VISITOR). It is to be noted that a VISITOR to the consumer bank site is a non-credentialed user, who is not required to login, and who has minimal privileges (e.g for example has the ability to view product literature but nothing else). Should the user eventually authenticate within the JFP session, principals corresponding to each of the user's banking relationships will be added to the subject. JAAS supports the notion of re-authentication, thus supporting the JFP requirement to be able to re-authenticate a user.

The subject object, in addition to containing any number of principals, may contain both public and private credentials. Public credentials typically include public keys and private credentials typically include private keys, PINs and passwords. Access to the private credentials given a subject object is restricted to code that has been granted specific permissions to access private credentials.

When JFP authenticates a user, it can request the return of server specific tokens ("SST") that may or may not include private credentials (i.e. PIN or passwords). Typical server specific tokens are single sign-on tokens, such as the eACE single sign-on token. Any tokens returned are stored in the principal object that corresponds to the respective federated service and not in the subject object. Because the tokens are encrypted, their storage in the principal object introduces no security risks. In addition to populating the principal object with server specific tokens, the URLs of the specific federated server that receive the server specific tokens are also populated within the principal object. For each federated server, multiple sever specific tokens, along with their corresponding URLs, may be returned. Each token/URL pair corresponds to a specific federated server function (e.g. "SIGNON", "SIGNOFF", etc.).

Additionally during authentication, for those conditions where a server specific token is not required but JFP stills needs to cache private user credentials, JAAS can populate the set of private credentials contained within the subject object with the user's private credentials. In addition to normal Java 2 security that is imposed on accessing these credentials, the credentials are encrypted.

JAAS requires the use of a custom written login module that typically causes the user to be prompted for their user credentials (typically a user name and password). This situation is handled by a thin MVC/JAAS interface that pre-populates the login module (during its construction) with the user credentials. The subject is cached for the duration of the session in the servlet container's session object. Below is the flow of a JFP application authenticating a user whose master and product credentials are maintained by CCS.

Figure 27:
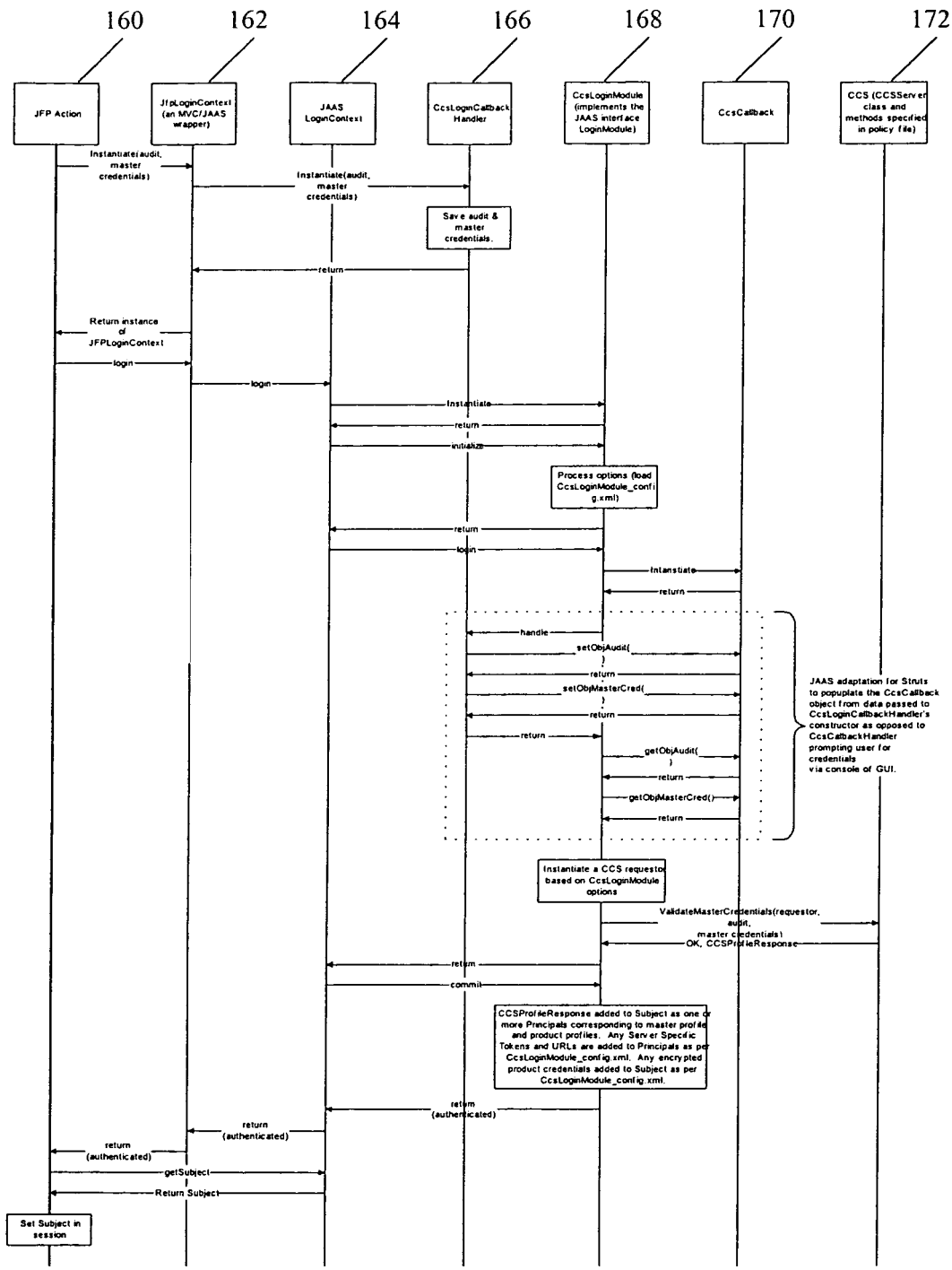
FIG. 27 is a sequence diagram that illustrates an example of the process of authenticating a user using JAAS with CCS as the back end authentication system for embodiments of the invention.

FIG. 27 is a sequence diagram that illustrates an example of the process of authenticating a user using JAAS with CCS as the back end authentication system for embodiments of the invention. Referring to FIG. 27, the JFP action 160 instantiates a helper class, JfpLoginContext 162, that interfaces with JAAS 164. The JAAS methods require the specification of configuration tag names and class names specific to the CCS authentication service. The helper class insulates JFP from having to supply this information. The user credentials have already been collected and are available in a form bean. User credential information is extracted from the form bean and passed to JfpLoginContext's constructor 162.

The JFP action 160 calls the login method of JfpLoginContext 162, the helper class, which delegates to the JAAS LoginContext's login method 164. The JAAS LoginContext 164 instantiates the CcsLoginModule 168 and then calls the initialize method. CcsLoginModule 168 processes the configuration file whose name was passed to it by JAAS 164. The configuration file specifies the CCS requestor name, which server specific tokens should be built and for which function (e.g. "SIGNON", "SIGNOFF", etc.) and which product credentials should be encrypted and stored in the private credential set within the subject.

The JAAS LoginContext 164 then calls CcsLoginModule's login method 168. The CcsLoginModule 168 creates a CCSIdentity object corresponding to the requestor (from information passed to it from JAAS). The CcsLoginModule 168 then instantiates the CcsCallback object 170 (which simply stores user credentials) and then calls the CcsLoginCallbackHandler's handle method 166. The handle method causes the user credential data to be copied from the CcsLoginCallbackHandler 166 (the information was passed to its constructor by JfpLoginContext 162) to the CcsCallback object 170. After the handle call completes, CcsLoginModule 168 extracts the user credential data from the CcsCallback object 170 and calls the CCS method validateMasterCredentialsEx 172. The returned user profiles are cached in the CcsLoginModule object 168 and CcsLoginModule returns to the JAAS LoginContext object 162.

The JAAS LoginContext 162 then calls CcsLoginModule's 168 commit method. The CcsLoginModule 168 uses the cached user profiles from CCS to create the JfpPrincipal objects and store them in the subject object. The CcsLoginModule 168 object then returns to the JAAS LoginContext 164 object, which returns to the JfpLoginContext 162, which returns to the JFP action 160. The JFP action 160 then calls the JfpLoginContext 162 object's getSubjectw which delegates the call to the JAAS LoginContext 164. The returned JAAS subject object is stored in the user's session object. This subject object represents the authenticated user and contains a collection of JfpPrincipals. It is this subject object that is passed back to JAAS for subsequent re-authentication.

It is to be noted that the JFP action 160 calls only standard JAAS methods on JfpLoginContext 162, a helper class, regardless of what mechanism actually authenticates the user. The JfpLoginContext 162class in turn calls only standard JAAS methods. Other CCS methods than validateMasterCredentialsEx can be called. For example, during re-authentication, it may be necessary to call validateProductCredentials. The details surrounding the calling of CCS methods are implemented only in the JAAS pluggable modules used to authenticate against CCS and have no effect on how the JFP actions are coded (i.e. JFP is coded against only the JAAS interfaces, even in the case of re-authentication). In the above case where the CCS method validateMasterCredentialsEx is called, if the user is authenticated, a JAAS subject object is created and is associated with a JfpPrincipal object that corresponds to the master credential. In addition, any product credentials linked to the master credential are represented by the creation of additional JfpPrincipal objects that correspond to the linked product credentials. These additional JfpPrincipal objects are associated with the subject object.

Figure 28:
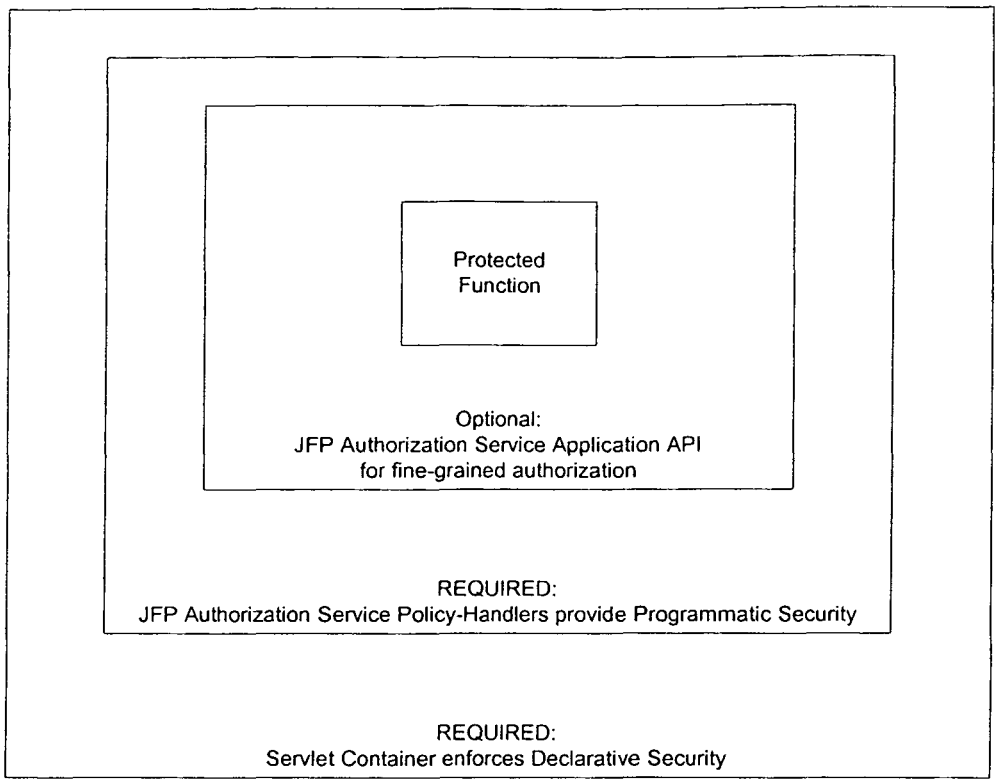
FIG. 28 is a diagram that illustrates the multi-pronged approach of JFP to authorization enforcement for embodiments of the invention.

In embodiments of the invention, the purpose of the JFP authorization service is to restrict access to resources based on user entitlements. JFP takes a multi-pronged approach to authorization enforcement in JFP by using programmatic enforcement of coarse-grained entitlements, servlet container-provided declarative security, and optional fine-grain entitlement via application query and enforcement. FIG. 28 is a diagram that illustrates the multi-pronged approach to authorization enforcement of JFP for embodiments of the invention.

With regard to programmatic coarse-grained authorization entitlement enforcement, each application is configured (in struts-config.xml) with a reference to a security policy to use to restrict access to that application. The JFP authorization service is informed as to the current user's access rights at runtime (as the session starts, as the user logs in, etc.) by other services within JFP, including primarily by the JFP authentication service. For each request, the "processRoles" method of the Struts ActionServlet's RequestProcessor is called. The JFP authentication service extends this method. The name of a security policy associated with this action is passed to the "processRoles" method. The security policy is specified in the "roles" parameter in "struts-config.xml" for this action. The JFP authorization service verifies that the action requested is in policy, for the current user's entitlements. If no security policy is specified for this action or if the action is not in policy, the request is forwarded to an error page (configurable per module). In regard to servlet container declarative security, standard J2EE servlet container configuration settings are used to supplement the JFP authorization service.

Figure 29:
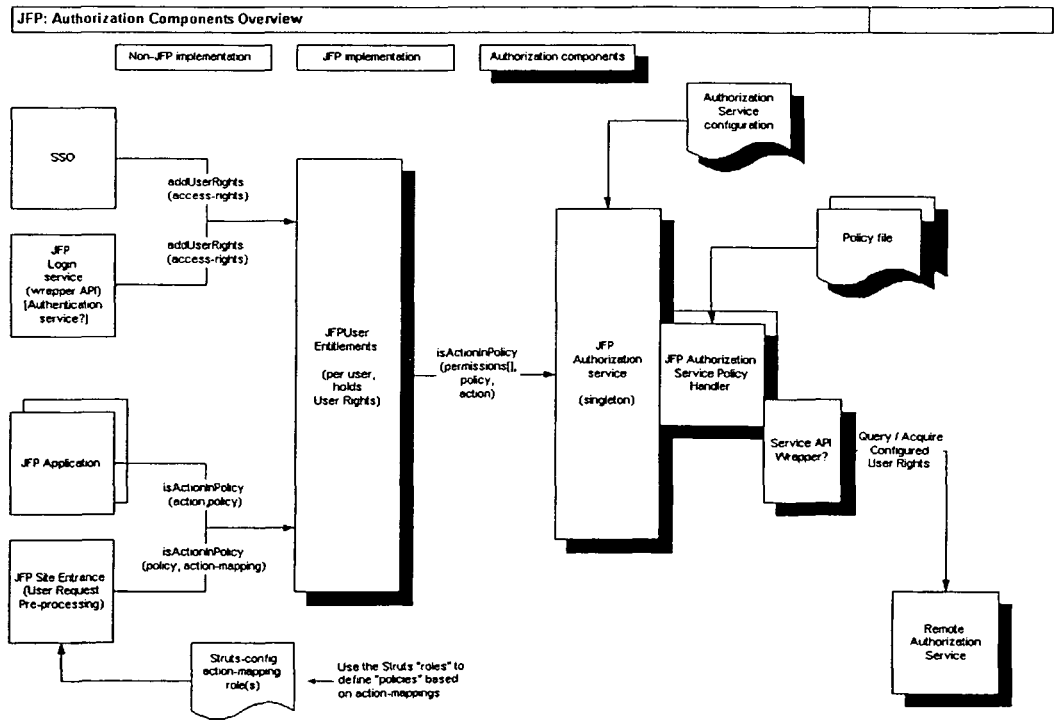
FIG. 29 is a schematic flow diagram that illustrates an overview example of the programmatic JFP authorization service for embodiments of the invention.

FIG. 29 is a schematic flow diagram that illustrates an overview example of the programmatic JFP authorization service for embodiments of the invention. In a basis for entitlements aspect, a JFP user belongs in a role (e.g. visitor, customer), and may belong to zero or more additional groups (e.g. Gold, Blue) in addition to that role, other runtime factors may also be used for authorization. All such access rights are set by other JFP services and mapped within the authorization service. Groups are associated with the user and may be identified by profile information or by database content. All access rights are available at runtime in a well-known format, e.g. ROLE_VISITOR or GROUP_CITIGOLD.

Roles (from authentication) include, for example, VISITOR, FRIEND, CUSTOMER, and CSR. Groups (from "pre-profile") include, for example, Gold, Blue, PrivateBank, BillPaymentEnabled, UserRegisteredForService, and CardType. Other access rights (from runtime data) include, for example, time of day restrictions, account balance value, source device type, and whether a service is available.

The functions of the JFP authorization service for embodiments are, for example, abstracting the actual authorization mechanism from JFP applications and services, enforcing entitlements, providing an API that allows setting user access rights, and providing an API that allows programmatic testing of user access rights. The JFP authorization service provides a consistent API for JFP applications and services. It is implemented as a single instance (per web application), with a per-user (per-session) object (JFPUserEntitlements) that holds the user's access rights.

In embodiments of the invention, primary enforcement of entitlements is performed in the Struts-based "front controller" ActionServlet to ensure that each request is valid for the current session/user context. This involves creating a JFP RequestProcessor class that extends the Struts ActionServlet's RequestProcessor, specifically the processRoles( ) method. In struts-config, the action element's "roles" attribute specifies a security policy that defines the access restrictions for the current action mapping object. The processRoles( ) method in the JFPRequestProcessor class accesses the JFP authorization service via the JFPUserEntitlements object to enforce that the current request is valid for the current customer context based on the entitlements allowed. All struts-config action mappings must have a role defined. At explicit role setting is required for all action mappings to assure that all are configured properly.

According to embodiments of the invention, most security policies are enforced using a policy handler that processes XML-defined policies.

Embodiments of the invention involve an entitlement roles and entitlement attributes setting aspect. At session startup, a reference to the JFPUserEntitlements object is stored in the JFP Base Profile. The JFPUserEntitlements object is initialized with a primary role "Visitor", which has the lowest level of entitlements. The user's primary role is set to a specific customer role at a later time by the authentication service when and if the user is authenticated. Additional access rights are set by product profile initialization code based on per-product profile information (e.g. Gold, card type, etc.). Optionally other runtime access rights can be provided by other services or applications as needed (e.g. current time, device type). Instancing of the JFPUserEntitlements object is one per-user-session. It holds a specific user's role(s), group(s), etc. for the duration of the session.

The JFPAuthorizationService singleton (per servlet context) object is created at web application startup, maps policies to policy handlers and interfaces to the policy handlers, and supports policies, such as per user, where the user's access rights are provided in the call (the normal case) and per servlet context, where the policy applies to all requests.

The primary API method is called from JFPUserEntitlements to determine whether a user is entitled to operate within the supplied policy. The access rights are the collection of values for this user from JFPUserEntitlements. If an action value was not set in the isUserInPolicy call to JFPUserEntitlements, action-mapping is set to null.

In a declarative servlet container enforced authorization aspect, since JFP has entitlements configured in the authorization service, the complexity ramifications of configuring roles also in the deployment descriptor (duplicate configuration entries) argue against configuring roles in the deployment descriptor. Instead, deployment descriptor settings are used only for "global" (to the web application) settings—e.g. settings that apply to all servlets in the web application. This is limited to a small set of functions.

In embodiments of the invention, declarative security means specifying what URL patterns are secured and what users may access those URLs. Servlet declarative security is configured in the servlet deployment descriptor file, web.xml. Declarative security in web.xml is done using two main elements—security constraints and the login configuration.

JFP for embodiments of the invention addresses common server-side security issues and threats. Sometimes the mitigation for a particular threat is a specific service, sometimes it is a process, procedure or best practice. Vulnerabilities include, for example, unvalidated parameters, broken access control, broken account and session management, cross-site scripting (XSS) flaws, buffer overflows, command injection flaws, error handling problems, insecure use of cryptography, remote administration flaws, and web and application server misconfiguration.

Overload Control and Session and Portlet Throttle

In an additional aspect, the JFP for embodiments of the invention provides overload protection for a system whose performance has exceeded defined limits ("SLAs"). JFP uses the site entrance filter to refuse new session requests if the baseline performance of the system has exceeded an SLA. This aspect relates to the overall performance of the system and the refusal JFP for embodiments of the invention automatically disables "portlets" from a homepage if a "portlet" exceeds its SLA. Essentially, certain functions are gracefully shut off or disabled if individual functions exceed their SLA's. Specifically, difficulties arise in maintaining a home page with a number of different portlets (i.e., the little rectangles of information displayed on the home page) that typically get their data from different external systems. If any of these portlets begin to take too long to gather data from their external sources, the JFP for an embodiment of the invention automatically disables them and takes them out of the rotation, while keeping the system running for the customer, albeit with slightly diminished functionality.

Overload control for Internet servers is discussed in a paper entitled "Adaptive Overload Control for Busy Internet Servers" by Matt Welsh and David Culler of Intel Research, Berkeley and University of California, Berkeley, the text of which can be found at: www.eecs.harvard.edu/~mdw/papers/control-usits03.pdf. The basic premise of the paper is that response time can be controlled by measuring response time and if it exceeds a threshold, then input to the system is throttled until such time as response time has recovered.

Aspects of overload control at the site entrance (SE) in JFP for embodiments of the invention represent an improvement over the methods discussed in the above-identified paper. The particular thing about which users care, namely response time is controlled in embodiments of the invention. Thus, if a page cannot be served in a timely fashion, the JSP responds quickly with an "I'm sorry" page. JFP for embodiments of the invention utilizes a weighted average response time which is computationally desirable and has been found to yield good results. Further, rather than taking values between zero and one for a throttle setting p (the throttle randomly accepts new requests with probability p), embodiments of the invention use only two values for p (i.e., 0 and 1).

In embodiments of the invention, a session throttle in the site entrance filter (SE) acts to limit the number of new sessions during an overload situation. Ideally, the response time of the "login" page is monitored and as it exceeds the threshold, no new sessions are taken by responding with a "Sorry, I'm busy now" page. Alternatively, the Weblogic queue length is monitored and the throttle is based on the measure which is available in the standard Weblogic MIB through the JMX Mbeans.

For example, let:

BusyThreads=current number of busy threads at the arrival of a request for the login page, W=response time weight, a number between 0 and 1, WBT=the weighted queue length, WBT=W*WBT+(1−W)*BusyThreads, BTmax=maximum busy thread threshold, MTmin=minimum busy thread threshold.

Large values of W make the algorithm slower to react to increasing queue length (delay), and it has been found that 0.95 works well. It has also been found that using numbers such as 160 and 180 for BTmax and BTmin in simulation of a multi-cpu (with 8 CPUs) multithreaded (with 200 threads) server works well.

Upon arrival to SE of a request for a "login" page:

```
Upon arrival to SE of a request for a "login" page:
If Accept = true then
    Present login page
    BusyThreads = executeQueueRuntimeExecuteThreads -
    executeQueueRuntimeExecuteThreadCurrentIdleCount
    WBT = W*WBT+(1−W)*BT
    If WBT > BTmax then
        Accept = false
    End if
Else
    Present "Sorry, I'm busy" page
    BusyThreads = executeQueueRuntimeExecuteThreads -
    executeQueueRuntimeExecuteThreadCurrentIdleCount
    WBT = W*WBT+(1−W)*BT
    If WBT < BTmin then
        Accept = true
    End if
End if
```

Another aspect of embodiments of the invention involves monitoring individual portlet response time and automatically turning off a portlet that is not responsive.

In this aspect, let:

RT=the last individual response time for this portlet,

W=response time weight, a number between 0 and 1,

WRT=the weighted average response time, WRT=W*WRT+(1−W)*RT,

RTmax=maximum response time threshold,

RTmin=minimum response time threshold.

Large values of W make the algorithm slower to react to increasing delay, and it has been found that 0.5 works well. Use of 10 and 5 times the nominal service time for Rtmax and Rtmin respectively in simulation of a single server also works well.

In this aspect, upon an arrival of a portlet request:

```
If Accept = true then
    Get and return the portlet information
    RT = current time − request time
    WRT = W*WRT+(1−W)*RT
    If WRT > RTmax then
        Accept = false
    End if
Else
    Return a link to the portlet information
    RT = current time − request time
    WRT = W*WRT+(1−W)*RT
    If WRT < Rtmin then
        Accept = true
    End if
End if
```

In one aspect, the portlet throttle permanently turns off a portlet and requires human interaction to restore it. Alternatively, automatic restoring of a portlet can be achieved by using a probalistic throttle (0<p<=1).

Sequence Protection and Sub-App Context Management

JFP for embodiments of the invention also provides sequence protection of any application without the need for overt procedural code in the application by the application programmer. This is accomplished by extending Struts action mappings in order to allow an application developer to declare several aspects of sequence protection. First an application developer can declare an action mapping to be an "entry point", so that any attempted access request to an action mapping that is not marked as an entrypoint for which there is no existing "subapp" context, will be automatically refused. Further, an application developer can declare that each and every action mapping is sequence protected. If an action mapping is declared to be sequence protected a "token" (embodied in a hidden field and set via a custom JFP tag) must be present in order to access an action mapping. A user is only allowed access to those action mappings, that previously appeared in a response. The application is therefore able to declaratively proscribe which action mappings can be accessed and when, in order to enforce the sequential use of action mappings and to prohibit arbitrary "jumping around" in an application. Such sequence protection is necessary in many financial applications where a controlled sequence of screens is necessary to safely and completely carry out a financial transaction for a user. In either case, users are prevented from accidentally or maliciously jumping around in a financial application and must instead follow the sequencing that the application needs to enforce in order to maintain the integrity of the financial application process.

The JFP for embodiments of the invention also provides for a user at a client browser to be informed and or prohibited from abandoning an "in-process" transaction. JFP does this with custom JSP tags and JavaScripts. There are two levels, warn and prohibit. At certain stages of a transaction, via the use of customer JSP tags, an application is able to declare that users should be warned if they try to "navigate away" from a currently incomplete transaction. An application can also prohibit "navigating away", again thru the use of custom JFP tags at certain "commit" points in a screen sequence where the transaction is in the process of being "committed" and the user must wait for a response. Thus, a user in the middle, for example, of making a payment who attempts to navigate away from that process can be prevented from doing that. An application can basically declaratively say either "I want to warn a user" or "I want to prohibit the user from navigating away". Typically, a user is warned against navigating away if the user is in the middle of a particular process and has not completed it. A user is prohibited from navigating away if the user is at the midpoint of the application where everything needed for a transaction has been collected and the application is off performing and committing the transaction, and it is important for the user to wait until a response is received. Depending on the circumstances, the application declaratively tells the system the user is to be either warned or prohibited from navigating away from a function.

Sub-App Sequence Protection, Switching and Context Cleanup

Major mechanisms in the JFP sub-app framework for embodiments of the invention include, for example, sub-app sequence protection, sub-app switching and context cleanup, and shared context between sub-apps. In the sub-app sequence protection mechanism, JFP framework provides protection from sub-app actions being requested out of sequence. Synchronizer token and valid action mappings mechanisms working together give the JFP framework the ability to protect order or flow of request.

The synchronizer token mechanism protects clients from out of sequence and duplicate request submissions. Generally duplicate request submissions occur when a user submits a form which was already submitted. In the synchronizer token mechanism of JFP for embodiments of the invention, process action based on the value of action mapping attribute, "tokenRequired", generates a token value using TokenProcessor API. This token value is stored in the sub-app context associated with the action mapping. The token is stored as a hidden field on the form or as query string parameter on a link. JFP custom tag (jfp:link) is responsible for retrieving the token from the sub-app context if the action mapping attribute, "tokenRequired" is set to "true". Token is placed on the query string parameter. If the link uses a formPostName attribut, then the form submitted has the token as hidden input field and it is necessary to also write the token on the query string parameter. JFP custom tag (jfp:form) behaves similar to jfp:link tag. A difference is when "tokenRequired" is set to "true", then the tag writes a hidden input field to the response stream. Logic added to the process action checks the token in request parameter matching the token stored in the sub-app context if "tokenRequired" attribute of action mapping is set to true. This logic is affected by two flags declared as <set-property>sub-elements of action mapping in struts-config:

"tokenRequired" <set-property> sub-element of Action Mapping. The check will be done only if "tokenrequired" is set to "true".

"entryPoint" <set-property> sub-element of Action Mapping. The check will not be done for a start(entrypoint) Action.

The following is an example of action mapping elements in struts-config.xml to support synchronizer tokens.

```
<action .... attribute="/jba/jbaMakeTransferContext" ....>
    <set-property property="entryPoint" value="true"/>
    <set-property property="tokenRequired" value="true"/>
</action>
```

In the foregoing, attribute="/jba/jbaMakeTransferContext" is the name of the session or request attribute under which sub-app context is stored. Depending on whether the sub-app context is request or session scoped and the value of controller status returned by controller helper, a sub-app context may reside either under an attribute in request or session. It is used by JSP tags to locate sub-app context. In addition, property="entryPoint" is a Boolean value indicating whether an action is the start action. This field is optional and by default is set to "false". Further, property="tokenRequired" is a Boolean value indicating whether a token comparison is required for sequence protection of a page. This field is optional and by default is set to "false".

Each sub-app supporting the synchronizing token must use JFP navigation links. Also the <jfp:link> needs to add an attribute for the links which need to carry the token. The following will be the format of jfp:link tag:

```
<jfp:link formPostName="formName" .../>
<jfp:form ...>
```

The "formPostName" attribute allows the link to perform post using JavaScript API. When the attribute is used, tag places a JavaScript call inside href. This JavaScript function takes the form name as parameter and calls submit of the form referred by the name in "formPostName" attribute. Token is not written in the query string parameter of link if the link is performing a form post. By default, the href performs a get operation.

Figure 30:
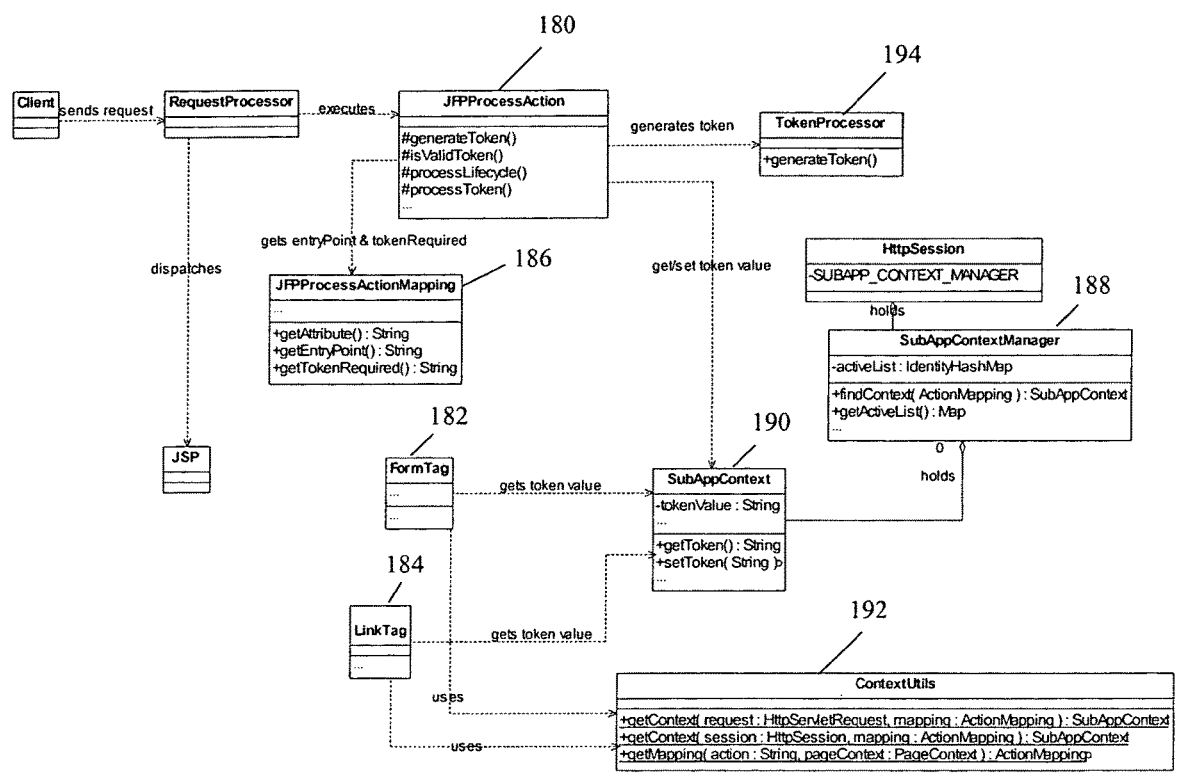
FIG. 30 is a diagram that illustrates an example of the Class Structure in the synchronizer token aspect for embodiments of the invention.

FIG. 30 is a diagram that illustrates an example of the class structure in the synchronizer token aspect for embodiments of the invention. Referring to FIG. 30, the Participants include, JPRProcessAction 180, JFPFormTag 182, JFPLinkTag 184, JFPProcessActionMapping 186, SubAppContextManager 188, SubAppContext 190, and ContextUtil 192. JFPProcessAction 180 checks for start(entrypoint) action, checks for tagRequired flag and if set to true compares the token retrieved from SubAppContext 190 of the action with the token returned from the client in a request parameter, and generates a token if the "tokenRequired" attribute of action mapping is set to "true". The token is generated calling API of TokenProcessor 194 object (derived or using standards Struts util classes).

JFPFormTag 182 writes a hidden field with the token value in a form by accessing the token value from SubAppContext 190. JFPLinkTag 184 writes token string to query string parameter when the corresponding action mapping has the attribute "tokenRequired" set to "true". JFPProcessActionMapping 186 holds the entry point attribute, holds the token required attributes, and holds the sub-app context name of an action in attribute "attribute". SubAppContextManager 188 is a session object which holds the reference to all active sub-app contexts. This object is referenced by the session attribute, "SUBAPP_CONTEXT_MANAGER". SubAppContext 190 holds the value of synchronizer token. ContextUtil 192 provides helper static function for retrieving a sub-app context belonging to an action mapping and provides helper static function for getting an action mapping given an action name.

Valid action mappings mechanism is a complementary mechanism to synchronizer token for providing sequence protection. In the valid action mappings mechanism, when ActionForwards are being rendered to the outgoing response (at the tail-end of request/response cycle), the JFP navigation tag first finds the action mapping instance representing an action specified on the "Action" attribute of the navigation tag. A comparison is then made between the sub-app context names associated with this action mapping and the action mapping of the current request. If the two sub-app context names are the same, the navigation tag adds the tag's action mapping belonging to a list of valid action mappings kept with the SubAppContext 190. The JFP navigation tags which provide this service are jfp:link and jfp:form. In the incoming request, JFPProcessAction 180 checks to see if its action mapping is in the list of valid action mappings.

The following is an example of action mapping elements in struts-config.xml to support valid action mappings.

```
<action .... attribute="/jba/jbaMakeTransferContext" ....>
    <set-property property="entryPoint" value="true"/>
    <set-property property="tokenRequired" value="true"/>
</action>
```

In the foregoing action mapping elements, attribute="/jba/mt/subappName" is the name of sub-app context. This field is required for all action mappings. Further, property="entryPoint" is a Boolean value indicating whether an action is the start action. This field is optional and by default is set to "false". Additionally, property="tokenRequired"—a Boolean value indicating whether a token comparison is required for sequence protection of a page. This field is optional and by default is set to "false".

Each sub-app supporting the valid action mappings must use JFP navigation links.

```
<jfp:link formPostName="formName" .../>
<jfp:form ...>
```

Figure 31:
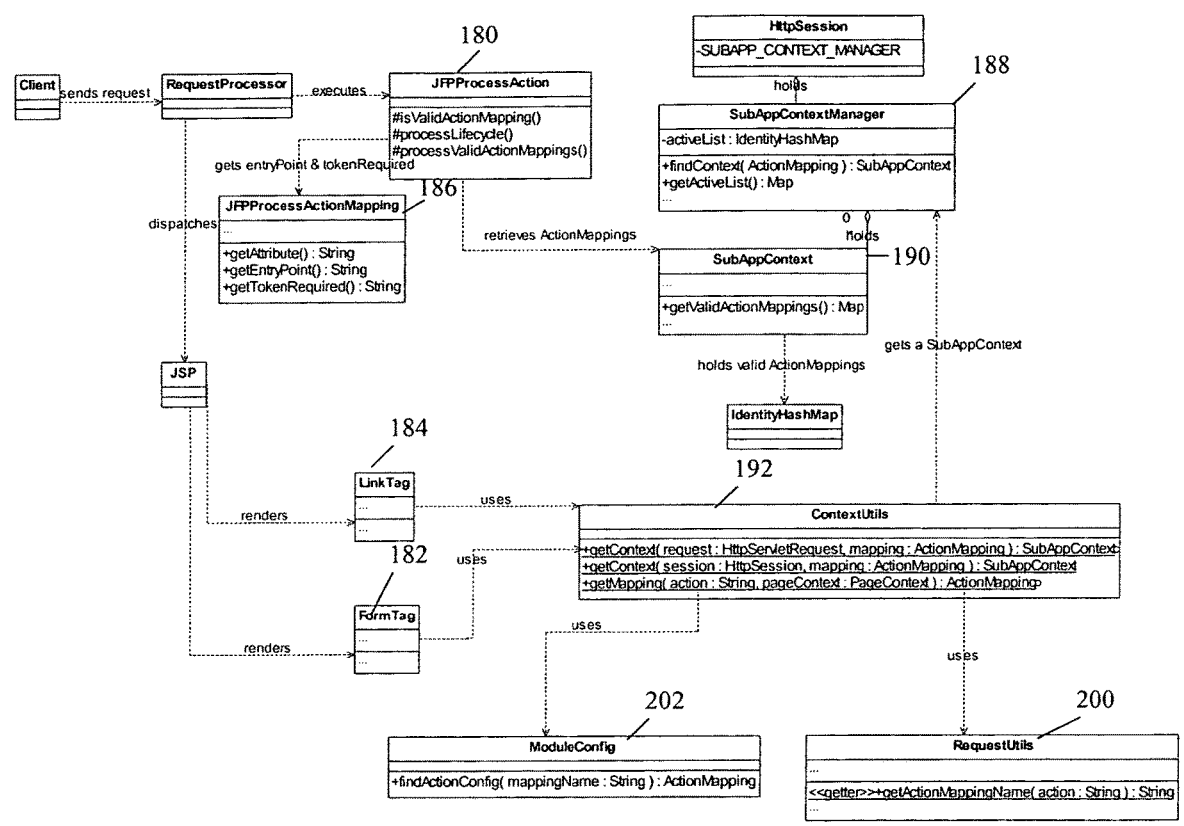
FIG. 31 is a diagram that illustrates an example of the class structure in the action mappings aspect for embodiments of the invention.

FIG. 31 is a diagram that illustrates an example of the class structure in the action mappings aspect for embodiments of the invention. Referring to FIG. 31, the participants include, for example, JFPProcessAction 180, JFPLinkTag 184, JFPFormTag 182, SubAppContextManager 188, and SubAppContext 190. JFPProcessAction 180 compares the current action mapping with the valid action mapping list stored in the SubAppContext. If a match is found, then ProcessAction 180 continues with the normal operation. Otherwise, the out-of-sequence ActionForward is invoked. JFPLinkTag 184 gets a link's address, translates the address to action mapping (using RequestUtil 200 and ModuleConfig 202), and if the link's action mapping has <set-property> "entryPoint" set to "true", then return. In addition, JFPLinkTag 184 compares the sub-app context names of the link's action mapping against the request's action mapping (using ContextUtil.getSubAppContextName(ActionMapping) to obtain the context names) and if names are different then return. Further, JFPLinkTag 184 gets the sub-app context of the request action mapping (using ContextUtil.getSubAppContext(ActionMapping)) and puts the action mapping in the validActionMappings IdentityMap of SubAppContext 190. JFPFormTag is similar to JFPLinkTag except a hidden input field in written to the response stream. SubAppContextManager 188 comprises a map holding the active sub-app contexts that resides in a session attribute (SUBAPP_CONTEXT_MANAGER). SubAppContext 190 holds a reference to the valid action mappings (map).

Figure 32:
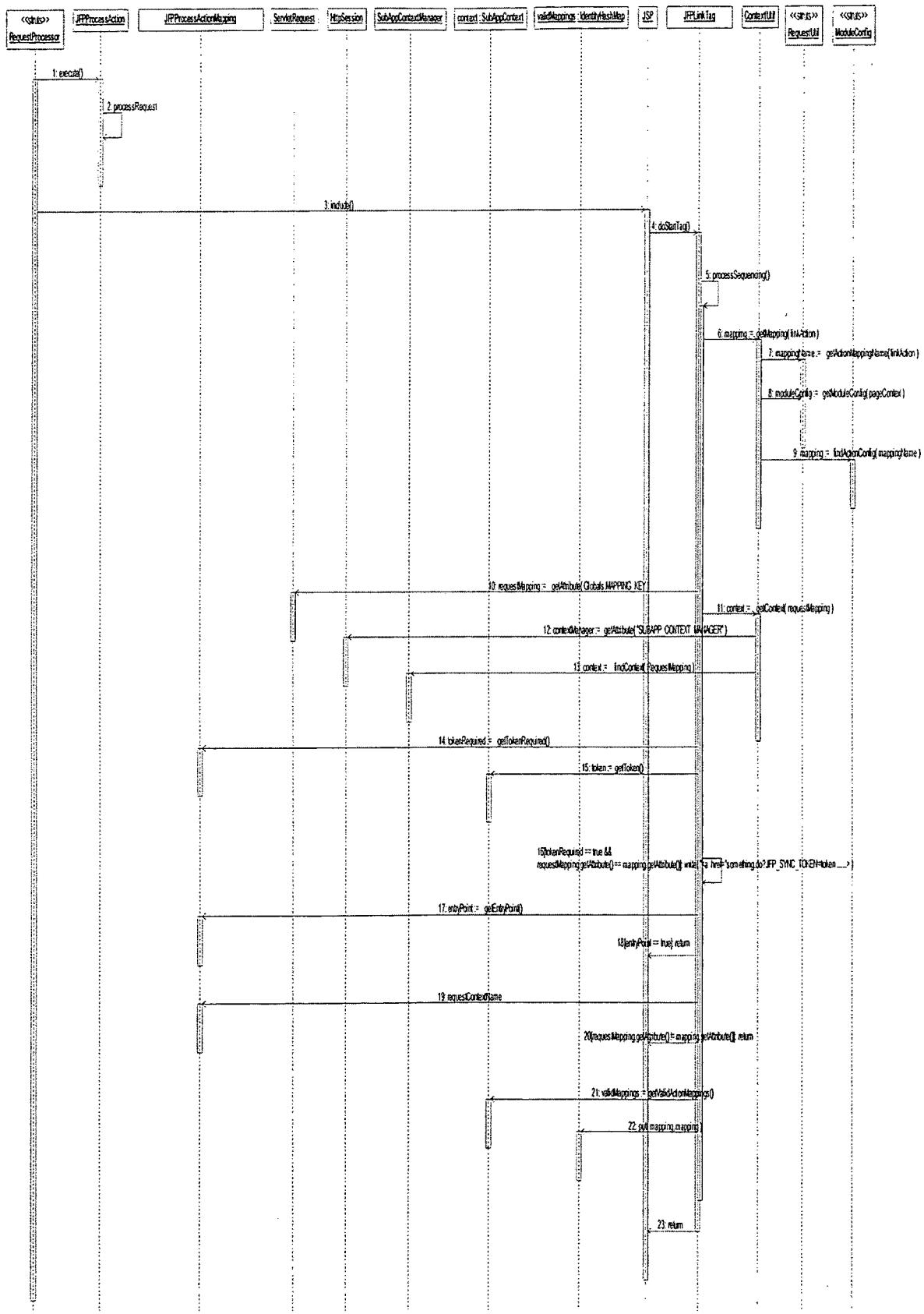
FIG. 32 is a sequence diagram that illustrates an example of the JFP:link sequence protection in JFP for embodiments of the invention.
Figure 33:
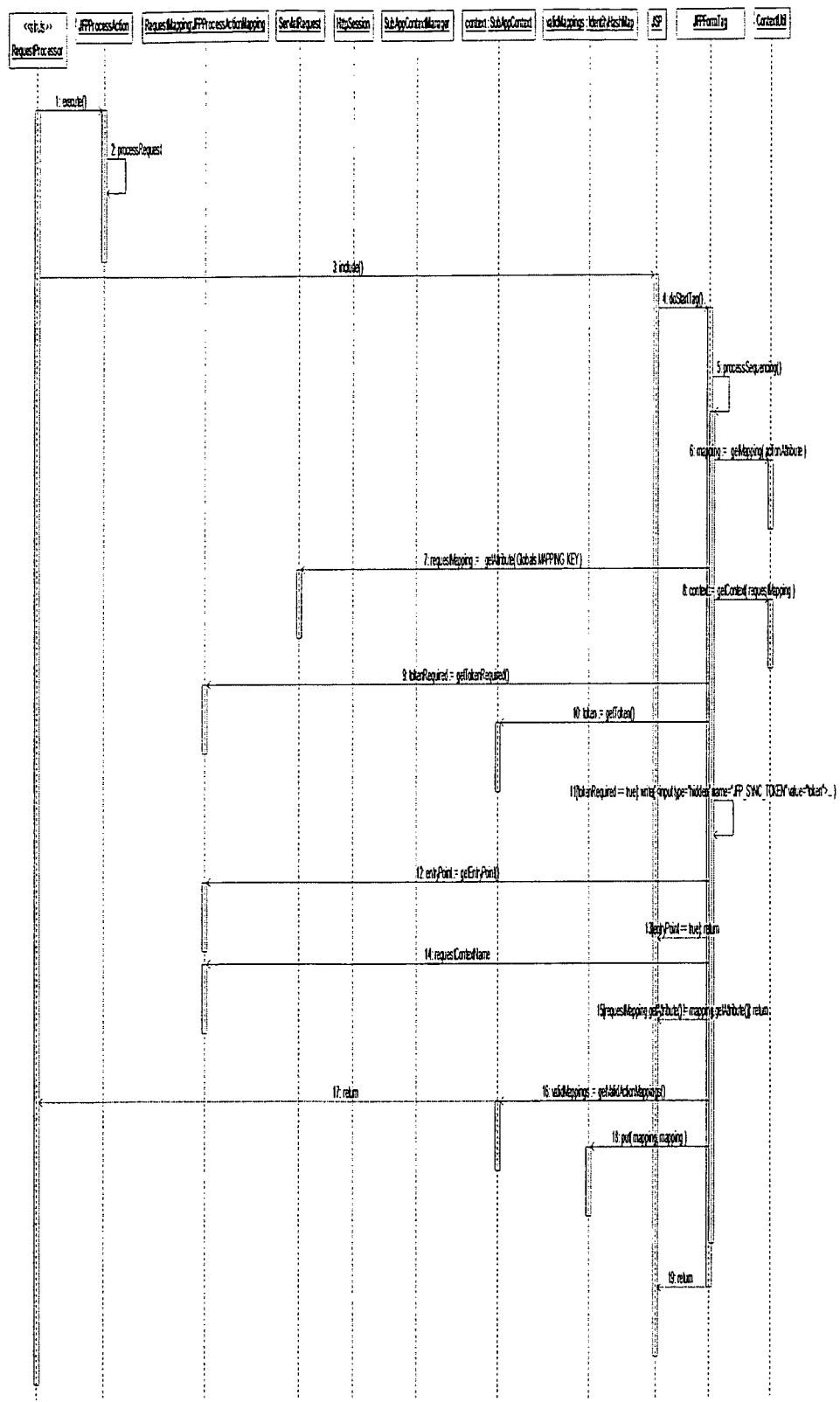
FIG. 33 is a sequence diagram that illustrates an example of the JFP:form sequence in JFP for embodiments of the invention.
Figure 34:
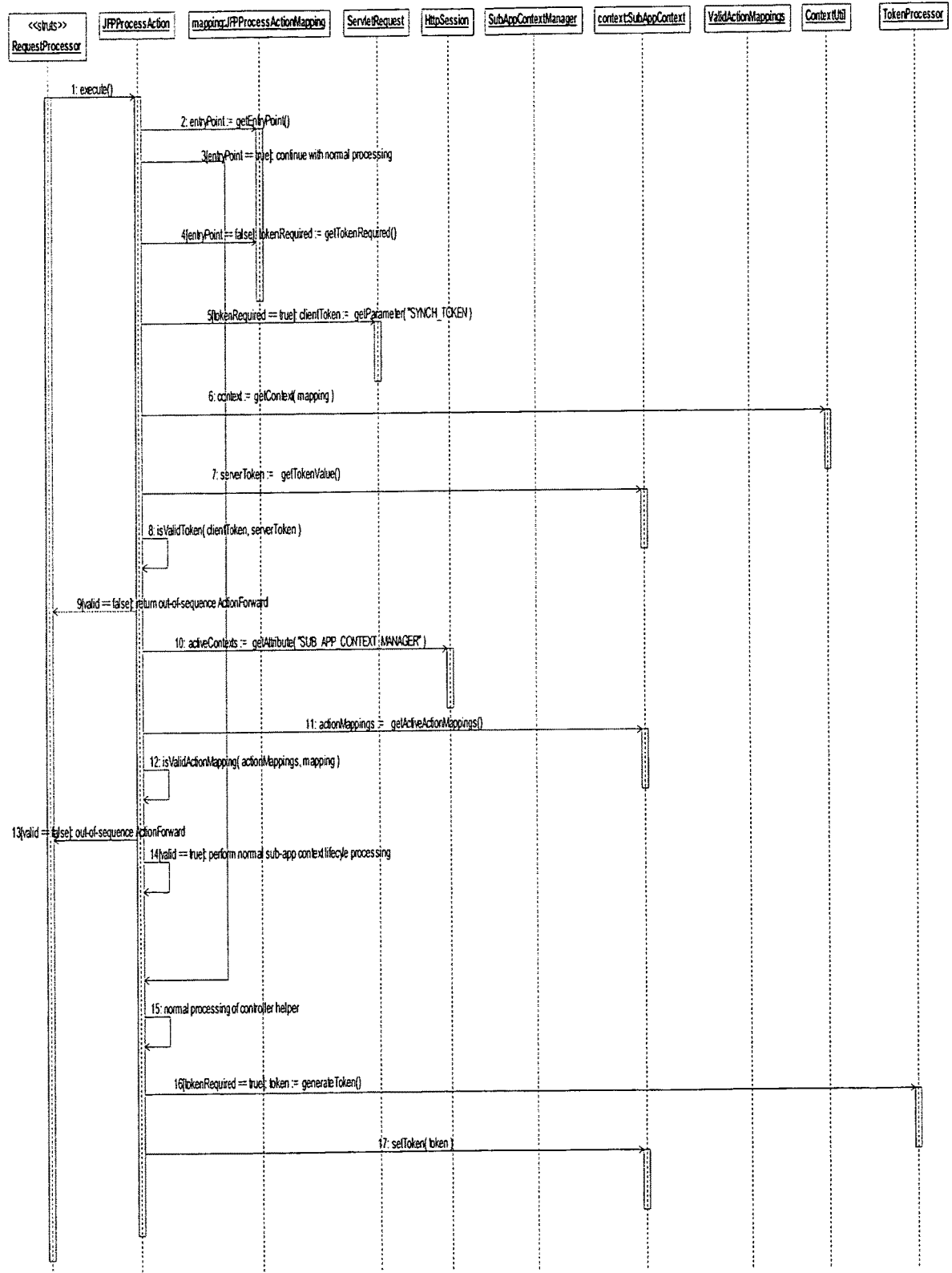
FIG. 34 is a sequence diagram that illustrates an example of the process action sequence protection processing in JFP for embodiments of the invention.

FIG. 32 is a sequence diagram that illustrates an example of the jfp:link sequence protection in JFP for embodiments of the invention. FIG. 33 is a sequence diagram that illustrates an example of the jfp:form sequence in JFP for embodiments of the invention. FIG. 34 is a sequence diagram that illustrates an example of the process action sequence protection processing in JFP for embodiments of the invention.

In a sub-app switching and sub-app context cleanup aspect of the JFP for embodiments of the invention, JFP navigation framework and sub-app framework are primarily responsible for providing enforcement mechanism of policies regarding cleanup of sub-app context and switching. JFP framework allows individual sub-apps to be responsible for cleaning up of their own state when possible such as when a transaction is done or when the user calls cancel. Primary mechanisms for this purpose include, for example, a client-side enforced, server-side specified, mechanism to warn or prohibit a user from switching between sub-apps under certain conditions, a server-side mechanism to manage sub-app context cleanup, based on a "sub-app co-existence" policy file, and a companion server-side mechanism to allow automatic sub-app context cleanup after a sub-app has sent its "final" response.

Regarding the client-side enforced—server-side specified switching control mechanism, in certain situations and under the control of server-side sub-apps, JFP provides client-side JavaScript support for warning and prohibiting users from switching away from an active sub-app to a different sub-app or site. To provide the client-side enforcement mechanism, JFP navigation framework provides a jfp:warn tag that provides a navigation warning pop-up to the user. The user can either click "ok" for the navigation request to be sent to the server or press "cancel" in which case no request is sent to the server. Also to provide the client-side enforcement mechanism, the JFP navigation framework provides a jfp: lock tag that prohibits the user from navigating away and pops-up a dialog indicating this prohibition.

Figure 35:
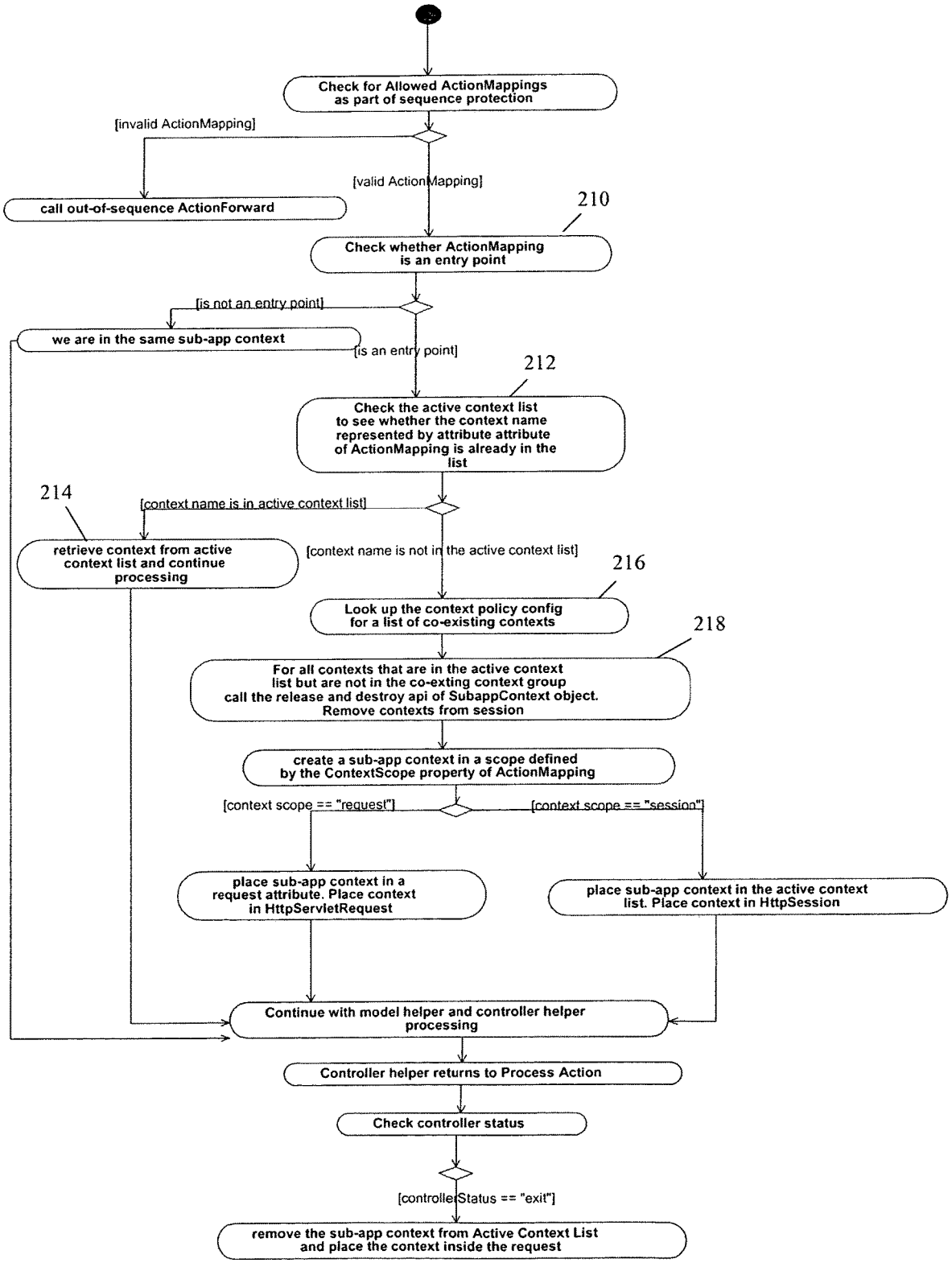
FIG. 35 is an activity diagram that illustrates an example of the process of server-side management of sub-app context cleanup of JFP for embodiments of the invention.

FIG. 35 is a schematic flow diagram that illustrates an example of server-side management of sub-app context cleanup of JFP for embodiments of the invention. In regard to server-side management of sub-app context cleanup, server-side enforcement is provided primarily by the base action class JFPProcessAction. ProcessAction 210 on each request invocation checks whether the action mapping is an "EntryPoint". "EntryPoint" is a <set-property> attribute of action mapping in struts-config.xml. If the action mapping is an EntryPoint, a call 212 is made to the SubAppContextManager class to get or create a sub-app context. The SubAppContextManager is a session object responsible for managing the state of sub-app contexts. This class holds a map of active sub-app contexts and generally is responsible for returning a sub-app context 214 for an action mapping if context already exists in the map of active sub-app contexts or for creating one. A sub-app context can be "request" or "session" scoped. The implication is that the SubAppContextManager for the case of "request" scoped objects creates the sub-app context and places the context in a session attribute. "Session" scoped objects are placed in a session attribute and a reference kept in the active sub-app context list. The context scoped is defined as a <set-property> element of action mapping in struts-config.xml.

Before creating the sub-app context, context manager will check to see for a particular sub-app context name if there are any co-existence policy defined 216 using the SubAppContextPolicyManager (policy manager). The job of this class is to provide a group of co-existing sub-app contexts in the active sub-app context. There is a template used for defining co-existing contexts. ContextManager then compares each member of this group against a member of active sub-app context map. Any context that is not present in the group is destroyed by calling the sub-app context's release and destroy API. The context manager then removes the reference to the context from session 218. If there is no policy defined for a sub-app context, all context in active the sub-app context list is destroyed. Process action will then perform its normal activities by calling model helpers and controller helper.

Controller helper's execute method is modified to return a controllerHelperResult object. This object has an attribute, "controllerStatus", which is a hint for further cleanup of sub-app contexts. If a controller helper is aware that a certain transaction has either completed or aborted 220, it sets the controllerStatus to "exit". Process action then calls the re-scope API of SubAppContextManager to remove a "session" scoped context from session attribute and active sub-app context map. The release API of SubAppContext is called and the context is added to a request attribute which is eventually cleaned up at the end of request-response cycle. A lifecycle session listener object is a J2EE session listener responsible for creating an instance of SubAppContextManager and placing a reference in session attribute (on session created event). This object is also responsible for destroying the SubAppContextManager object (on session destroyed event).

The following is an example of action mapping elements in struts-config.xml to support synchronizer tokens.

```
<action .... attribute="/jba/jbaMakeTransferContext" ....>
    <set-property property="entryPoint" value="true"/>
    <set-property property="contextScope" value="request/session"/>
</action>
```

In the foregoing example, attribute="/jba/jbaMakeTransferContext" is name of the request or session attribute under which sub-app context is stored. It is used by jsp tags to locate sub-app context. In addition, property="entryPoint" is a Boolean value indicating whether an action is the start action. This field is optional and by default is set to "false". Further, property="contextScope" is a string which provides the directive to SubAppContext Manager to create a sub-app context in "request" or "session" scope. This field is optional and by default is set to "request". "Request" scope allows for easy and automatic cleanup of sub-app contexts at the end of a request-response cycle.

JSP pages may contain the tags, jfp:warn Tag and jfp:lock Tag, which provide warning pop-up or prohibit user from navigating away to other sub-apps. The jfp:warn Tag is a custom tag that sets a JavaScript variable which causes a pop-up to display when a user tries to navigate away from the sub-app. If a user presses the "OK" button, a request is sent to server for an action that is an EntryPoint. Process action then handles the appropriate sub-app context cleanup and context creation. If a user presses cancel, no request is generated. The following is the format of the tag:

```
<jfp:warn key="contentId" bundle="bundleId"
    includeScriptTag="true/false"/>
```

In the foregoing tag format, key="contentId" is contentId for the message to be displayed; bundleId="bundleId" is the Struts style bundle id, and includeScriptTag="true/false" is a flag which directs the tag to either include an html SCRIPT tag with the JavaScript code or just include the code. This field is optional and by default is set to "false".

The following is a sample HTML fragment which is written by the tag.

```
<script>
    setSubAppBusy("warn", message);
</script>
``` where setSubappBusy is a JavaScript function which sets the warn flag and the message to be displayed. The navigation framework at appropriate places, such as clicks on links or submits of form, calls the JavaScript function: confirmGo( ). An attribute is also added to jfp:link to direct the confirmGo function not to pop-up warning dialogs as follows.
    <jfp:link    warn="true/false"    formPostName= "formName" . . . />
where warn="true/false" is a flag which directs confirmGo JavaScript to pop-up warning dialog (on the onClick) when "warn" attribute is set to "true". This field is optional and by default is set to "true".

The jfp:lock Tag is a custom tag that sets a JavaScript variable which prohibits any task switching after a user has submitted the form. A pop-up displays with an appropriate message. When the form is submitted, JavaScript code for onSubmit checks the lock flag and if set, code calls setSubAppBusy("lock", message). The format of the jfp:lock Tag is as follows.

```
<jfp:lock key="contentId" bundle="bundleId"
    includeScriptTag="true/false"/>
``` where key="contentId" is the content Id for the message to be displayed, bundleId="bundleId" is the Struts style bundle id, and includeScriptTag="true/false" is a flag which directs the tag to either include an html SCRIPT tag with the JavaScript code or just include the code. This field is optional and by default is set to "false".

The following is a sample HTML fragment which is written by the tag when "includeScriptTag" is set to "false".
    setSubAppBusy("lock", message);
This means, for example, another JavaScript function is calling this function. onSubmit JavaScript code always makes the call to the function which wraps this line of code.

Figure 36:
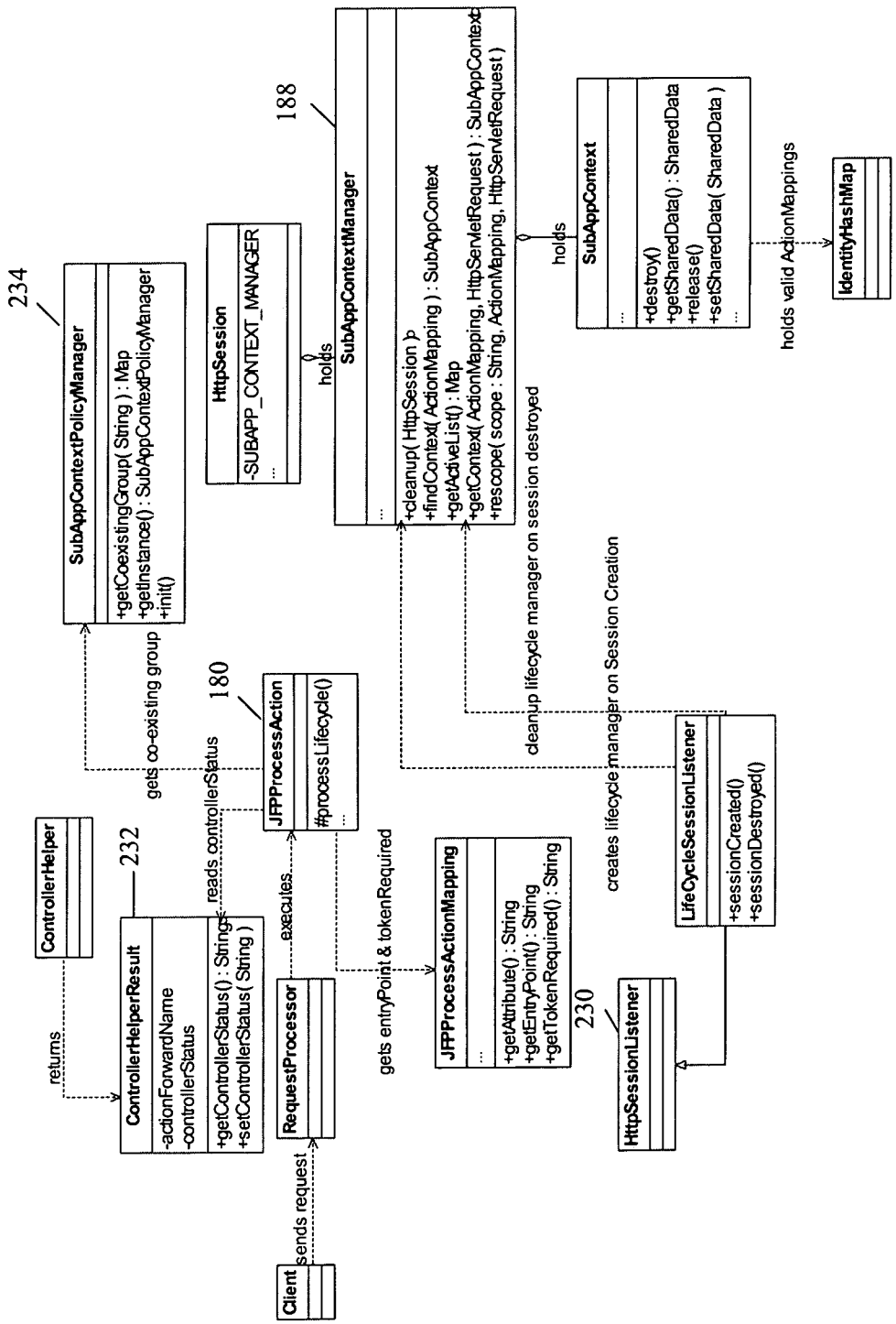
FIG. 36 is a schematic diagram that illustrates an example of participants and responsibilities the server-side management of sub-app context cleanup of JFP for embodiments of the invention.

FIG. 35 is a diagram that illustrates an example of participants in the server-side management of sub-app context cleanup of JFP for embodiments of the invention. Referring to FIG. 36, the participants include JFPProcessAction 180, SubAppContextManager 188, HttpSessionListener 230, and ContextUtil 192. JFPProcessAction 180 checks for start (EntryPoint) action and then makes a getContext call to SubAppContextManager 188 to either get or create a sub-app context. JFPProcessAction 180 is responsible for checking the controllerStatus attribute of ControllerHelperResult 232 object. If this value is set to "exit" then the process action attempts to move "session" scoped sub-app context from session attribute to request attribute. The sub-app context is then cleaned up at the end of request-response cycle. SubAppContextManager 188 is responsible for managing active sub-app contexts. When a request comes in for a specific sub-app contextname, context manager 188 will first check to see if the object is in the active sub-app context map. If the object is in the list, the context manager 188 returns the pointer to object. Otherwise, it will consult the SubAppContextPolicyManager 234 for a group of sub-app contexts that can co-exist together in the active sub-app context map. SubAppContextManager 188 is also responsible to destroying sub-app contexts that are not in the co-existing group, for creating a sub-app context either in the "request" or "session" scope, and for re-scoping operations such as rescoping a sub-app context from "session" to "request".

HttpSessionListener 230 is responsible for creating one instance of SubAppContextManager in the HttpSession object. The name of the session attribute holding the context manager object is: "SUBAPP_CONTEXT_MANAGER" and for destroying the SubAppContextManager on the session destroyed event. SubAppContextManager 188 in turn destroys all the active sub-app contexts. ContextUtil 192 provides helper static function for retrieving a sub-app context belonging to an action mapping and helper static function for getting an action mapping given an action name.

Figure 37:
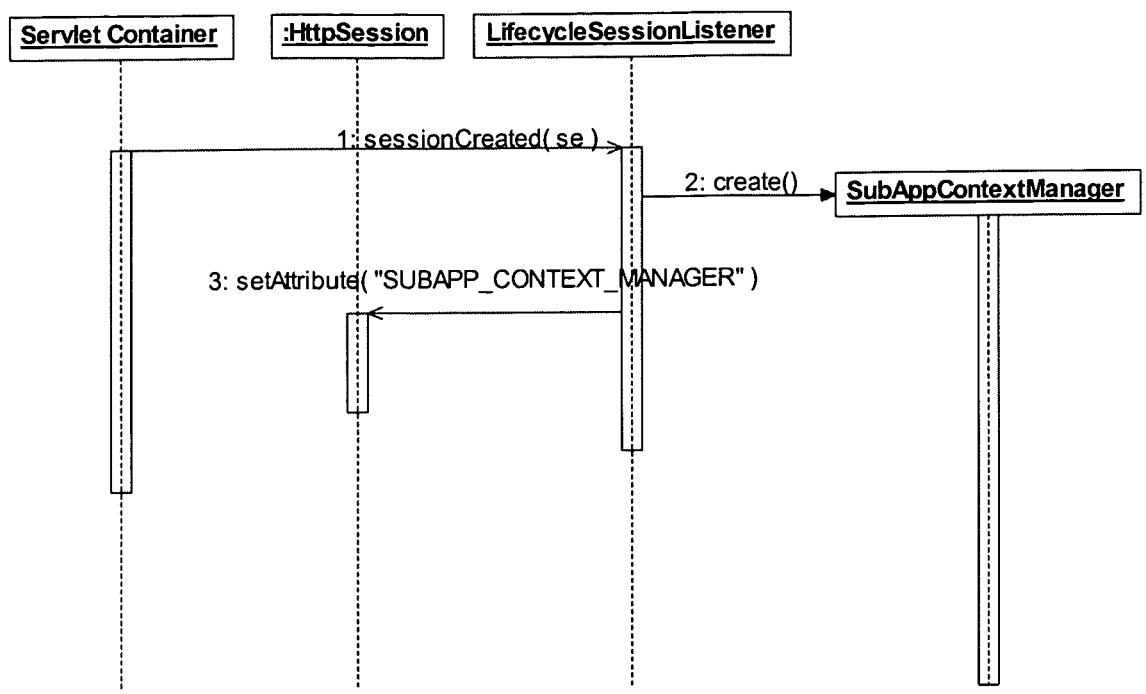
FIG. 37 is a sequence diagram that illustrates an example of sub-app context manager creation in JFP for embodiments of the invention.
Figure 38:
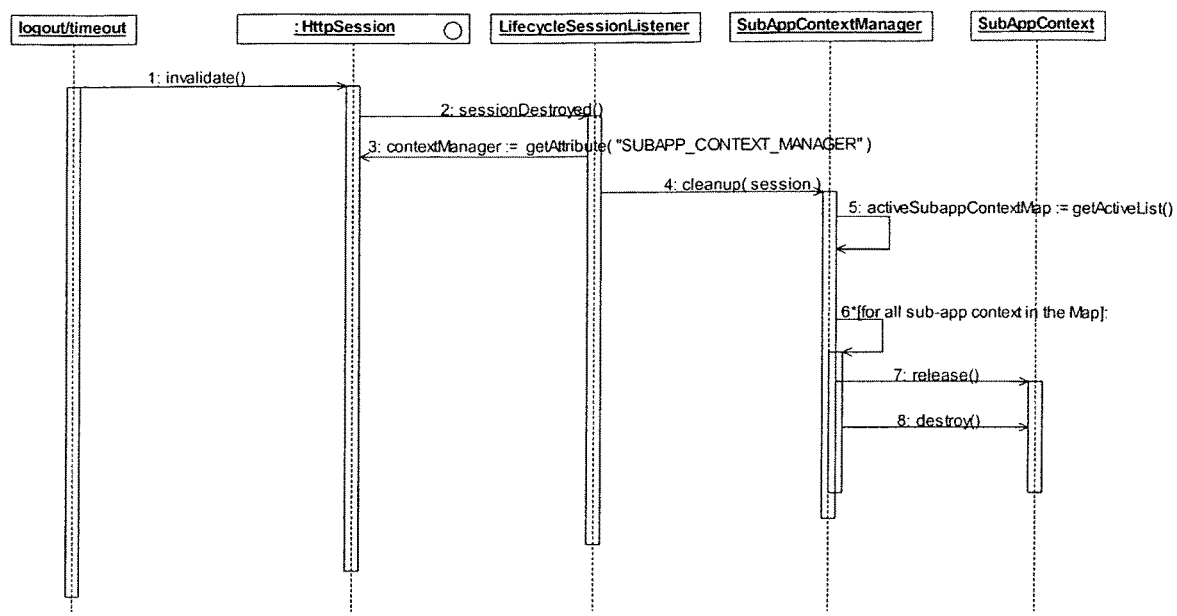
FIG. 38 is a sequence diagram that illustrates an example of sub-app context manager termination in JFP for embodiments of the invention.
Figure 39:
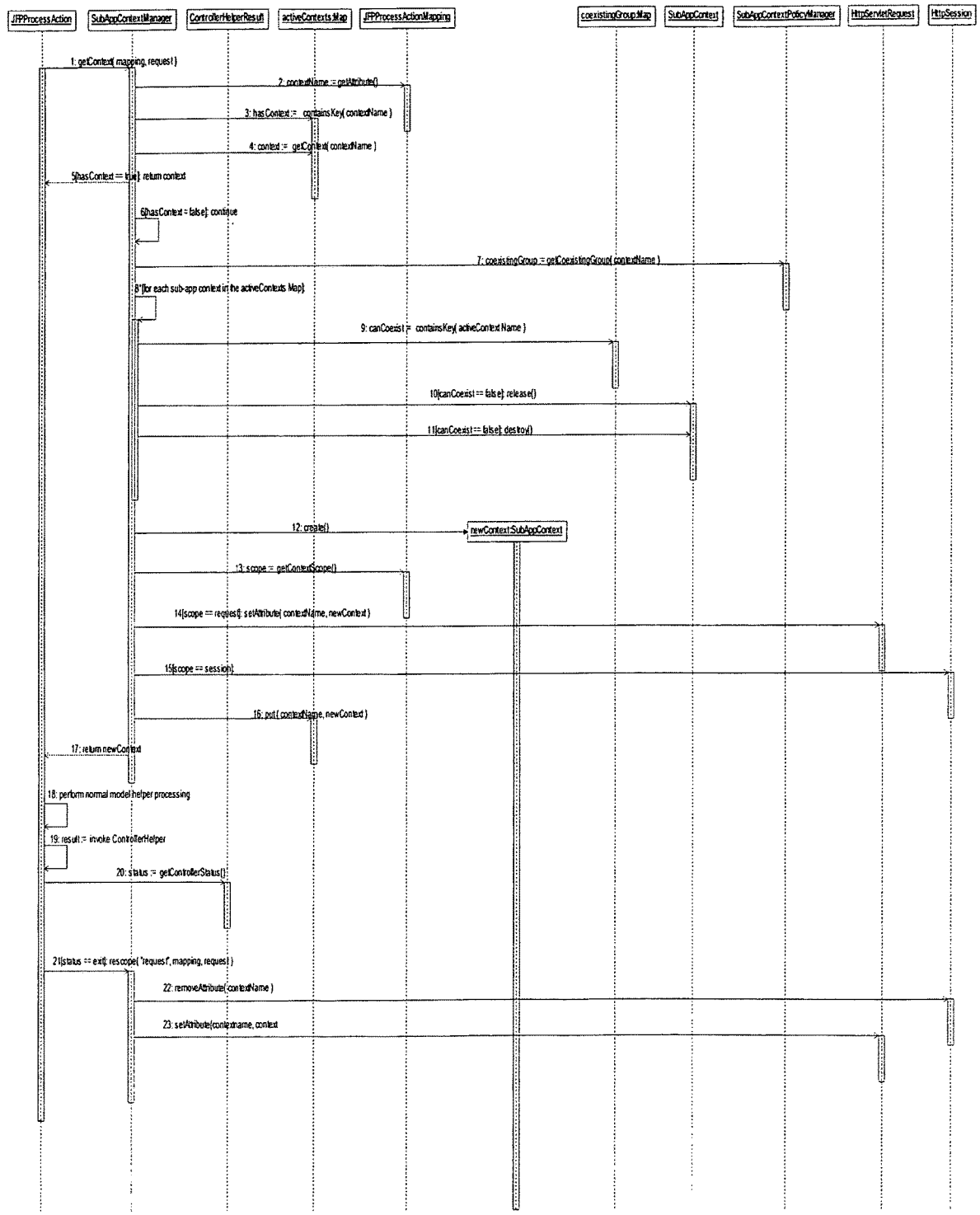
FIG. 39 is a sequence diagram that illustrates an example of get or create a sub-app context in JFP for embodiments of the invention.

FIG. 37 is a Sequence Diagram that illustrates an example of sub-app context manager creation in JFP for embodiments of the invention. FIG. 38 is a Sequence Diagram that illustrates an example of sub-app context manager termination in JFP for embodiments of the invention. FIG. 39 is a Sequence Diagram that illustrates an example of get or create a sub-app context in JFP for embodiments of the invention.

The sub-app context aspect of JFP for embodiments of the invention employ a naming convention in which each sub-app context name has a structure that includes, for example, prefix and full name, the following of which are examples.

jba/jbaxxxx—"jba" is the prefix and "jbaxxxx" is the full name portlet/jbaxxxx—"portlet" is the prefix and "jbaxxxx" is the full name In a sub-app context co-existence policy aspect of JFP for embodiments of the invention, JFP will provides a centralized method of defining sub-app contexts which can co-exist together using a site policy template. This policy is the single point of entry where the JFP sub-app framework can retrieve the list of sub-app contexts that can co-exist with a specific sub-app context. The template is an xml file, and the following is a sample template.

```
<?xml version="1.0"?>
<site-policy>
   <coexist-group>
      <sub-app-context id="jba/xxxx/subAppContext" />
      <sub-app-context id="jba/yyyy/subAppContext" />
      <sub-app-context id="jba/zzzz/subAppContext" />
   </coexist-group>
   <coexist-group>
      <sub-app-context id="portlet/*" wildcard="true"/>
      <sub-app-context id="portlet/yyyy/subAppContext"
 exclude="false"/>
   </coexist-group>
</site-policy>
```

The template contains only one <site-policy> element and can contain many <coexist-group> elements. Each <coexist-group> tag contains zero to many <sub-app-context> elements, and each <sub-app-context> tag contains attributes, including "id" which is a required attribute that represents a single sub-app context name or a collection of sub-app context names represented by "wildcards", "exclude" which is an optional attribute that directs the policy to exclude a sub-app context or collection of sub-app contexts to be excluded from the co-existence list, and "wildcard" which is an optional attribute that identifies the "id" as having "wildcard" character.

In the "wildcards" aspect, site policy allows declaration of collections of co-existing sub-app contexts by using wildcard characters such as "(*)". Site policy performs regular expression pattern matching on "id" values whose "wildcard" attribute is set to "true". The following is an example of a policy element.

<sub-app-context id="portlet/*" wildcard="true"/>

Java doc for class java.util.regex.Pattern provides all the regular expression constructs that can be used in "id" attribute of "sub-app-context" element. After all "wildcards" are resolved to specific sub-app context names, there is only one reference to a co-existing context group from the sub-app context list.

Figure 40:
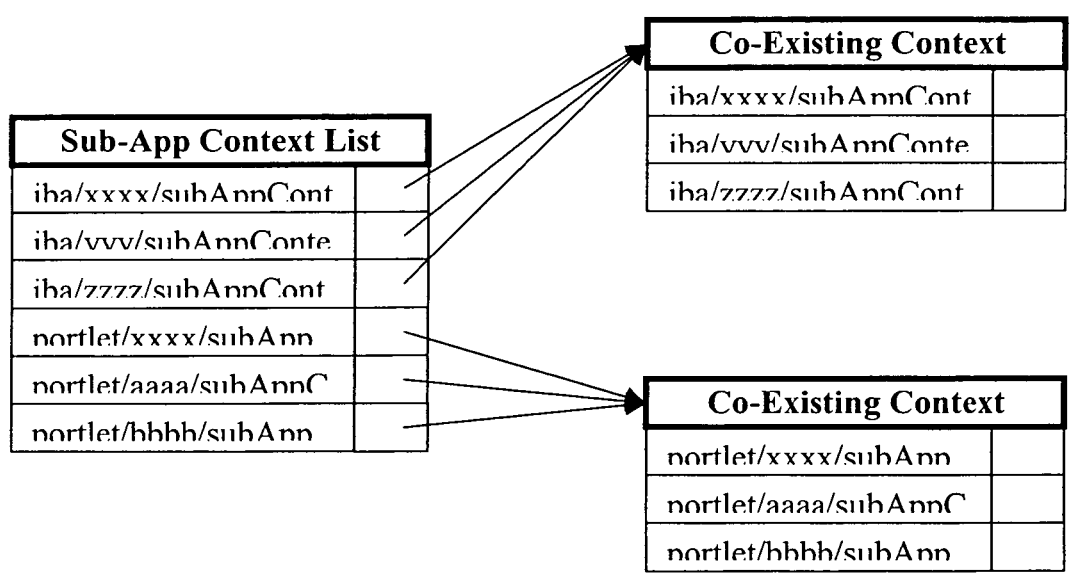
FIG. 40 a diagram that illustrates an example of the contents of the memory structure held by the PolicyConfig object for the sample template.
Figure 41:
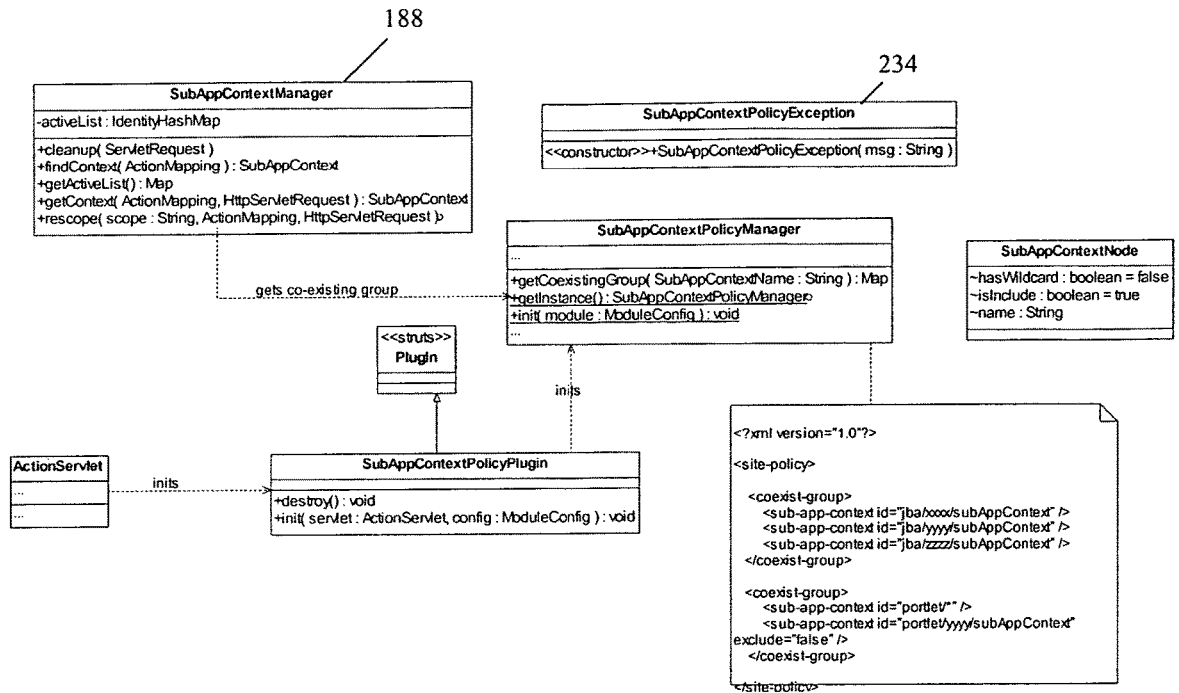
FIG. 41 is a diagram that illustrates an example of the structure in the PolicyConfig aspect for embodiments of the invention.

SubappContextPolicyConfig is the object which loads the template in memory ready to be accessed by the JFPProcessAction. This object is called from a Struts module to read the site-policy and load the information in memory ready for access by JFPProcessAction. This object resolves all the wildcards specified in the "id" attributes of <sub-app-context> elements to specific sub-app context names. FIG. 40 a diagram that illustrates an example of the contents of the memory structure held by the PolicyConfig object for the sample template. FIG. 41 is a diagram that illustrates an example of the structure in the PolicyConfig aspect for embodiments of the invention.

Figure 42:
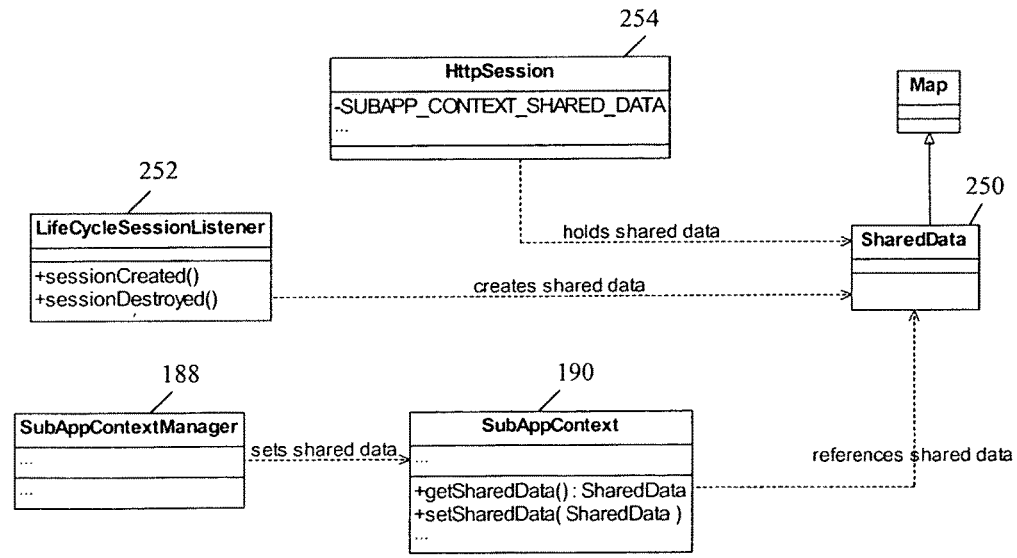
FIG. 42 is a diagram that illustrates an example of the structure in the shared context between sub-apps (server-side clipboard) aspect for embodiments of the invention.

FIG. 42 is a diagram that illustrates an example of the structure in the shared context between sub-apps (server-side clipboard) aspect for embodiments of the invention. The participants include, for example, SubAppContext 190, SharedData 250, SubAppContextManager 188, LifeCycleSessionListener 252, and HttpSession 254. SubAppContext 190 is responsible for providing access to SharedData 250. When a sub-app context is first created by SubAppContextManager 188, the context manager passes a reference of SharedData 250 to SubAppContext 190. Any object needing a reference to SharedData 250 accesses it using getSharedData API of SubAppContext 190. SharedData 250 is a map holding all data shared between sub-apps such cross-linked data, etc. SubAppContextManager 188 is responsible for passing the SharedData 250 reference to sub-app context object when first created. On a session created event, LifeCycleSessionListener 252 creates a SharedData object and sets this object as an attribute of the HttpSession object. The attribute name is "SUBAPP_CONTEXT_SHARED_DATA". HttpSession 254 holds on to a reference to SharedData 250.

JFP Model Overview

Another aspect of JFP for an embodiment of the invention enables expression of business rule variability thru the use of standard business rules methods. These business rule methods allow standard "questions" to be asked of business objects. The answers are embodied offline in the form of XML data, whose content is read-in, transformed and then embedded/cached in global banking business objects.

In a further aspect of JFP for an embodiment of the invention, these business rule objects are organized in terms of business, product and transaction hierarchy, so that business rules can be addressed at the granularity of individual transactions within a product and business structure. In other words, business rules can be organized in a hierarchy of business product and transaction, so that a particular business rule question can be directed to the lowest level, e.g., "I am trying to perform this transaction against this product within this business; am I allowed to do it; what are the rules?" This structure provides support for the variations needed to support online banking in an international context with all the inherent regulatory and business dependent variations.

An additional aspect of JFP for embodiments of the invention provides a clean separation from control and model in a MVC architecture via the use of stateless model helpers. These stateless model helpers provide discrete functionality that is independent of the sequence of an application and independent of other model helpers. A list of independent model helpers can be executed via a manifest defined in a JFP process bean.

JFP for embodiments of the invention implements a JFP banking model which embodies the country and business specific variations in business logic and business rules needed to support the complete set of global online consumer banking functionality (e.g. bill payment, transfers, account information etc.) from a single globally-enabled code base. The JFP banking model supports the existing set of home banking business rules and business rule data, is independent of any particular control-view dialog flow; supports multiple different control-view dialog pair flows; and supports a "coarse grain" interface between it and the control which can be efficient and performed "at a distance" (i.e. from container to container or server to server). The JFP banking model is designed so that most of its specific implementation details are hidden from the control via some type of "facade" and in such a way that it can be externalized in the future into a separate container (e.g. EJB container) or a separate server (e.g. middleware server). In addition, the JFP banking model supports a flexible, document-style interface to its services. More specifically, the JFP banking model supports a coarse grain interface between the control and itself by using a data transfer object design pattern. The receptor of the coarse grain interface on the model side is a set of "helper" objects, which are singleton, stateless objects, acting as a "façade" to isolate the control from the details of the model. JFP banking business rule data is encapsulated behind a set of banking unit objects (i.e. business unit, product type and transaction type) which are singleton objects (one set per business unit per web-app scope) and which cache business rule data. Customer profile and account information is encapsulated behind a set of banking profile objects, which are stateful objects, one set per customer session and have customer session scope.

Figure 43:
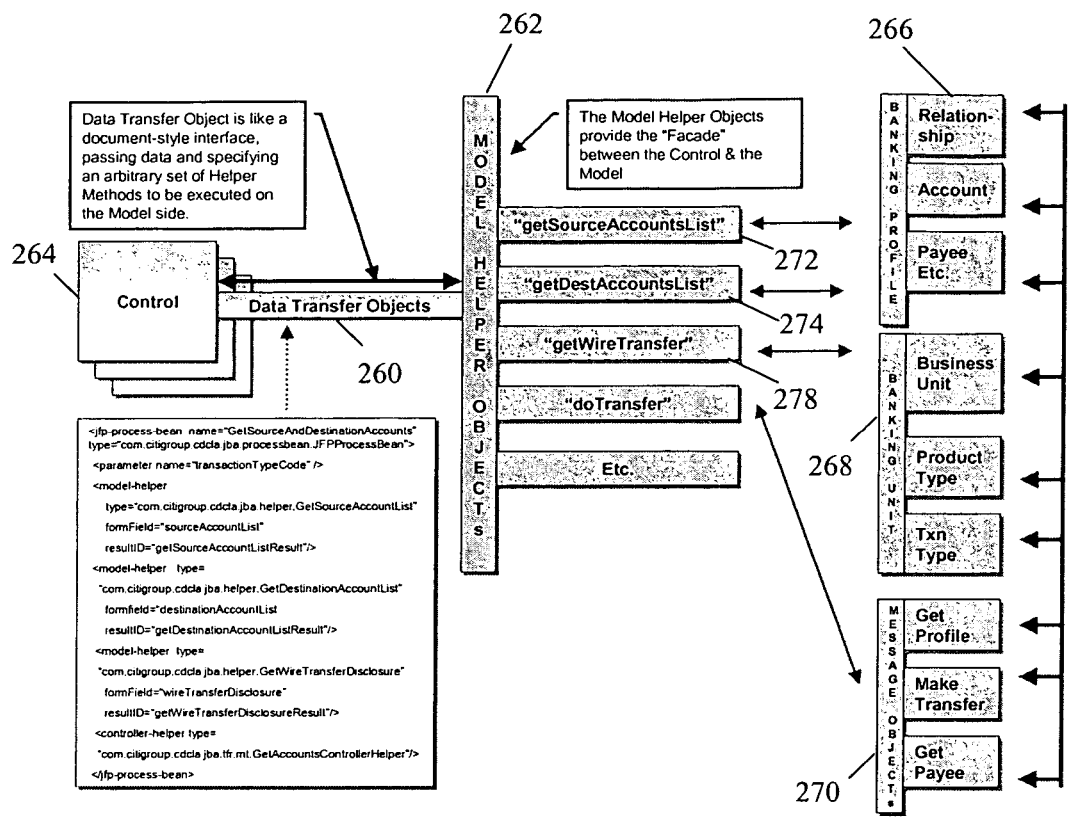
FIG. 43 is a schematic flow diagram that illustrates an example of the flow of information between the control and the model using a data transfer object ("DTO") for embodiments of the invention.

FIG. 43 is a schematic flow diagram that illustrates an example of the flow of information between the control and the model using a data transfer object (DTO) design pattern JFP banking model for embodiments of the invention. In JFP, the term used for the DTO 260 is JFP process bean. The model helper objects form a "façade" between the control 264 and the model. The actual model objects (e.g. banking unit objects 266, banking profile objects 268, and messaging objects 270) are not exposed directly to the control 264. This is a coarse-grain interface between control and model as opposed to a property getting, setting type interface. In a coarse-grain interface, parameters and method calls that are likely to be used together are packaged together in a single coarse-grain call.

The process beans have a document-style like interface that allows the arbitrary combination of various model helper method calls to be executed. The model helper objects 262 are the only visibility the control 264 has into the model. All other model objects (i.e., the banking unit objects 266, the banking profile objects 268, and the messaging objects 270) are accessed only indirectly and unknowingly via the helper objects 262. This allows the implementation of the bulk of the model objects to change over time behind the constancy of the helper objects 262. The helper objects 262 themselves are stateless, which allows them to be implemented as multi-threaded singleton objects.

The following is an example of the configuration for a specific JFP process bean request. In the example, the first line specifies the name of this group (i.e. "GetSourceAndDestinationAccounts"). The next two lines specify input parameters to be taken from the ActionForm and passed (i.e. "transactionTypeCode" and "bankingPackageType"). The succeeding several lines specify the name of specific model helpers to be called and executed on the model side (i.e. "getSourceAccountSelectionList", "getDestinationAccountSelectionList", and "getWireTransferDisclosure").

```
<jfp-process-bean
    name="GetSourceAndDestinationAccounts"
    type="com.citigroup.cdcla.jba.processbean.JFPProcessBean">
    <parameter name="transactionTypeCode" />
    <model-helper
        type="com.citigroup.cdcla.jba.helper.GetSourceAccountList"
        formField="sourceAccountList"
        resultID="getSourceAccountListResult"/>
    <model-helper
type="com.citigroup.cdcla.jba.helper.GetDestinationAccountList"
        formfield="destinationAccountList
        resultID="getDestinationAccountListResult"/>
    <model-helper
type="com.citigroup.cdcla.jba.helper.GetWireTransferDisclosure"
        formField="wireTransferDisclosure"
        resultID="getWireTransferDisclosureResult"/>
    <controller-helper
type="com.citigroup.cdcla.jba.tfr.mt.GetAccountsControllerHelper"/>
</jfp-process-bean>
```

Figure 44:
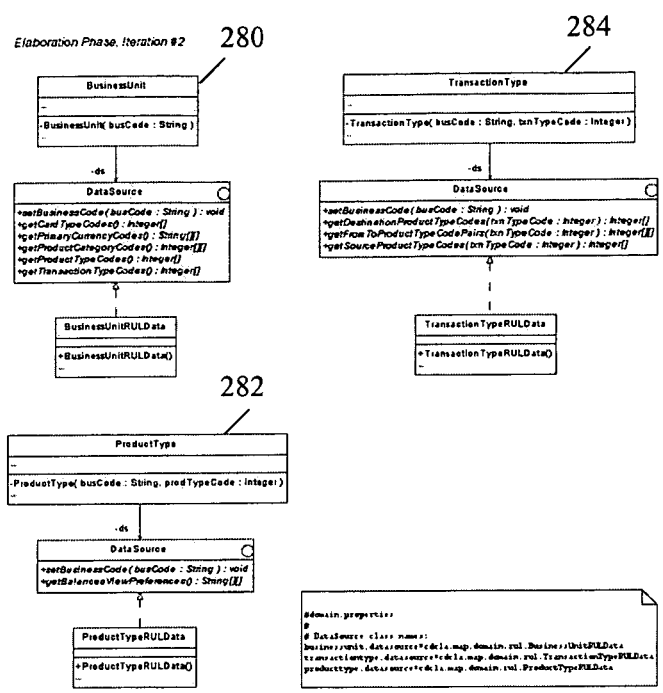
FIG. 44 is a schematic diagram that illustrates examples of the structure of JFP banking unit objects for embodiments of the invention.

In embodiments of the invention, the JFP banking model helper objects 262 provide a "façade" interface between the control and the model. The JFP banking model interface consists of a set of "helper" methods. The helper methods perform well known and typically needed units of work on behalf of the control 264 (e.g. GetSourceAccountSelectionList 272, GetDestinationAccountSelectionList 274, etc.). Using the JFP process beans, helper methods can be grouped arbitrarily into larger units of work. For example a grouping such as GetSourceAccountSelectionList 272, then GetDestinationAccountSelectionList 274, then getWireTransferDisclosure 276 and return all results. Helper methods are independent of each other and are extensible. New helper methods can be added over time. Helper methods are "one-shot", they do not retain request state after a response is returned. They carry request state only on the stack during execution. Helper methods interface to other model objects that retain customer/transaction state as appropriate. JFP banking model "helper" methods can be both generic (i.e. not transaction specific) or specific to a particular transaction. Examples of generic helper methods include getSourceAccountSelectionList 272, getDestinationAccountSelectionList 274, getDisclosure etc. Examples of specific helper methods include: doTransfer 278, getWireTransferDisclosure 276 etc. Using JFP process beans, arbitrary groupings of helper methods can be specified via a configuration file. FIG. 44 is a schematic diagram that illustrates examples of the structure of JFP banking unit objects for embodiments of the invention. The JFP banking model for embodiments of the invention includes of a set of objects called the JFP banking unit objects that "model" and encapsulate the global consumer online banking business rules. The global consumer online banking business rules define the business and regulatory differences in the global online banking functionality. The JFP banking unit objects exist as a singleton-set per business unit at the web-app scope. They encapsulate and cache at runtime business rule data and provide both generic and specific method calls. JFP banking unit objects include, for example, business unit 280 (one per consumer business e.g. Singapore, Hong Kong etc.), product type 282 (one per unique product type within a business), and transaction type 284 (one per unique transaction type within a product type). The JFP banking unit objects are generally not called directly by the control 264, but are used by other model objects.

Important features of the banking unit objects include, for example, extensibility (to accommodate new rules) and commonality (a predictable and constrained set of method signatures). These features are enabled by a design with "generic" methods that can handle multiple rules and that also accommodate "plug-able" rule handlers, based on method signatures and rule identifiers.

Generic methods can be used in many different ways. Each generic method, depending on its parameters, provides a different abstraction for its client. An example of an abstraction is "What are the valid ready-to-use source accounts?" In order to provide this abstraction, the transaction type class 284 provides the generic method "Object getListOfObjects(String ruleIdentifier)" with the ruleIdentifier as "RTUSourceProducts". The objects returned are of a specific class that answers the "What are the valid ready-to-use source products" question. This class provides the needed information for the banking relationship object to build the valid ready-to-use source customer account objects.

Figure 45:
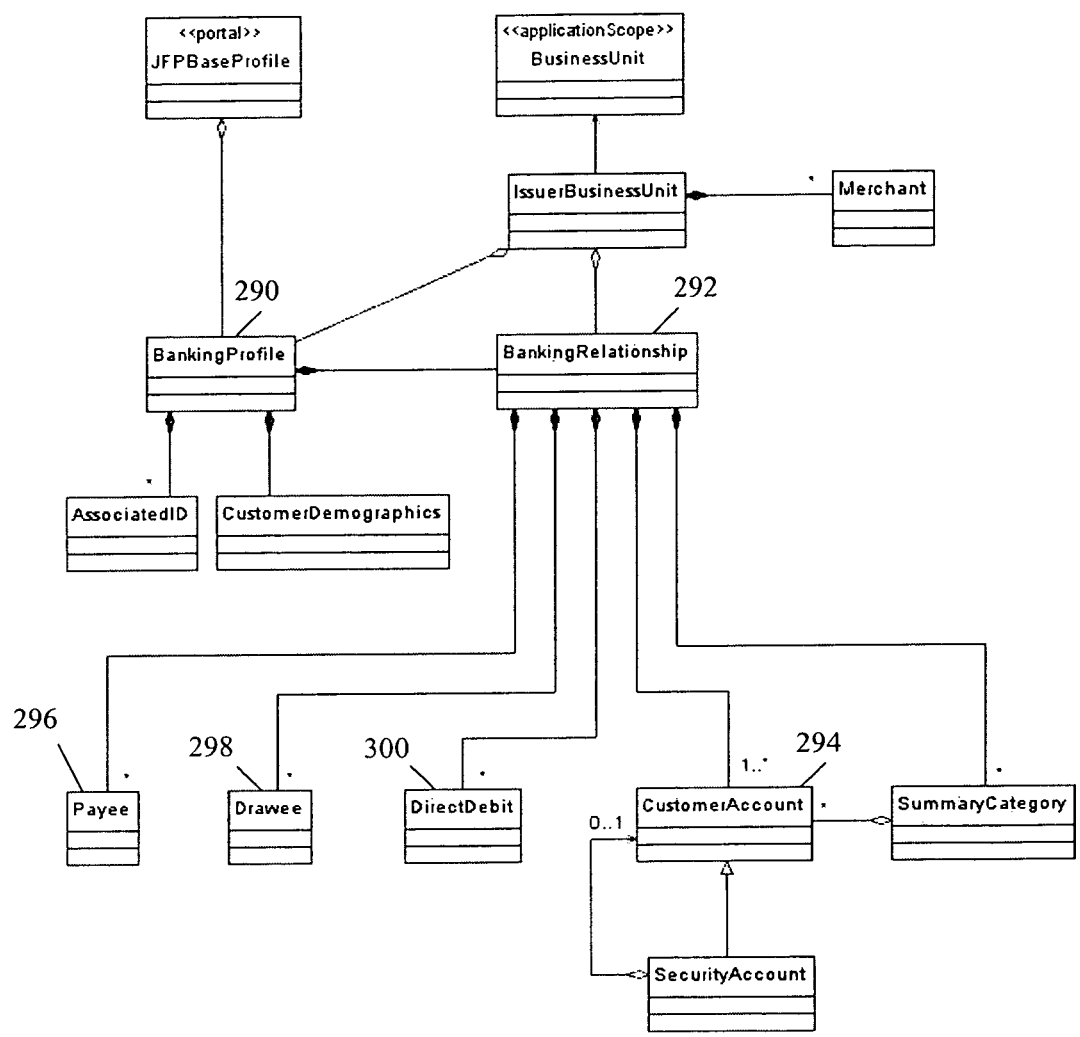
FIG. 45 is a schematic flow diagram that illustrates an example of JFP banking profile objects for embodiments of the invention.

The JFP banking model for embodiments of the invention also includes a set of objects, called the JFP banking profile objects that "model" and encapsulate information about a customer, their banking relationship, their accounts, payees, drawees, etc. The JFP banking profile objects exist as a per customer instance set of objects at session scope. FIG. 45 is a schematic flow diagram that illustrates an example of JFP banking profile objects for embodiments of the invention. Examples of the banking unit objects include banking profile object 290 (one per customer containing customer ID and a limited set of customer identity information [such as customer name, tax Id, etc.]), banking relationship object 292 (one per customer—control point for access to all linked accounts, payees, etc. for this customer), customer account objects 294 (one to N per Account for this customer), payee objects 296 (0 to N), drawee objects 298 (0 to N), and direct debit objects 300 (0 to N). The JFP banking profile objects are generally not called directly by the control, but are used by other model objects, especially the helper objects 262.

Figure 46:
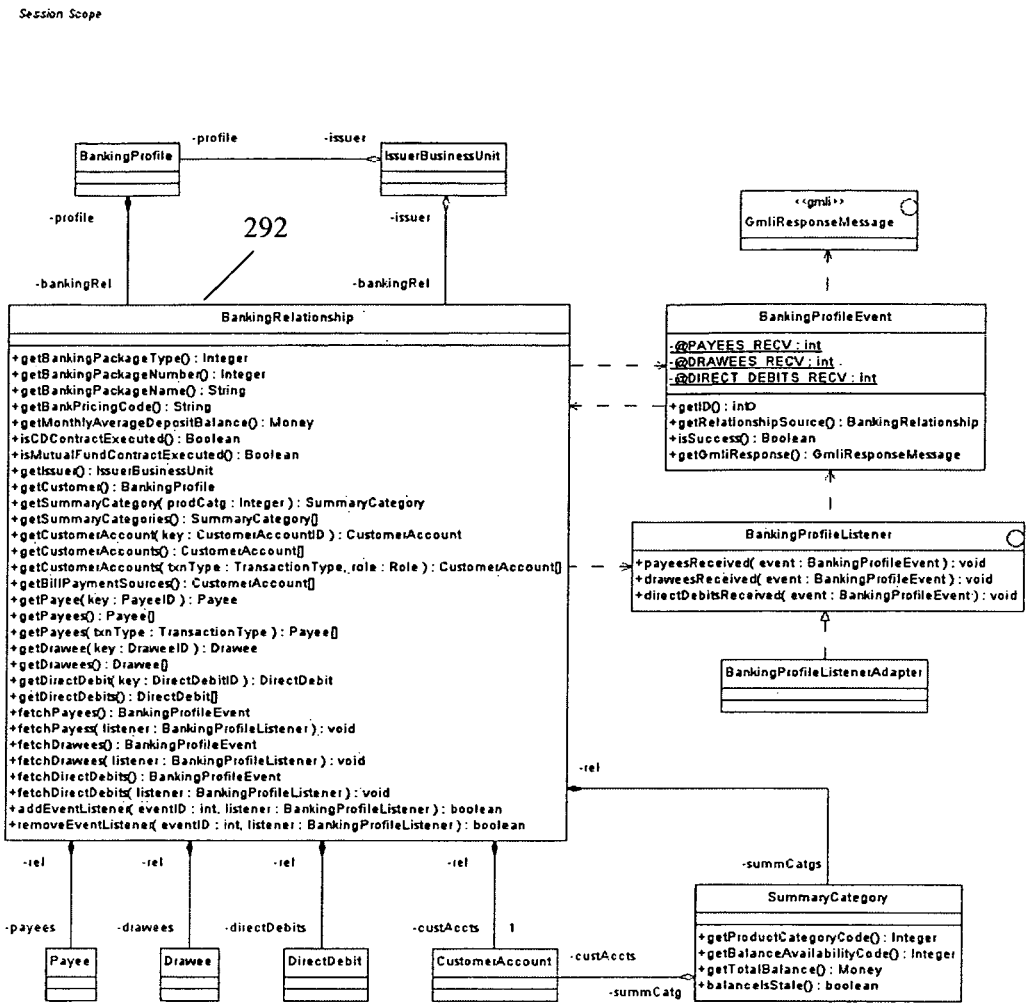
FIG. 46 is a schematic flow diagram that illustrates an example of JFP banking relationship object for embodiments of the invention.
Figure 47:
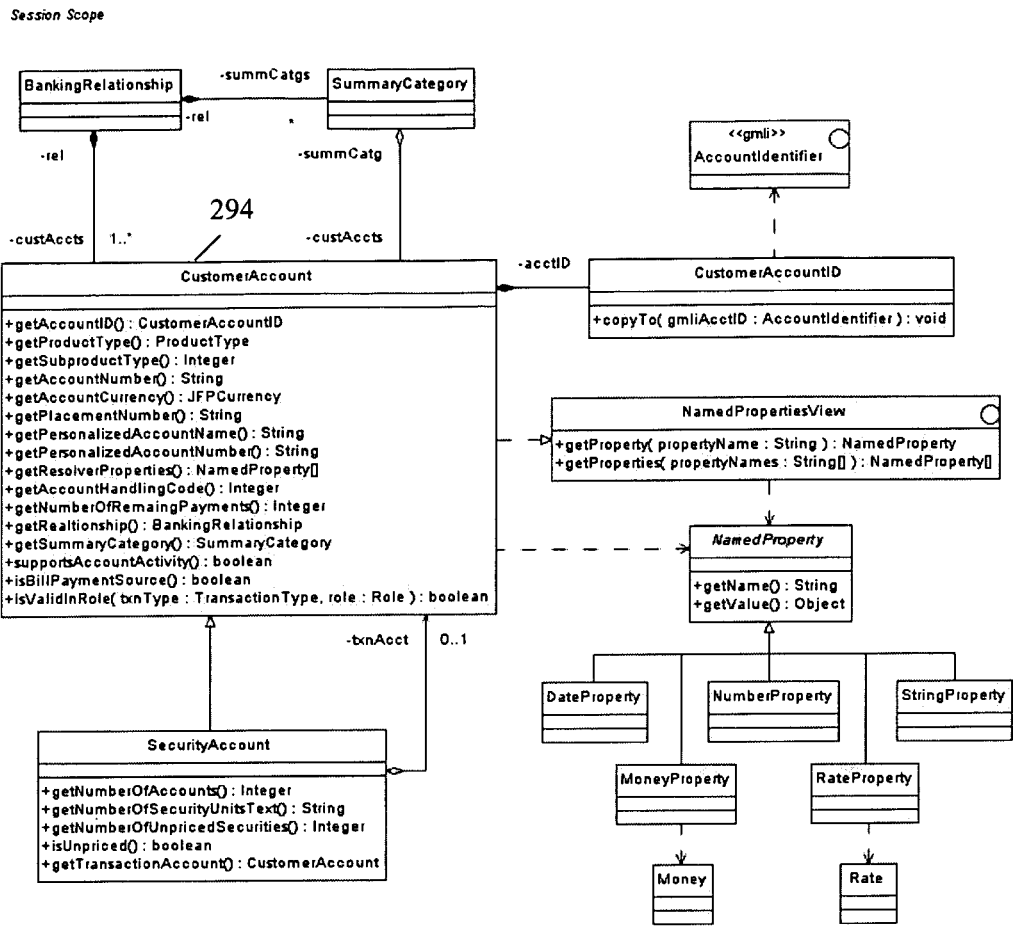
FIG. 47 is a schematic flow diagram that illustrates an example of JFP customer account objects for embodiments of the invention.

The JFP banking relationship object 292 for embodiments of the invention is the focal point for access and control for most of the customer specific financial information. FIG. 46 is a schematic flow diagram that illustrates an example of JFP banking relationship object 292 for embodiments of the invention. The JFP customer account objects 294 for embodiments of the invention are the holders of actual account information. FIG. 47 is a schematic flow diagram that illustrates an example of JFP customer account objects for embodiments of the invention.

Figure 48:
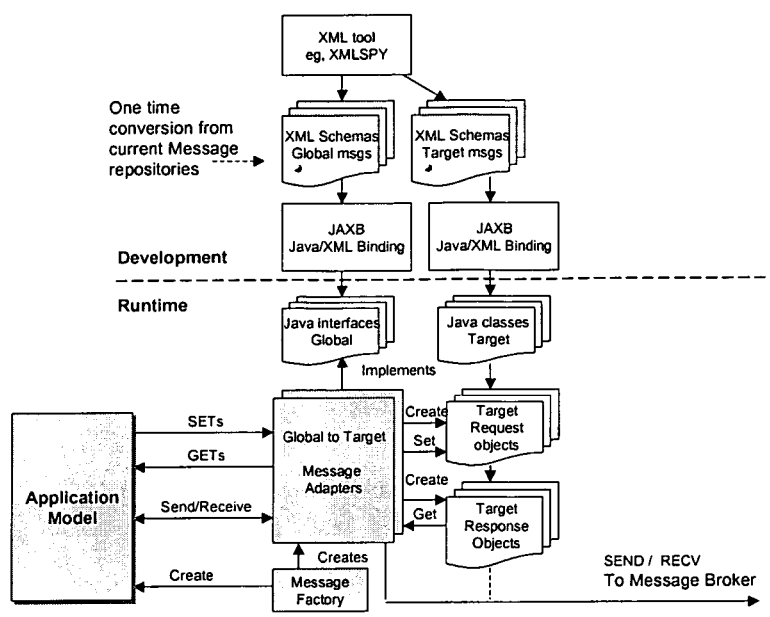
FIG. 48 is a schematic flow diagram that illustrates an example of JFP messaging data binding for embodiments of the invention.

The JFP messaging objects 270 for embodiments of the invention provide a property setting/getting interface that abstracts and is based on a global messaging layer interface (GMLI). The GMLI is itself an abstract definition of messages for consumer banking functionality. The JFP messaging objects 270 provide a facility for mapping the global definition to various regional implementations. This mapping is hidden from the application model. The application model deals with the global properties, abstracted behind property getting/setting methods on messaging objects. The messaging objects, in turn, rely on the JFP thin message router to discover at runtime what actual host is the target for any specific message. The JFP messaging objects 270 are produced offline using an XML schema definition of the GMLI and using code generation and serialization facilities of JAXB. FIG. 48 is a schematic flow diagram that illustrates an example of JFP messaging data binding for embodiments of the invention.

JFP for embodiments of the invention also provides automatic message object generation and transforms, using XML schema definitions, JAXB, and message transformation rules from a global abstract interface to a specific regional interface. It is necessary for the financial institution to talk to external hosts, and the JFP provides a way that all of these message can be automatically generated using a standard XML schema and facilities known as JAXB, as well as creating message transformation rules from a global abstract interface to a specific regional interface. Thus, the JFP provides an automatic message generation system.

Host Messaging Service

Embodiments of the invention utilize messaging objects and thin message router support to support the host messaging requirements of the JFP banking applications. Major aspects of the JFP host messaging service include, for example, the provision of flexible and extensible support for communicating with a variety of external hosts and an abstract representation of messaging for global banking applications messages based on the global message level interface (GMLI), the shielding of client applications from specific details of message encoding and transport and from knowledge of the specific host target of any particular message, the provision of the ability to select target host based on business, message type and customer ID range and the ability to decompose and transaction manage a single logical message into potentially multiple messages to different hosts, and the provision of a host simulator to support "demo-mode" for global banking applications.

The JFP host messaging service includes the use, for example, of XML schema for GMLI message definitions, abstract message object API based on GMLI, Java data binding via JAXB for automatic class generation and serialization/de-serialization between objects and XML, message adapters for regional message mapping and validation, and thin message router for flexible host targeting and transaction management.

XML schemas are used to specify GMLI message definitions. Advantages of using XML schemas include, for example, use of standard definition language that avoids dependencies on custom tools, removal of limitations of one level of nesting in current home banking application message tools, allowing use of off the shelf tools like XMLSpy for schema creation and modification, and provision of conversion from existing message definitions to schemas. Additional advantages of using XML schemas include, for example, allowing generation of Java code from XML schema using data binding technology, direct code generation from XML schemas to Java classes (interfaces and get/set methods) that increases productivity and reduces programming errors, use of standard Java data binding library, JAXB, from Sun, and automatic code generation provided by JAXB for runtime marshalling/unmarshalling to XML.

An abstract interface to messaging objects is presented to the client application, such that applications are exposed to an abstract GMLI interface API and shielded from any regional conversions. For each business, a message adapter maps data from the GMLI to target host encoding. Message adapters are built from auto-generated interface classes for GMLI (JAXB used for auto-generation of interface classes) and developed for each host and each request-response pair. JAXB provides base classes for each message adapter, but custom code for regional element mapping, validation and processing are added for each message.

Figure 49:
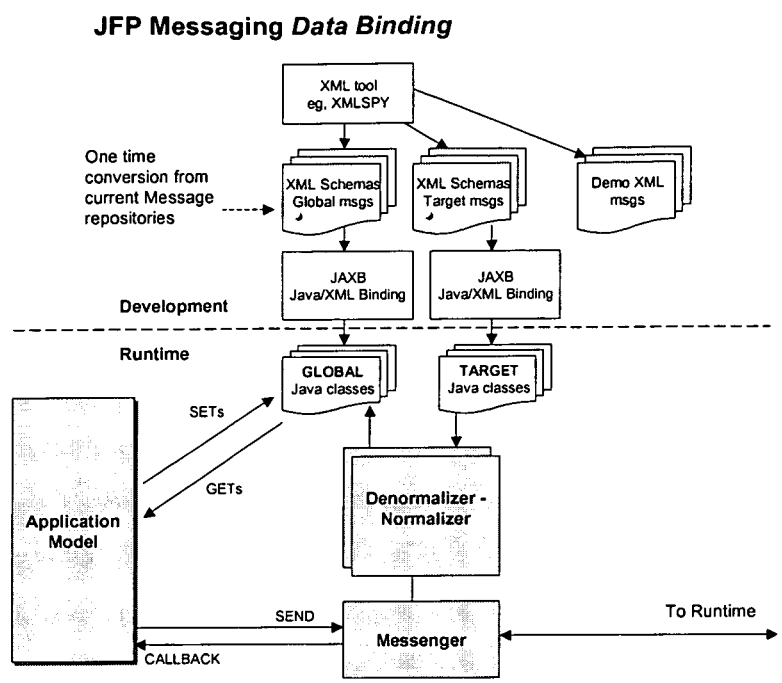
FIG. 49 is a schematic flow diagram that illustrates an example of the manner in which message generation and data binding using JAXB provides for automatic class generation and serialization/de-serialization code for embodiments of the invention.

A message factory is used to create appropriate message adapters, and thin message router determines the host target and in some cases provides transaction management. Message factory creates an appropriate message adapter based on business, message type, and customer ID range. The thin message router routes/transaction-manages messages to the appropriate host, maps message types to appropriate host using configuration table, based on business, message type and customer ID range, manages the host connection(s) for each customer session and maintains affinity between a given customer session and host connection(s). FIG. 49 is a schematic flow diagram that illustrates the manner in which messages are generated and data binding using JAXB provides for automatic class generation and serialization/deserialization code for embodiments of the invention.

In embodiments of the invention, there is one instance of a thin message router per web-app, which handles all customer sessions and host connections in that web-app. The thin message router determines which host to route to based on business, message type and customer ID range (configurable) and calls the appropriate host accessor to do the work, then stores state (host connection, terminal ID) for each customer session.

Figure 50:
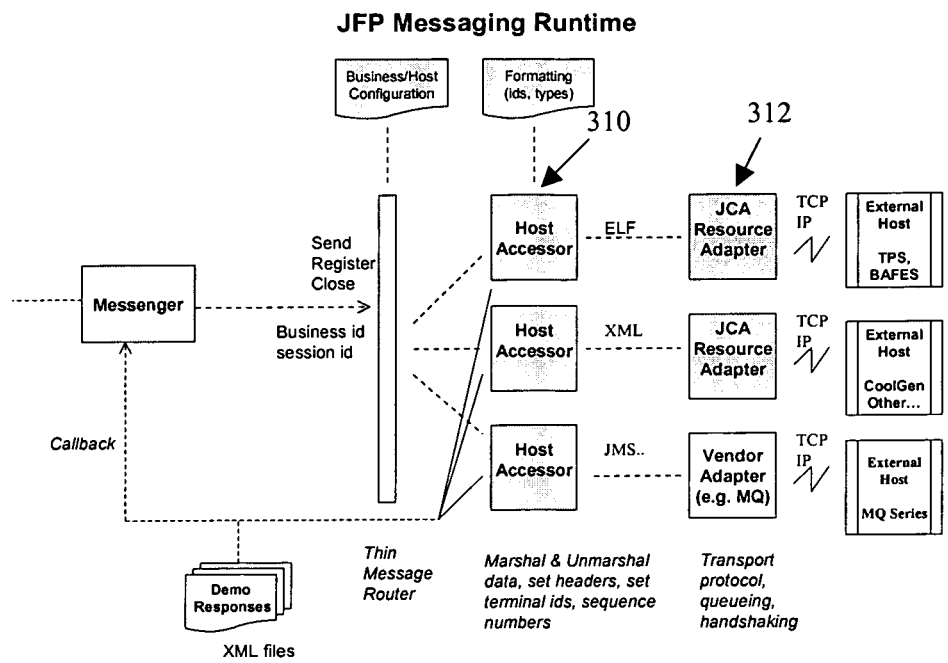
FIG. 50 is a schematic flow diagram that illustrates am example of how the thin message router routes messages to the appropriate target host and maintains customer session affinity with host connections for embodiments of the invention.

FIG. 50 is a schematic flow diagram that illustrates how the thin message router routes messages to the appropriate target host and maintains customer session affinity with host connections for embodiments of the invention. There is one instance of a host accessor 310 per host per web-app, which handles processing for this host in this web-app for all customer sessions, keeps affinity between a session and each host it uses by getting, saving and reusing a host connection for each session, stores state (e.g. host connection, terminal id) for each session, uses helper classes to open connections, assign terminal Ids and sequence numbers, manipulates overhead elements, calls a method to serialize the data, and calls the resource adapter 312. The host accessor 312 is a singleton, but it uses the helper classes which store state about this host and its connections, terminal ids and message sequence numbers. For each accessor, there is one instance of the helper classes for its host. The host accessor 310 also enables adding new accessors without changing thin message router, except for configuration.

Host Adaptor Service

Another aspect of JFP for embodiments of the invention provides a connectivity to external banking hosts via the use of standard JCA connector architecture in J2EE.

A consumer bank may typically employ several different "host front-end" transaction systems around the world which use proprietary protocols and payload encodings. Thus, host adapters are needed to support communications and provide an interface to these proprietary hosts from the JFP internet application servers. The JFP host adapter service for embodiments of the invention utilizes J2EE Java Connector Architecture ("JCA"). The JCA specification defines a standard architecture for connecting the J2EE platform to heterogeneous "hosts", also known as front-end systems or enterprise information systems ("EIS"). Features of the JFP host adapter service include, for example, support for multiple hosts on one server and support for TCP/IP communications protocol only. For encryption, the JCA host adapters support loading one key per server. The internal application interface to the JCA host adapter for the payload provides an efficient and flexible XML structure. Further, the JCA host adapter provides support for logging and instrumentation.

Figure 51:
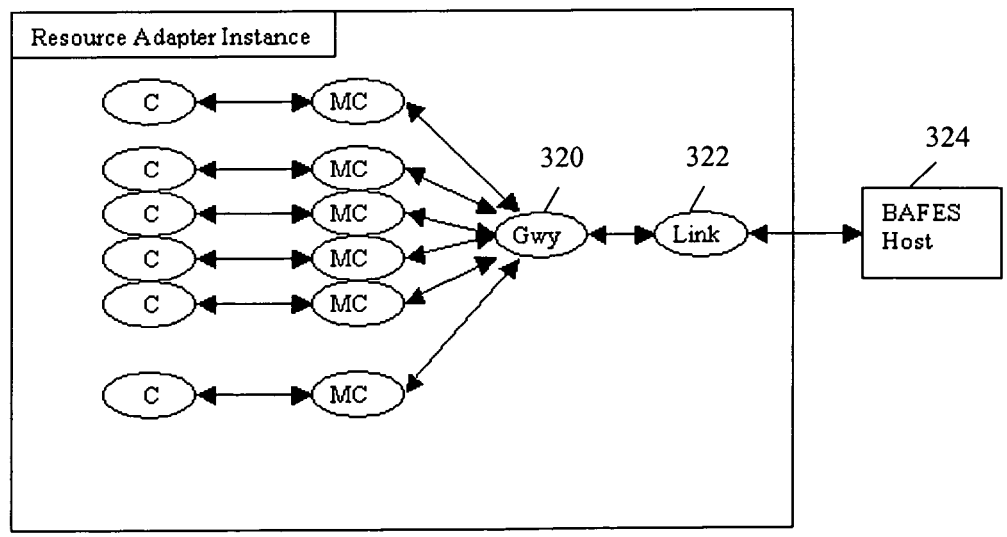
FIG. 51 is a schematic flow diagram that illustrates an example of resource adaptor instance for embodiments of the invention.

FIG. 51 is a schematic flow diagram that illustrates an example of resource adaptor instance for embodiments of the invention. The JFP host adapter service (hereinafter "BAFES Resource Adapter") for embodiments of the invention provides a standard interface for getting a connection to the host, sending a message on that connection, receiving the response, registering and receiving unsolicited messages, and releasing the connection. The BAFES resource adapter is implemented for example, per the Java connector architecture (JCA v1.0) and uses the interfaces therein defined for creating and releasing connections. Interfaces are also defined for sending and receiving solicited and unsolicited messages.

Additional classes are provided beneath the JCA required infrastructure classes to support establishing a connection with the host and message handling. These classes are gateway classes 320 and link classes 322. The link 322 is the component that establishes the physical socket connection to the host 324, handles re-establishing the connection when it goes down, sends keep-alives (if configured) and handles the actual sending and receiving of data to/from the host. A gateway 320 is a layer on top of the link 322 which handles the logical connection to the host 324. Different gateway implementations have different processing, but a gateway 320 may send control messages to sign on to the host 324 after the physical link is established, send handshake messages, handle message timeouts, handle message response matching and handle unsolicited message notifications.

In embodiments of the invention, the BAFES resource adapter internally bring up a gateway 320 as per configuration. The client is able to configure which gateway implementation to use for a specific connector instance. The BAFES resource adapter supports, for example, two gateway implementations, SF and SFC. The SF gateway supports the sending of control messages between the gateway 320 and the host 324 and additional error handling not included in the SFC gateway. In addition, the BAFES resource adapter establish/maintains the link 322 with the host, supports keep alive messages to/from the host, sends/receives control messages, as needed, per the gateway implementation, converts XML/DOM format messages to/from the desired host format (for BAFES host, this is ELF format), adds appropriate message headers, as needed, with information supplied by the client in request, handles/reports message timeouts/errors at various levels, and handles packetizing/de-packetizing of message. Further, the BAFES resource adapter provides a callback mechanism for solicited message responses, provides a register/callback mechanism for unsolicited messages, provides utilities to assist client in loading xml/building message elements, and uses the HostInfo module as a mechanism to record/publish diagnostic information such as instrument values/statuses, statistics and logs.

The BAFES resource adapter for embodiments of the invention is written in such a way that multiple instances of the adapter (configured with different parameters for different businesses) and/or multiple adapters can be used on the same system without interfering with each other. Within the resource adapter there are factories for handing out connections (as per JCA). A single resource adapter can be configured to create/hand out many connection objects 326. Each connection object 326 will belong to a managed connection object 328. Each managed connection object has a reference to the one gateway object instantiated for this connector, and the particular gateway object has a reference to one (in the case of BAFES) or more (in the case of a TPS adapter) link objects.

Various embodiments of the present invention have now been generally described in a non-limiting manner. It will be appreciated that these examples are merely illustrative of the present invention, which is defined by the following claims. Numerous variations, adaptations, and modifications will be apparent to those of ordinary skill in the art without departing from the spirit and scope of the present invention.

What is claimed is:

1. A method, comprising:
   hosting, by a single computer application server processor, a plurality of different applications comprising an on-line banking application, an alert application, a portal building application, and an authentication application accessible by a plurality of business terminal processors deployed at different geographic locations;
   coupling, by the single computer application server processor, via respective application programming interfaces, a shared set of application services comprising language support services, business rule support services, logging support services, navigation support services, personalization services, customization support services, and content support services for each of said plurality of applications;
   caching, by the single computer application server processor in computer memory, a plurality of content types comprising language content, business rules content, and business phrases content for each shared set of services for each of the plurality of applications from a database hierarchically structured at least in part according to a geographic location of each of said plurality of business terminal processors to said memory with an entry of a hierarchy level name of each of said plurality of content types;
   deploying, by the single computer application server processor, at least a first one of said plurality of content types from said cache for at least one of said application services responsive to accessing at least one of the plurality of applications by a first one of said plurality of business terminal processors at a first of said geographic locations corresponding to the hierarchy level name entered with the at least one of the plurality of content types; and
   deploying, by the single computer application server processor, at least a second one of said plurality content types from said cache for the at least one of said application services responsive to accessing the at least one of the plurality of applications by a second one of the plurality of business terminal processors at a second of said geographic locations corresponding to the hierarchy level name entered with the at least a second one of the plurality of content types.

2. The method of claim 1, wherein caching the plurality of content types in memory further comprises dynamically updating cached content types in a running system using specific cache controller classes.

3. The method of claim 2, further comprising changing at least one business rule in said business rules content or update at least one business phrase in said business phrases content in the plurality of cached content types.

4. The method of claim 2, further comprising providing an online cutover, via forwarding and drain servlet filters, from a preceeding version of one of the plurality of applications to a succeeding version of said one of the plurality of applications and forwarding new session requests to the succeeding version of said one of the plurality of applications, while at a same time supporting existing sessions on the preceeding version of said one of the plurality of applications.

5. The method of claim 4, wherein providing the online cutover further comprises providing the online cutover from the preceeding version to the succeeding version via the forwarding and drain servlet filters that query all new session requests and determine where each new session request should be forwarded based on a configuration file.

6. The method of claim 5, wherein providing the online cutover via the forwarding and drain servlet filters further comprises installing the succeeding version of said one of the plurality of applications while existing sessions are running against the preceeding version of said one of the plurality of applications and directing each new session request to the succeeding version of said one of the plurality of applications without shut-down of the application server processor.

7. The method of claim 1, further comprising integrating a model-view-control framework and companion open source framework that provides server-side page composition and layout with a concurrent parallel thread package.

8. The method of claim 7, wherein integrating the model-view-control framework and companion open source framework with the concurrent parallel thread package further comprises providing the integration in a manner such that multiple portlets are allowed to be spawned from a single home page request and to be processed so that each portlet runs in a thread safe way.

9. The method of claim 8, wherein integrating the model-view-control framework and companion open source framework with the concurrent parallel thread package further comprises providing each portlet with its own cloned copy of request and response objects, thereby allowing each portlet to run in a thread safe way even with non-thread safe implementations of request/response objects.

10. The method of claim 1, further comprising providing security protection for all home page requests via use of a site entrance filter for filtering all requests and by providing automatic authorization role provisioning, authorization checks, and cross-site scripting checks.

11. The method of claim 10, wherein the site entrance filter comprises a central filter that checks all requests for new sessions and insures that all new session requests are provided with a new session object and a default profile object with a role set to a lowest entitled user.

12. The method of claim 11, wherein the site entrance filter insures that all requests undergo an authorization check based at least in part on a user role.

13. The method of claim 12, wherein the site entrance filter insures that all requests call out to an authorization check to confirm a user's level of authorization.

14. The method of claim 1, further comprising integrating said authentication application is into a servlet container.

15. The method of claim 14 further comprising providing overload protection for any of the plurality of applications whose performance has exceeded pre-defined levels.

16. The method of claim 15, wherein providing the overload protection further comprises using a site entrance filter to refuse new session requests if a baseline performance of a system has exceeded pre-defined levels.

17. The method of claim 1, further comprising providing sequence protection of any of the plurality of applications without requiring overt procedural code in the application.

18. The method of claim 17, wherein providing sequence protection further comprises extending action mappings to allow declaring that an action mapping is an entry point whereby an attempt to access an action mapping that is not marked as an entry point for which there is no existing subappcontext is automatically refused.

19. The method of claim 18, wherein providing sequence protection further comprises declaring that every action mapping is sequence protected.

20. The method of claim 18, wherein a token embodied in a hidden field and set via a custom tag must be present in order to access the action mapping.

21. The method of claim 1, further comprising informing a user who accesses one of the plurality of applications at a client browser and attempts to navigate away from an in-process transaction that the transaction is incomplete.

22. The method of claim 21, wherein informing the user that the transaction is incomplete further comprises one of warning the user that the transaction is incomplete and prohibiting the user from navigating away from the incomplete transaction.

23. The method of claim 22, wherein warning the user that the transaction is incomplete further comprises declaring by the accessed one of the plurality of applications that the user should be warned if the user attempts to navigate away from a currently incomplete transaction via the use of custom tags.

24. The method of claim 22, wherein prohibiting the user from navigating away from the incomplete transaction further comprises declaring by the accessed one of the plurality of applications that the should be prohibited from navigating away from a currently incomplete transaction at pre-determined commit points in a screen sequence via the use of custom tags.

25. The method of claim 1, further comprising allowing expression of variability of business rules via use of pre-defined standard business rules methods.

26. The method of claim 25, wherein allowing the expression of variability of business rules via use of pre-defined standard business rules methods further comprises allowing pre-defined standard questions to be asked of business objects via the business rule methods.

27. The method of claim 26, wherein allowing the expression of variability of business rules via use of standard business rules methods further comprises embodying answers to the standard questions offline in a form of Extensible Markup Language data whose content is read-in, transformed and embedded or cached in business objects.

28. The method of claim 27, wherein allowing the expression of variability of business rules via use of standard business rules methods further comprises organizing the business rule objects in terms of business, product and transaction hierarchy, whereby business rules can be addressed at a granularity of individual transactions within a product and business structure.

29. The method of claim 1, further comprising providing a separation from control and model in a model-view-controller framework for each of the plurality of different applications via a use of stateless model helpers that provide discrete functionality that is independent of a sequence of an application and independent of other model helpers.

30. The method of claim 1, further comprising providing automatic generation of message objects and transforms using Extensible Markup Language schema definitions, JAVA Architecture for Extensible Markup Language Binding, and message transformation rules from a global abstract interface to a specific regional interface in support of each of the plurality of different applications.

31. The method of claim 1, further comprising providing a connectivity to external banking hosts via use of JAVA 2 enterprise edition connector architecture connector framework in support of each of the plurality of different applications.

32. A system, comprising:
a single computer application server processor that:
hosts a plurality of different applications comprising an on-line banking application, an alert application, a portal building application, and an authentication application accessible by a plurality of business terminal processors deployed at different geographic locations;
couples, via respective application programming interfaces, a shared set of application services comprising language support services, business rule support services, logging support services, navigation support services, personalization services, customization support services, and content support services for each of said plurality of applications;
caches in computer memory a plurality of content types comprising language content, business rules content, and business phrases content for each shared set of services for each of the plurality of applications from a database hierarchically structured at least in part according to a geographic location of each of said plurality of business terminal processors to said memory with an entry of a hierarchy level name of each of said plurality of content types;
deploys at least a first one of the plurality of content types from said cache for at least one of said application services responsive to accessing at least one of the plurality applications by a first one of said plurality of business terminal processors at a first of said geographic locations corresponding to the hierarchy level name entered with the at least one of the plurality of content; and
deploys at least a second one of said plurality content types from said cache for the at least one of said application services responsive to accessing the at least one of the plurality of applications by a second one of the plurality of business terminal processors at a second of said geographic locations corresponding to the hierarchy level name entered with the at least a second one of the plurality of content types.

33. The system of claim 32, further comprising the single computer application server processor that provides an online cutover, via the forwarding and drain servlet filters, from a preceeding version of one of the plurality of applications to the succeeding version of said one of the plurality of applications and forwards new session requests to the succeeding version of said one of the plurality of applications, while at a same time supporting existing sessions on the preceeding version of said one of the plurality of applications.

34. The system of claim 33, further comprising a model-view-control framework and a companion open source framework that provides server-side page composition and layout with a concurrent parallel thread package.

35. The system of claim 34, further comprising a site entrance filter for filtering all requests and by providing automatic authorization role provisioning, authorization checks, and cross-site scripting checks for providing security protection for all home page requests via use of a site entrance filter for filtering all requests and by providing automatic authorization role provisioning, authorization checks, and cross-site scripting checks.

36. The system of claim 35, wherein said authentication application is integrated into a servlet container.

37. The system of claim 36, further comprising a site entrance filter to refuse new session requests if a baseline performance of a system has exceeded pre-defined levels that provides overload protection for any of the plurality of applications whose performance has exceeded pre-defined levels.

38. The system of claim 37, further comprising a portlet from a home page that is automatically disabled if the portlet exceeds pre-defined levels.

39. The system of claim 38, further comprising action mappings that are extended to allow declaring that an action mapping is an entry point whereby an attempt to access an action mapping that is not marked as an entry point for which there is no existing subappcontext is automatically refused for providing sequence protection of any of the plurality of applications without a need for overt procedural code in the application.

40. The system of claim 39, further comprising custom tags for informing or prohibiting a user who accesses one of the plurality of applications at a client browser from abandoning an in-process transaction.

41. The system of claim 40, further comprising pre-defined standard business rules methods for allowing expression of variability of the business rules.

42. The system of claim 41, further comprising stateless model helpers that provide discrete functionality that is independent of a sequence of the accessed one of the plurality of applications and independent of other model helpers for providing a clean separation from control and model in a model-view-controller framework for each of the plurality of different applications.

43. The system of claim 42, further comprising automatically generated message objects and transforms using Extensible Markup Language schema definitions, JAVA Architecture for Extensible Markup Language Binding, and message transformation rules from a global abstract interface to a specific regional interface in support of each of the plurality of different applications.

44. The system of claim 43, further comprising a connectivity to external banking hosts via use of standard JCA connector framework in support of each of the plurality of different applications.

* * * * *